Sept. 5, 1961  J. A. THOMAS ET AL  2,998,914
ACCOUNTING APPARATUS WITH AUXILIARY RECORDING ADJUNCT
Filed Dec. 6, 1956  26 Sheets-Sheet 1

INVENTORS.
JAMES A. THOMAS.
WILLIAM F. MINARD.
BY
JP Santo
ATTORNEY.

Sept. 5, 1961 J. A. THOMAS ET AL 2,998,914
ACCOUNTING APPARATUS WITH AUXILIARY RECORDING ADJUNCT
Filed Dec. 6, 1956 26 Sheets-Sheet 3
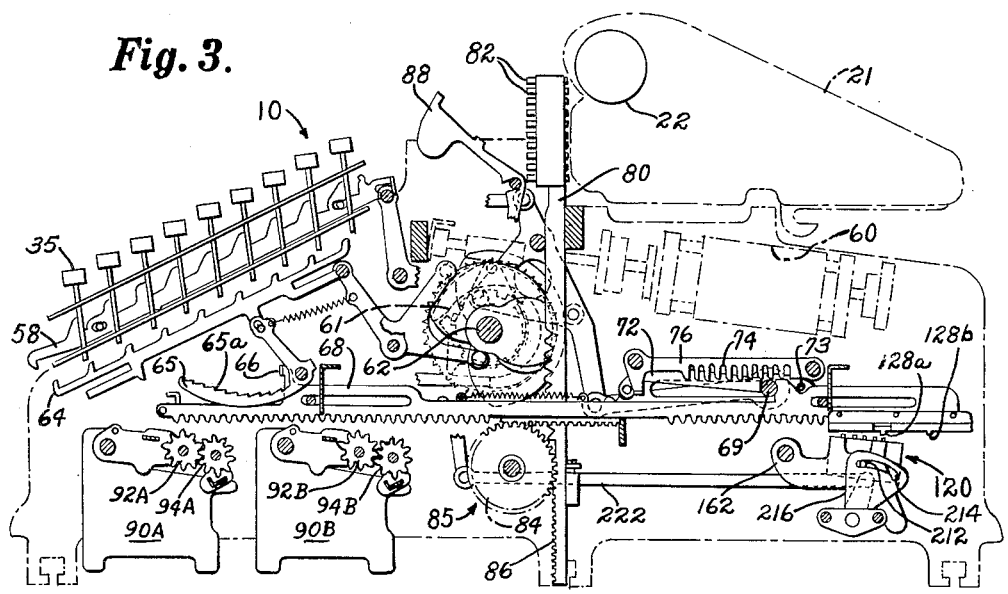
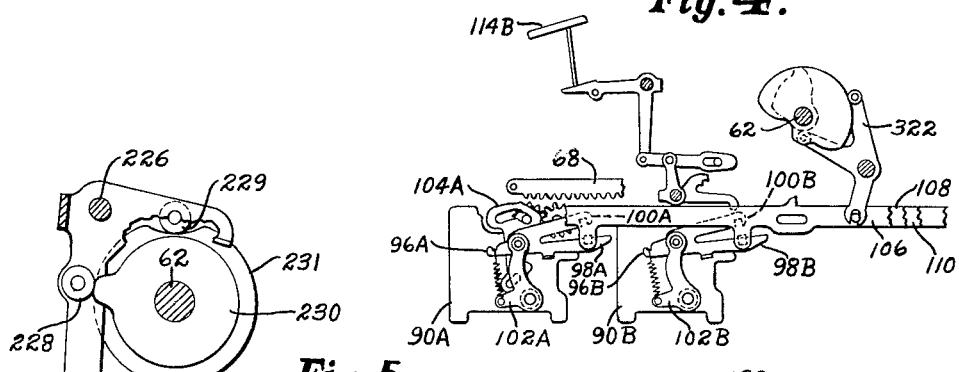
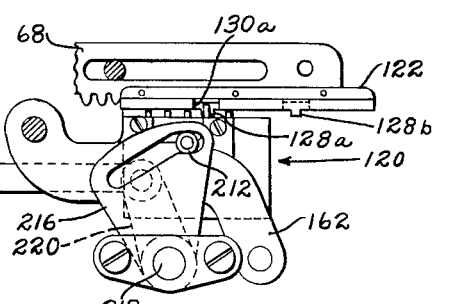
INVENTORS.
JAMES A. THOMAS.
WILLIAM F. MINARD.
BY
JP Santo
ATTORNEY.

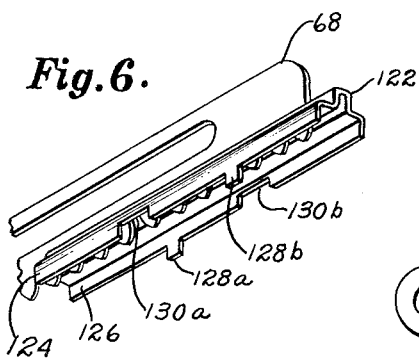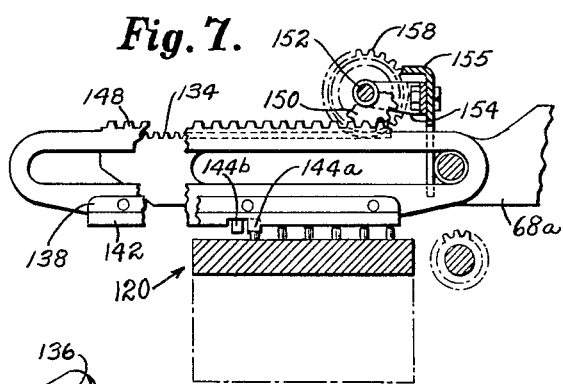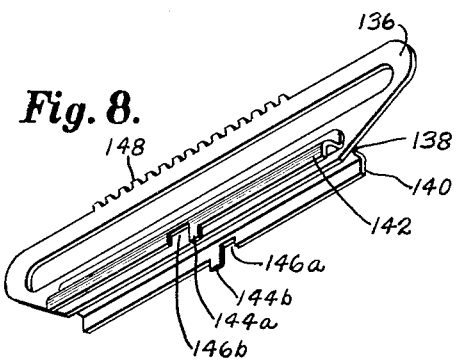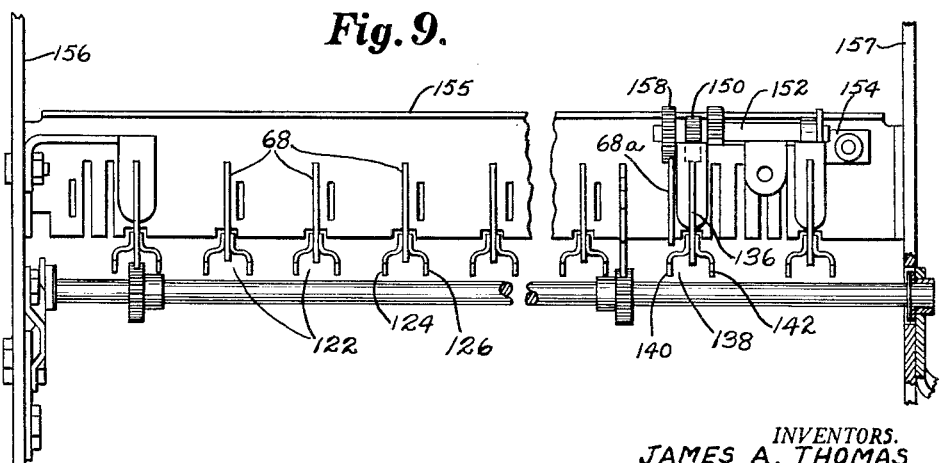

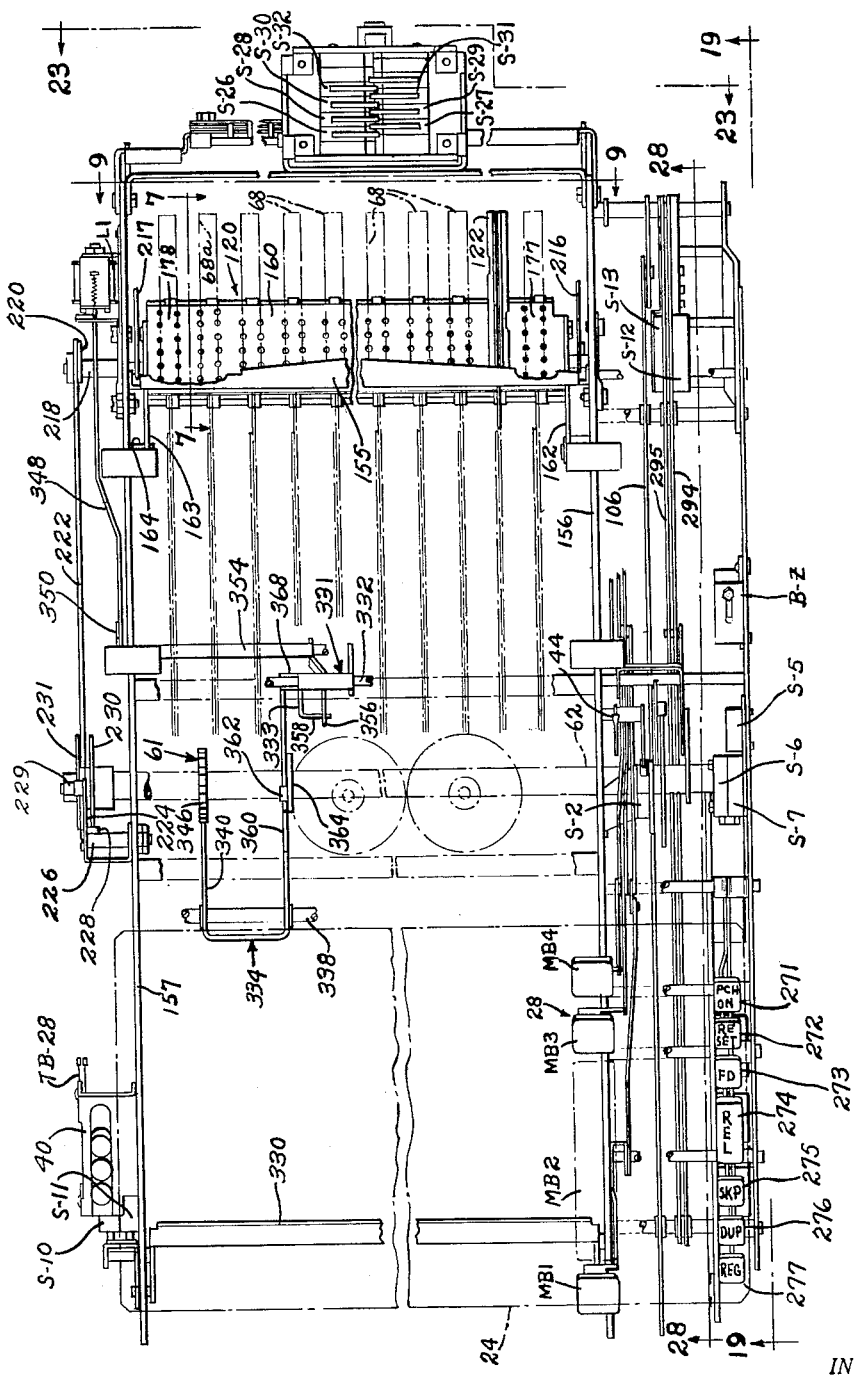

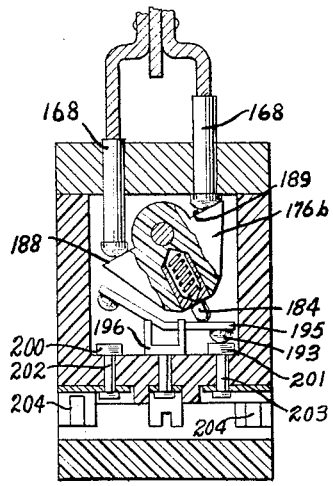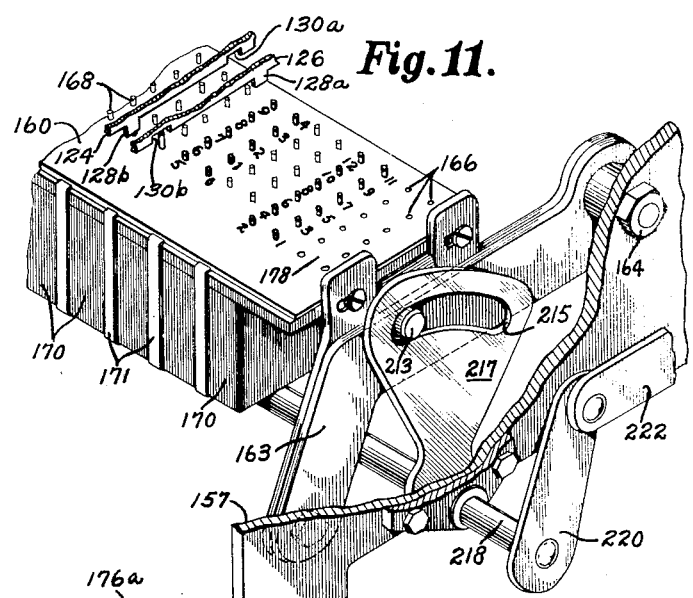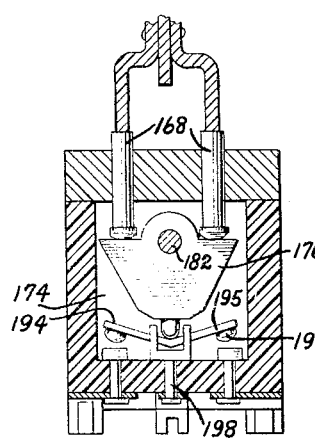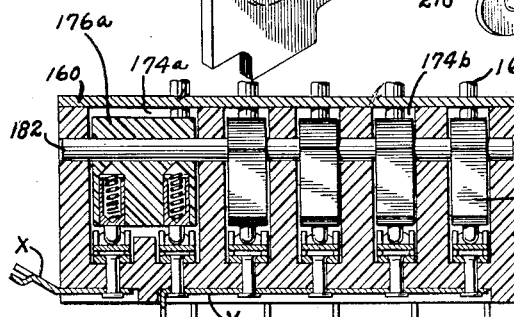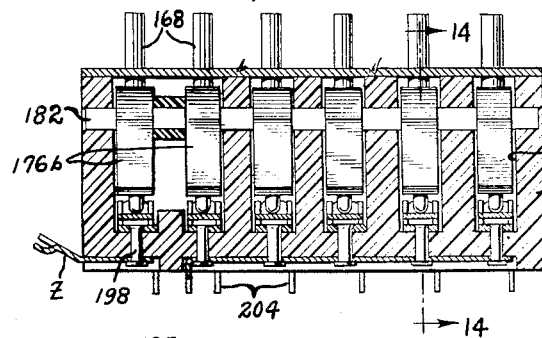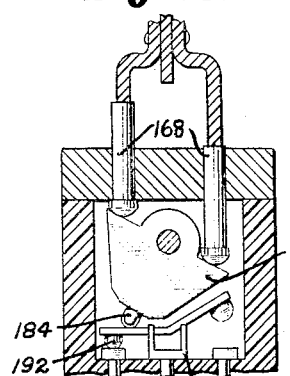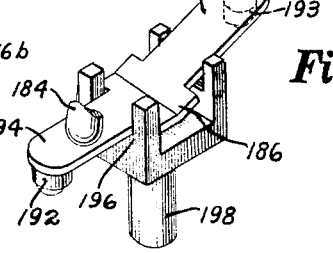

INVENTORS.
JAMES A. THOMAS.
WILLIAM F. MINARD.
BY
JP Santo
ATTORNEY.

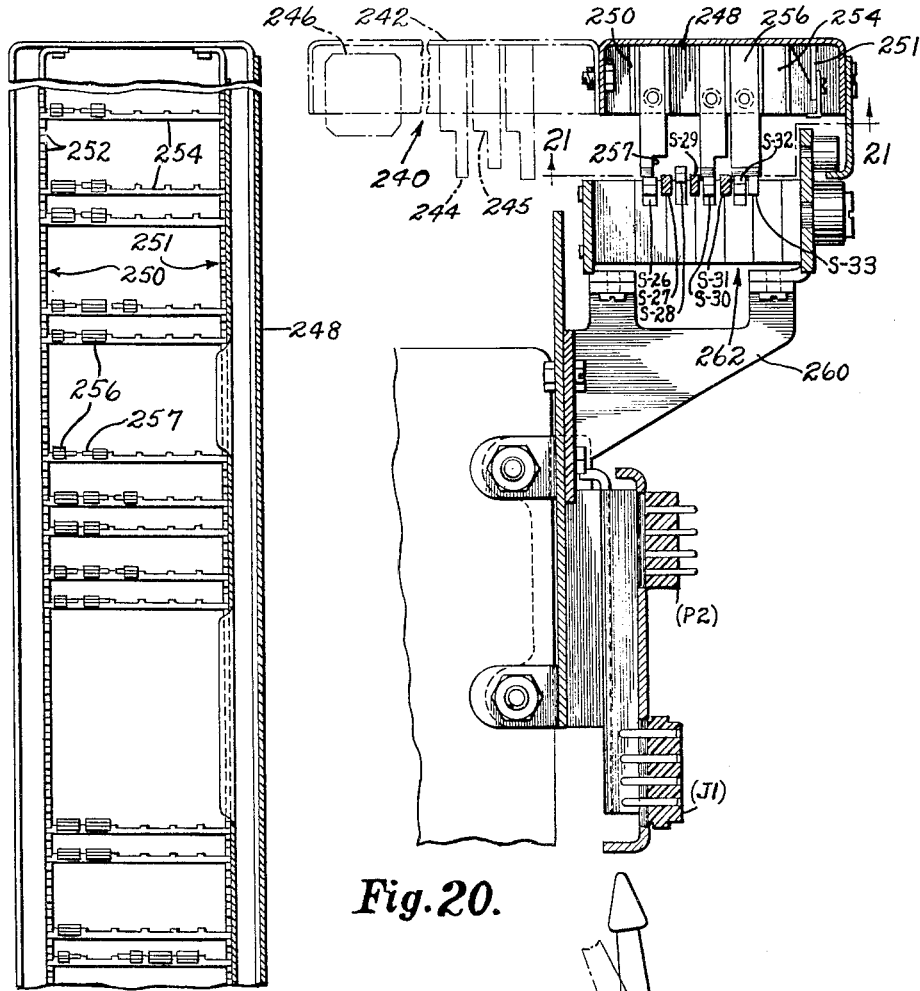
Fig. 20.
Fig. 21.
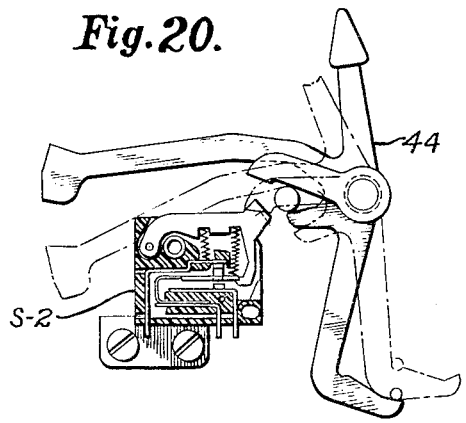
Fig. 22.

Sept. 5, 1961     J. A. THOMAS ET AL     2,998,914
ACCOUNTING APPARATUS WITH AUXILIARY RECORDING ADJUNCT
Filed Dec. 6, 1956     26 Sheets-Sheet 11

INVENTORS.
JAMES A. THOMAS.
WILLIAM F. MINARD.
BY
*JP Santo*
ATTORNEY.

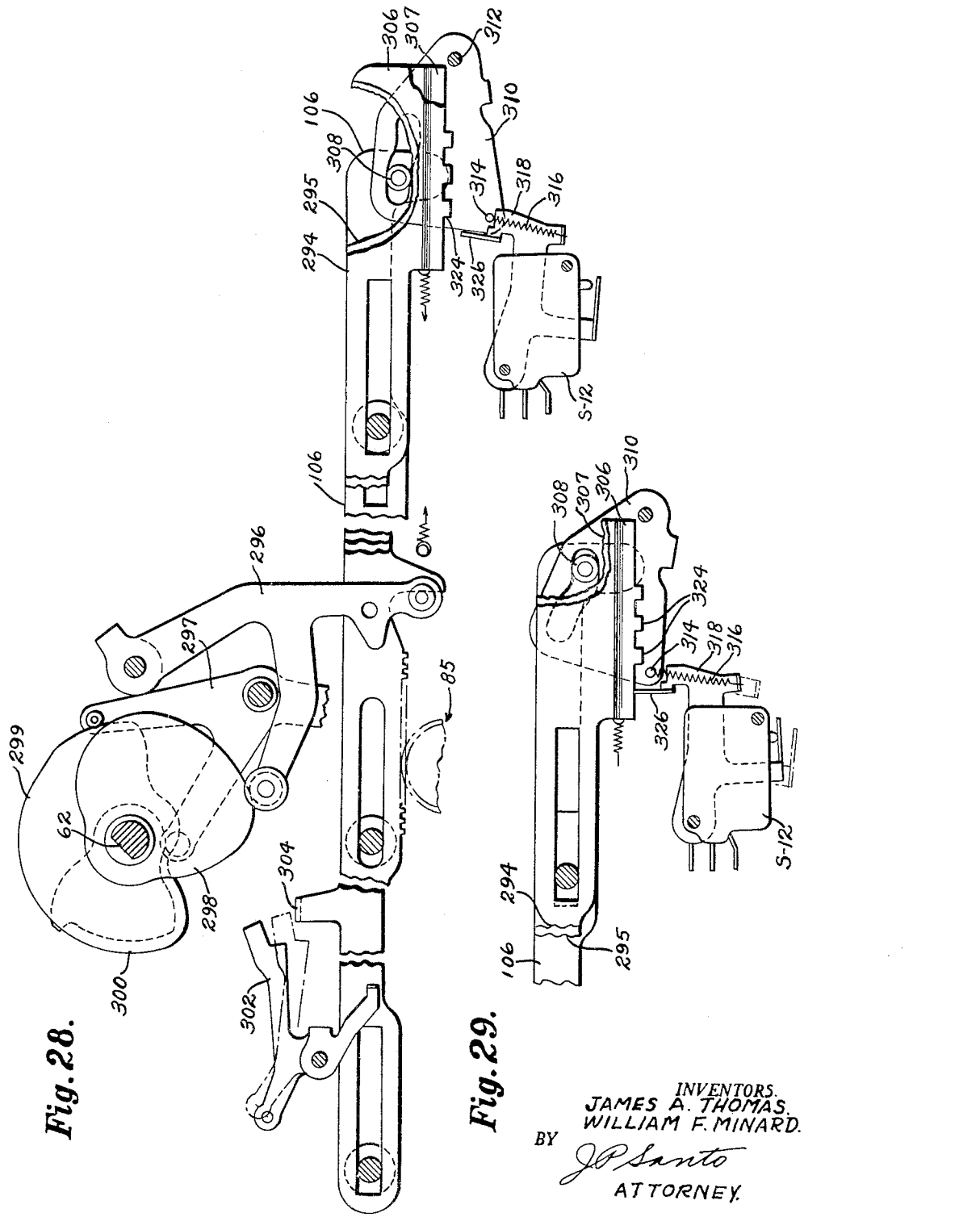

INVENTORS.
JAMES A. THOMAS.
WILLIAM F. MINARD.
BY
ATTORNEY.

Sept. 5, 1961 J. A. THOMAS ET AL 2,998,914
ACCOUNTING APPARATUS WITH AUXILIARY RECORDING ADJUNCT
Filed Dec. 6, 1956 26 Sheets-Sheet 14

INVENTORS.
JAMES A. THOMAS.
WILLIAM F. MINARD.
BY
JP Santo
ATTORNEY.

Sept. 5, 1961     J. A. THOMAS ET AL     2,998,914
ACCOUNTING APPARATUS WITH AUXILIARY RECORDING ADJUNCT
Filed Dec. 6, 1956     26 Sheets-Sheet 16

INVENTORS.
JAMES A. THOMAS.
WILLIAM F. MINARD.
BY *J.P. Santo*
ATTORNEY.

Sept. 5, 1961  J. A. THOMAS ET AL  2,998,914
ACCOUNTING APPARATUS WITH AUXILIARY RECORDING ADJUNCT
Filed Dec. 6, 1956  26 Sheets-Sheet 17

INVENTORS.
JAMES A. THOMAS.
WILLIAM F. MINARD.
BY
*JP Santo*
ATTORNEY.

INVENTORS.
JAMES A. THOMAS.
WILLIAM F. MINARD.
BY
ATTORNEY.

Sept. 5, 1961  J. A. THOMAS ET AL  2,998,914
ACCOUNTING APPARATUS WITH AUXILIARY RECORDING ADJUNCT
Filed Dec. 6, 1956  26 Sheets-Sheet 19
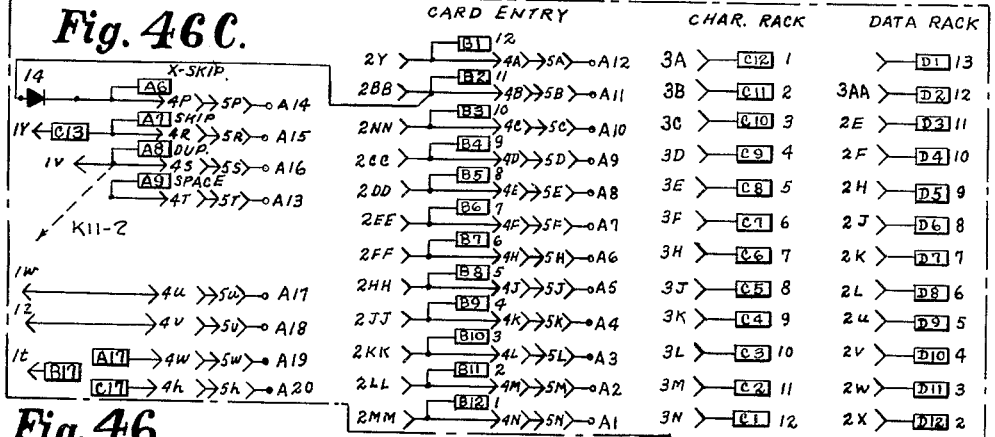
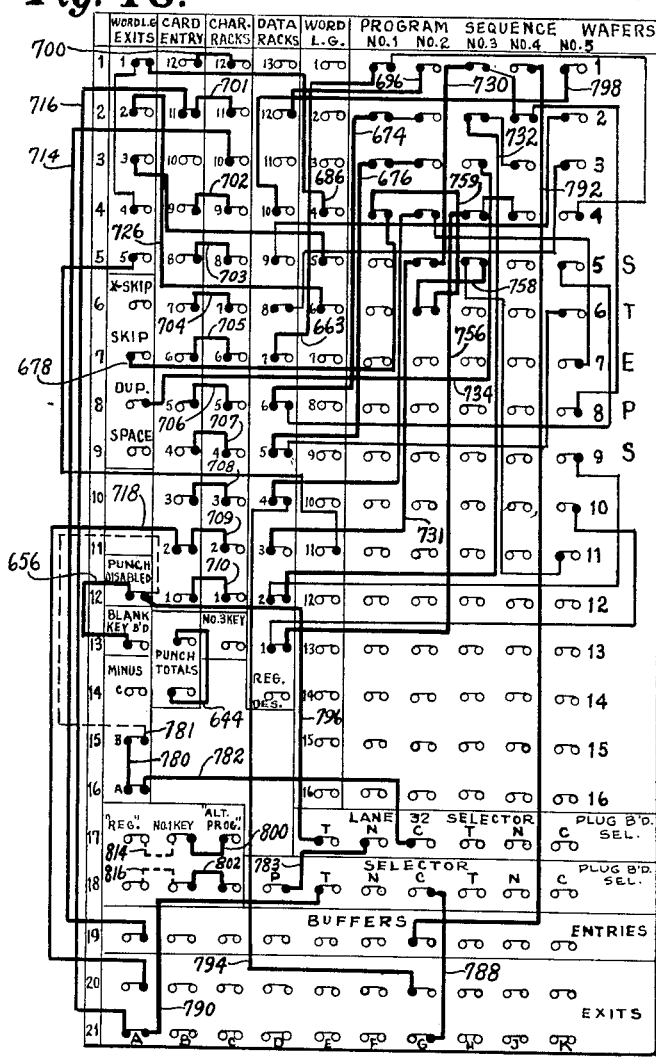
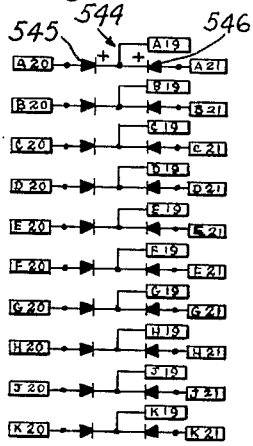
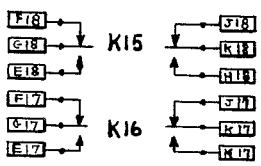
INVENTORS.
JAMES A. THOMAS.
WILLIAM F. MINARD.
BY J. P. Santo
ATTORNEY.

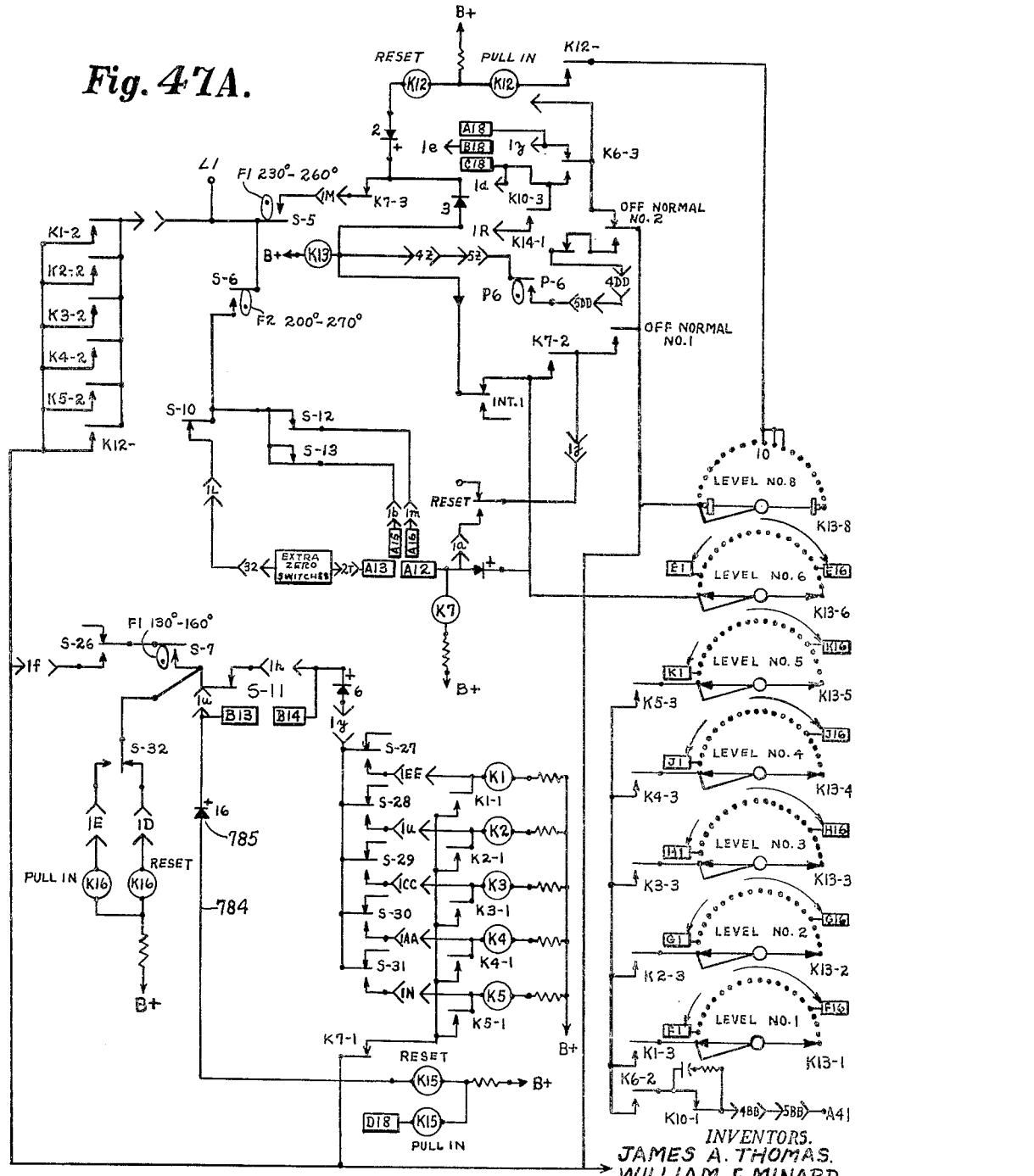

Sept. 5, 1961    J. A. THOMAS ET AL    2,998,914
ACCOUNTING APPARATUS WITH AUXILIARY RECORDING ADJUNCT
Filed Dec. 6, 1956    26 Sheets-Sheet 21

INVENTORS.
JAMES A. THOMAS.
WILLIAM F. MINARD.
BY
JPSanto
ATTORNEY.

INVENTORS.
JAMES A. THOMAS.
WILLIAM F. MINARD.
BY
ATTORNEY.

Sept. 5, 1961 J. A. THOMAS ET AL 2,998,914
ACCOUNTING APPARATUS WITH AUXILIARY RECORDING ADJUNCT
Filed Dec. 6, 1956 26 Sheets-Sheet 26

INVENTORS
JAMES A. THOMAS.
WILLIAM F. MINARD.
BY
JP Santo
ATTORNEY.

United States Patent Office 2,998,914
Patented Sept. 5, 1961

2,998,914
ACCOUNTING APPARATUS WITH AUXILIARY RECORDING ADJUNCT
James A. Thomas, Garden City, and William F. Minard, Plymouth, Mich., assignors to Burroughs Corporation, Detroit, Mich., a corporation of Michigan
Filed Dec. 6, 1956, Ser. No. 626,765
34 Claims. (Cl. 235—60.13)

This invention relates generally to accounting apparatus including a card punch machine of the type employed in punched card data processing systems and a printing type accounting machine of the type adapted to provide a series of accounting operations at different carriage positions thereof, and, more particularly, to electrical control means for operating such a card punch machine directly from an accounting machine.

The invention has for an object to provide improved electrical control means for operating a known make of card punch machine directly from a commercially available form of accounting machine to produce, in addition to the printed journal or ledger record afforded by the accounting machine, an auxiliary record in the form of a punched record card as an automatic output or a by-product of the operation of the accounting machine.

Another object is to provide an electrical control means for apparatus of the above character to produce, in addition to the printed journal or ledger record afforded by the accounting machine, an auxiliary record in the form of a punched record card perforated in accordance with the results of a series of programmed accounting operations performed at selected carriage positions of the accounting machine and of certain alternate functional operations programmed in the card punch machine.

Another object is to provide an electrical control means in apparatus of the above character in which manual functional controls of the card punch machine such as card release, card feed, duplication and skip operations are under the control of the accounting machine.

Another object is to provide accounting apparatus of the above character in which automatic functional controls provided in the card punch machine such as auto-skip and auto-dup. operations are made available for controlling the character and location of the data entered into the punched record card.

Another object is to provide a card punch control unit for an accounting apparatus of the above character that permits duplication of blank columns from a master or read card to the detail card.

Another object is to provide a card punch control unit for an accounting apparatus of the above character in which punching of the detail card from the card punch machine may be disabled in the event of a blank keyboard condition of the accounting machine.

Another object is to provide a card punch control unit for an accounting apparatus of the above character in which punching of the detail card may be disabled on totaling and/or subtract operations of the accounting machine.

A related object is to provide a card punch control unit for an accounting apparatus of the above character that affords a selection from carriage position of preventing punching of the detail card for subtract operations performed at certain carriage positions or providing an overpunch for such operations performed at other carriage positions of the accounting machine.

Another object is to provide a card punch control unit for apparatus of the above character providing control interlocks for preventing premature initiation of operation of the accounting machine during the operation of the card punch program control unit, preventing operation of the card punch program control unit during certain duplication and skip operations and a portion of each punch cycle of the card punch machine, and preventing punching of the card punch machine during the card feed cycle thereof.

Still another object is to provide a card punch control unit for apparatus of the above character which is composed, for the most part, of relatively simple, inexpensive, and commercially available electrical components.

The manner in which the above and other objects are accomplished together with the advantages and features of the invention, will appear more fully from the following detailed description and drawings, wherein:

FIG. 3 is a right side elevation view showing some of the operating components of the accounting machine including the read-out switch unit for reading the positions of the actuator racks thereof;

FIG. 4 is a fragmentary right side elevation view showing the accumulator sections of the accounting machine;

FIG. 5 is a right side elevation view with parts broken away of the mechanism for raising and lowering the read-out switch unit relative to the actuator racks of the accounting machine;

FIG. 6 is a right side perspective view of the switch operating end of one form of actuating rack employed in the accounting machine;

FIG. 7 is a fragmentary left side elevation view with parts broken away taken in the direction 7—7 of FIG. 10 showing the switch actuating element and its associated operating mechanism provided for another form of actuator rack employed in the accounting machine;

FIG. 8 is a perspective view of the switch actuating element of FIG. 7;

FIG. 9 is a rear view taken in the direction 9—9 of FIG. 10;

FIG. 10 is a fragmentary top plan view of the accounting machine with some of the parts thereof shown in broken line;

FIG. 11 is a fragmentary perspective view taken from a rearward position at the left of FIG. 10 and illustrates the bank of read-out switches and a part of the operating linkage of the elevating and retracting mechanism therefor;

FIG. 12 is a sectional side elevation view of one of the extra-decimal switch units of the read-out switch bank;

FIG. 13 is a sectional side elevation view of a duo-decimal switch unit of the read-out switch bank;

FIGS. 14, 15 and 16 are transverse sectional views taken in the direction 14—14 of FIG. 13 showing the internal mechanism of one of the data switches of a switch unit positioned in its various operational phases by an adding rack;

FIG. 17 is a perspective view of a part of the switch mechanism of FIGS. 14, 15 and 16;

FIG. 20 is a sectional view taken in the direction 20—20 of FIG. 23 illustrating the program control panel and the electrical switches associated with the auxiliary control lanes thereof;

FIG. 21 is a fragmentary bottom plan view taken in the direction 21—21 of FIG. 20 to illustrate the auxiliary program panel for the electrical control lanes;

FIG. 22 is a fragmentary right side elevation view of the carriage control disabling lever and a sectional view of its associated switch provided in the accounting machine;

FIGS. 28 and 29 are right side elevation views with parts broken away taken in the direction 28—28 of FIG. 10 to illustrate the operating linkages associated with the minus indication switches employed in the accounting machine;

FIG. 32 is a diagrammatic illustration of the electrical connections to the various terminal boards contained in the accounting machine;

FIG. 33 is a diagrammatic illustration of the various cable connectors and cables interconnecting the basic units of the accounting apparatus of the present invention;

Figure 43:
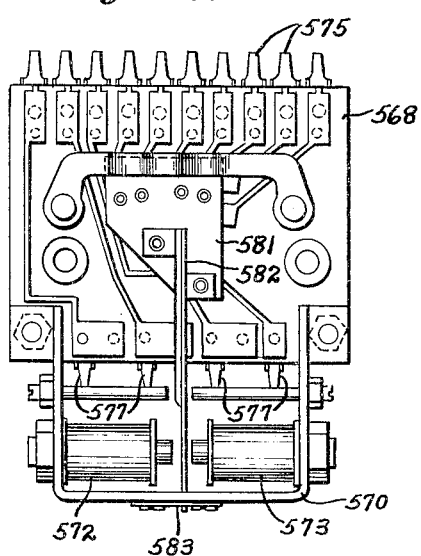
Figure 45:
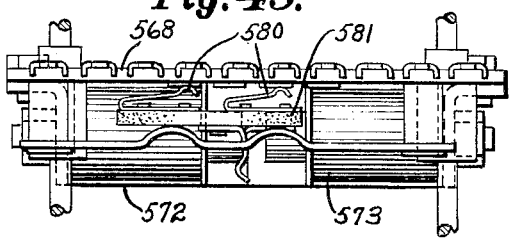
Figure 44:
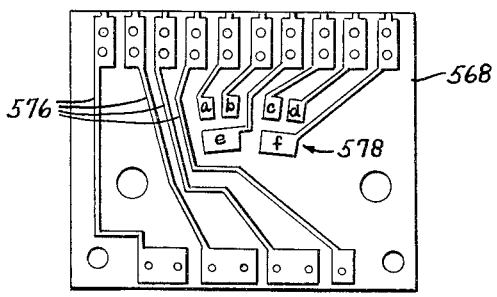
Figure 49A:
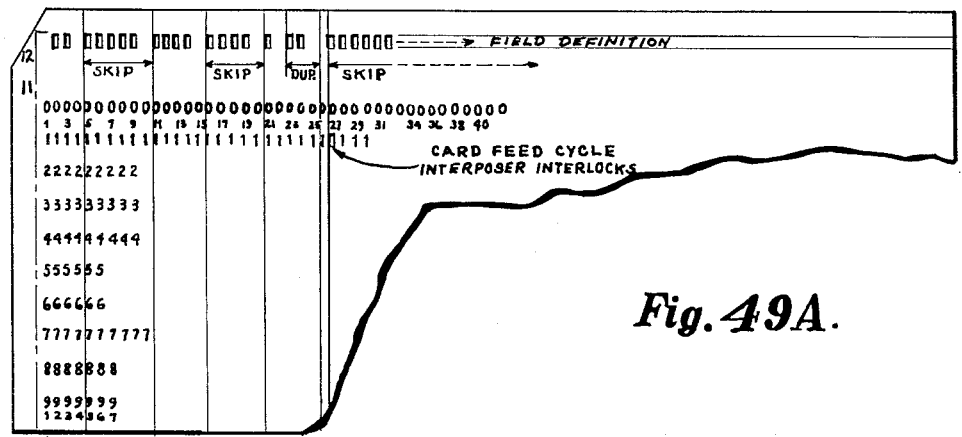
Figure 50A:
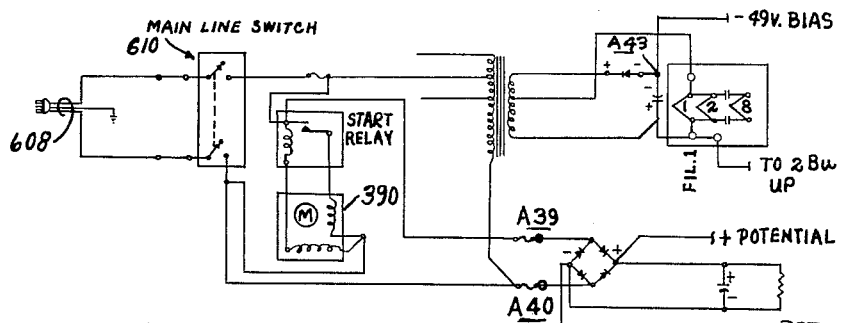
Figure 50B:
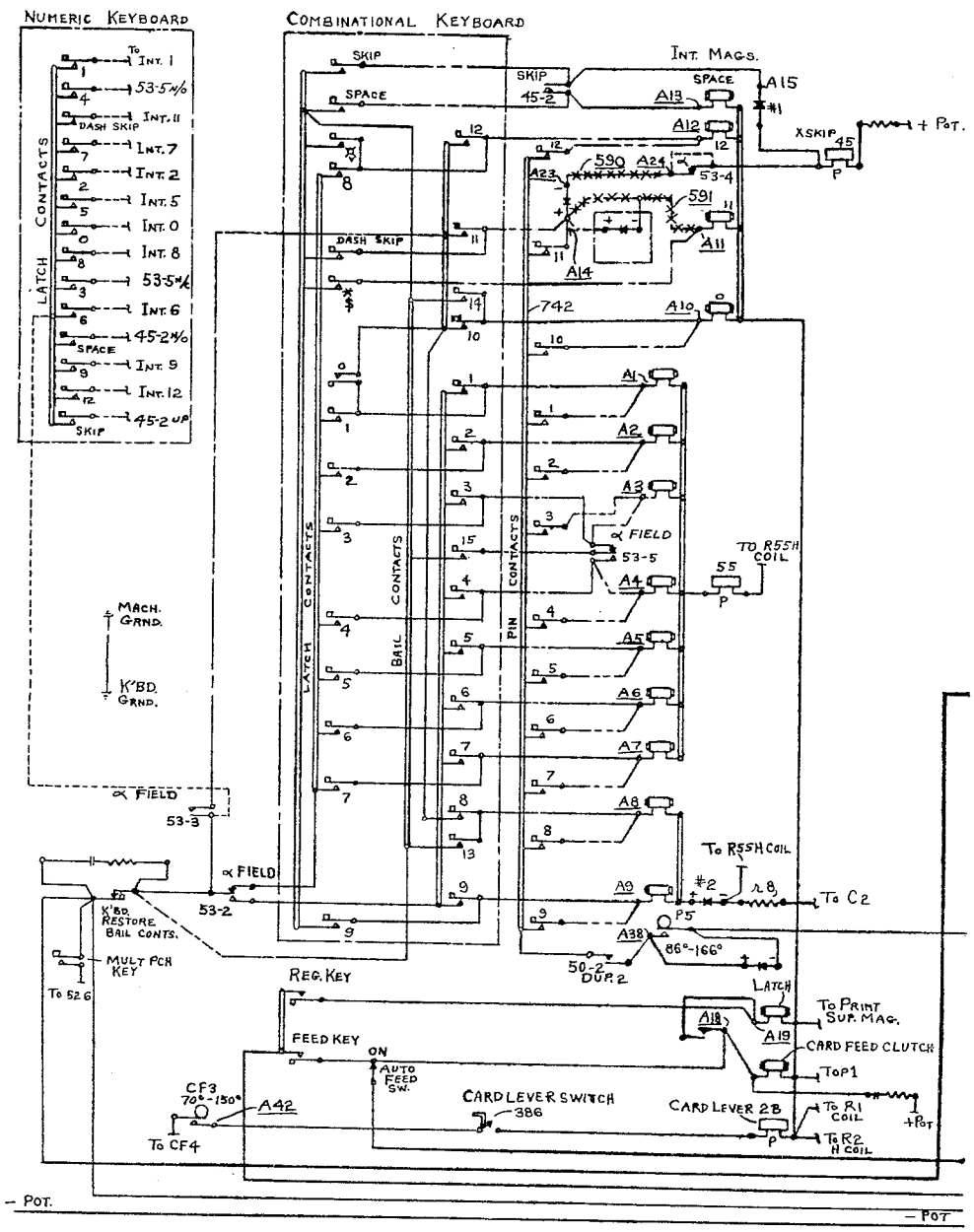
Figure 50:
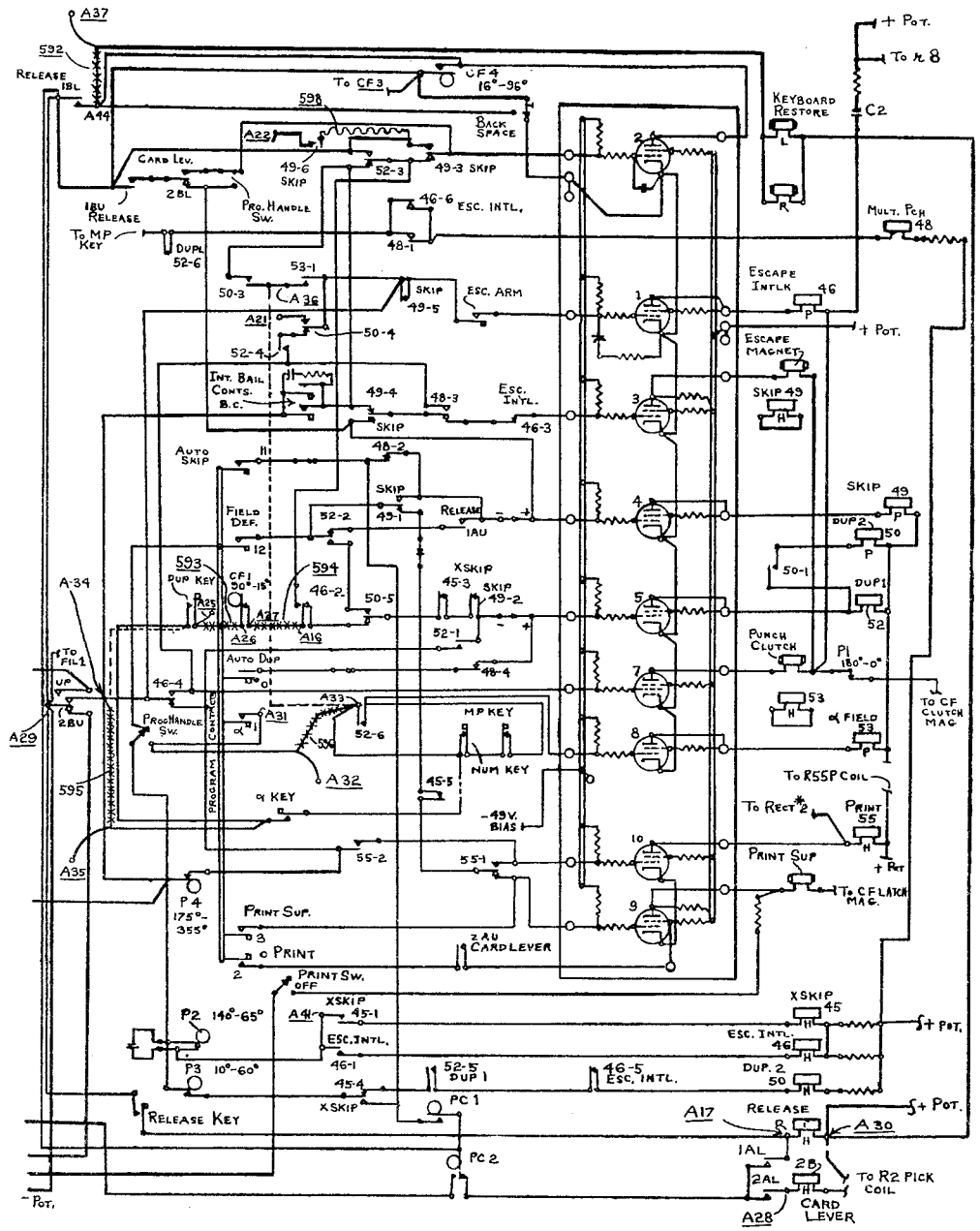

FIGS. 43, 44, and 45 illustrate another form of relay employed in the card punch control unit;

FIG. 46 is a view of the control or patch board employed in the card punch control unit;

FIGS. 46A, B and C are schematic diagrams illustrating the control wiring connected to the rear of the control board;

FIGS. 47A and B illustrate the schematic circuit diagram of the card punch control unit;

FIGS. 48A, B and C are timing charts of control components contained in the accounting machine and the card punch machine;

FIGS. 49A and B illustrate a pre-punched program card and a punched detail card used in describing the operation of the present invention;

FIGS. 50A, B and C illustrate the schematic electrical circuit diagram of a card punch machine used in the accounting apparatus of the present invention; and FIGS 51A and B are based on FIGS 47A, 47B, 50A, 50B, and 50C and constitute a simplified schematic electrical circuit driagram of the control system of the present invention to which reference will be made to describe the general operation of the present invention.

By way of introduction, the accounting apparatus described herein includes three basic components; an accounting machine 10 of the type set forth in U.S. Patent 2,629,549, issued to T. M. Butler for an Automatic Function Control Mechanism for Accounting Machines and U.S. application S.N. 604,191, filed August 15, 1956, for an Accounting Machine With Recording Apparatus in the names of G. A. Baird and T. A. Dowds; a card punch machine 12 of the type set forth in U.S. Patents 2,647,581 and 2,753,789 issued to E. W. Gardinor et al. for a Record Card Punching Machine; and a card punch control unit 14 which is electrically connected to the accounting machine through a cable 16 and to the card punch machine by a separate electrical cable 18. Except for the latter unit, the remaining two components are well known commercially available machines.

The accounting machine may be a Burroughs style F–MC, Series F50 "Sensimatic" Accounting Machine having a motor driven carriage on which is mounted a paper carrying platen adapted to receive printed impressions from a printing section coupled to an array of actuator or data racks and accumulator sections are are controlled from a keyboard and from an automatic control panel which is carried by the carriage. Other styles of accounting machines also could be employed.

The card punch machine may be an IBM Card Punch machine having a card feed unit, a punching unit, and a reading unit controlled through a keyboard and a program unit, which includes a pre-punched program record card carried by a program drum on the machine.

The card punch control unit, which is the main instrumentality for programming the card punch machine to the accounting machine, includes in general a program selector unit operable in response to selected carriage positions of the accounting machine; a program scanning unit including an electro-magnetic stepper switch having a plurality of sequence wafers for program, word length sensing, and timing purposes; a control board through which the card punch machine is programmed to the accounting machine and from which the program sequence wafers are connected to the punching unit of the card punch machine through a memory or arrangement of read-out switches associated with the actuator racks of the accounting machine; and various control relays for control transfer and timing interlock purposes.

The apparatus is prepared for operation by inserting a selected control panel into the carriage of the accounting machine, patch wiring the face of the control board in the card punch control unit in accordance with the control programs desired at the various carriage positions of the accounting machine, and placing a pre-punched program card on the program drum of the card punch machine to effect desired automatic functional controls over the punching from the card punch machine. The main line switch on the card punch machine is closed and the "Punch" key and the carriage control disabling lever on the keyboard of the accounting machine are actuated to energize the system, transfer control to the accounting machine, and lock up the keyboard of the card punch machine. A "Punch" on signal lamp, a "Lock" or no-card indication signal lamp and an audible buzzer, all of which are contained in the accounting machine, are energized to indicate these conditions.

The operator may then depress the manual card feed key provided on the accounting machine to energize the card feed unit of the card punch machine and release a card from the card hopper into the card bed where it is advanced to the pre-registration position. Subsequent actuation of this key feeds a second card from the hopper to the pre-registration position and advances the first card to the registration position at which time the "Lock" or no-card signal lamp will be extinguished and the buzzer de-energized to indicate that the system is ready for an accounting cycle.

The information in the accounting machine is represented by the differential mechanical positions of the actuator racks which are controlled by the accumulators and indexing keys, and is read out by the sensing switch units which activate selected electrical circuits connected to the punch operating interposers of the card punch machine. After this information is introduced into the accounting machine, a motor bar is depressed or actuated to initiate an accounting cycle during which the program selector means of the card punch control unit is selectively energized to select a control program and a solenoid machine block is applied to lock up the accounting machine and prevent initiation of a subsequent accounting cycle.

In the event that a totalling operation is called for at this carriage position, the program selecting circuit may be disabled to prevent selection of a program and punching on totalling operations. Punching may be also prevented on subtract operations and in the event of a blank keyboard condition where no keys are depressed. However, the card can be punched for any of these conditions through wiring of the control board of the card punch control unit, and, if further desired, an overpunch may be provided to indicate the punching of a subtract operation.

During this accounting cycle, the stepper is actuated from the accounting machine and is advanced to its first step or contact position. If there is no blank keyboard condition and a totalling or subtract operation is not programmed or indexed at this carriage position, a circuit from one side of a power supply is completed through the first step or contact of the program sequence wafer selected by the program selector means and through the plugboard of the control unit to the common or input terminal of one of the read-out switch units associated with a designated actuator rack of the accounting machine. Depending upon the differential position of this rack, the circuit is then completed through one of the individual data output switch contacts of the said one of said read-out switch units to one side of the appropriate punch controlling interposer, which is provided in the card punch machine and is connected to the other side of the power supply, thereby to initiate a card escapement and punching cycle therein. After the card is punched, the stepper is advanced under the control of the card punch machine to its next step or contact position to read the position of another actuator rack and initiate another card escapement and punching cycle. This action continues until all of the actuator racks of the first accounting program are read, the end of which condition is sensed by a "Word Length" sequence wafer of the stepper switch to cause the stepper to "home" to its home position.

A timer, constituted by still another sequence wafer of the stepper switch, keeps the accounting machine locked until the stepper has advanced to a position during its homing operation such that it will have time to home if the accounting machine is operated for another accounting cycle before the stepper has finally reached its home position. Other interlocks are provided to prevent operation of the stepper of the control unit and to prevent or delay energization of the card punch interposer magnets during the card feed cycle, certain duplication and skip operations and during a portion of each punching cycle of the card punch machine, as brought out more fully hereinafter. Skipping and duplication operations can be initiated manually from the Skip and Dup. keys on the accounting machine during certain portions of the system cycle and automatically at any time during the operation of the control unit by programming either from the stepper of the control unit or directly from the card on the program drum of the card punch machine.

Figure 1:
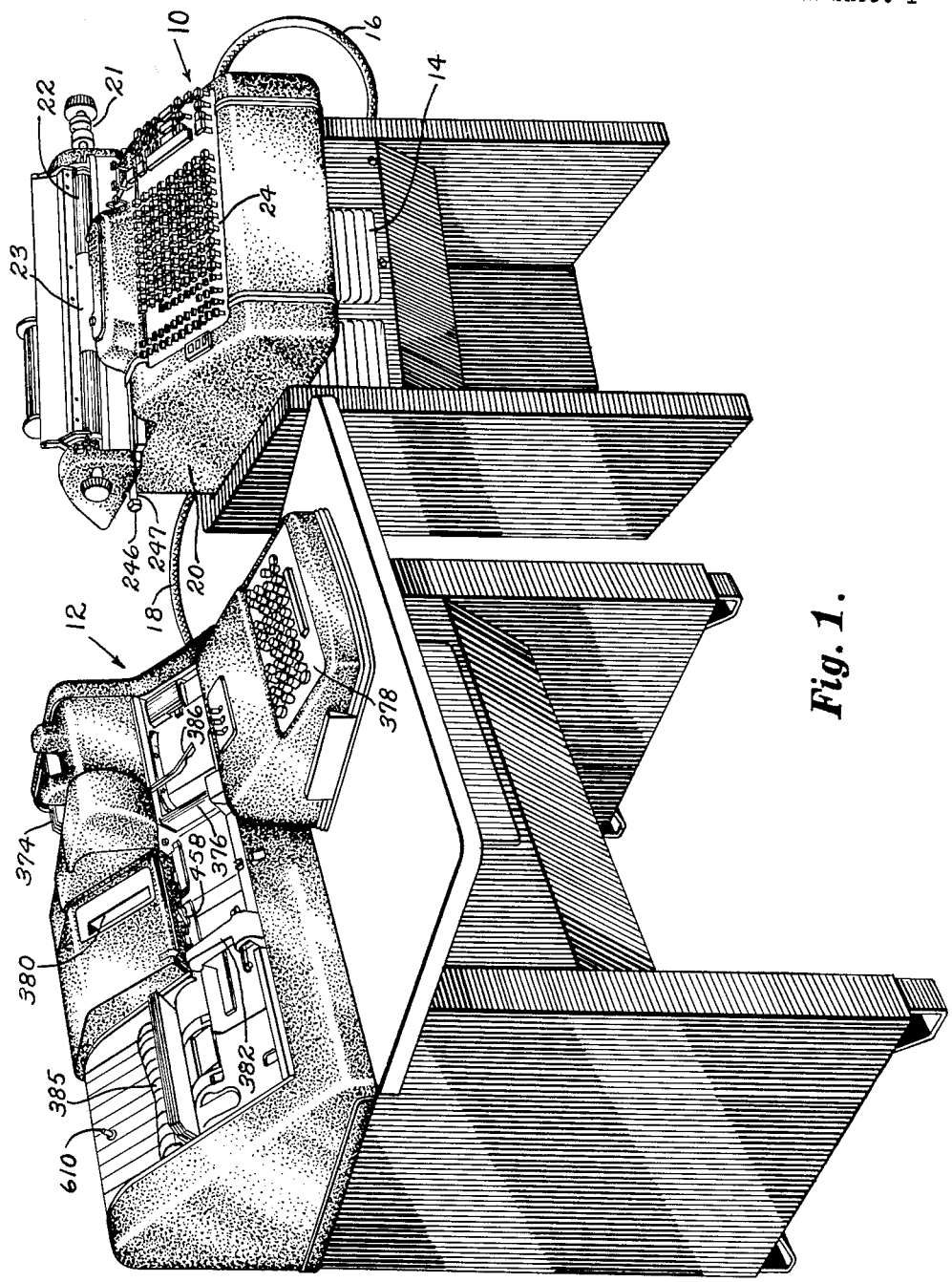
FIG. 1 is a perspective view of a card punch machine and an accounting machine which are interconnected through the card punch control unit of the present invention.
Figure 2:
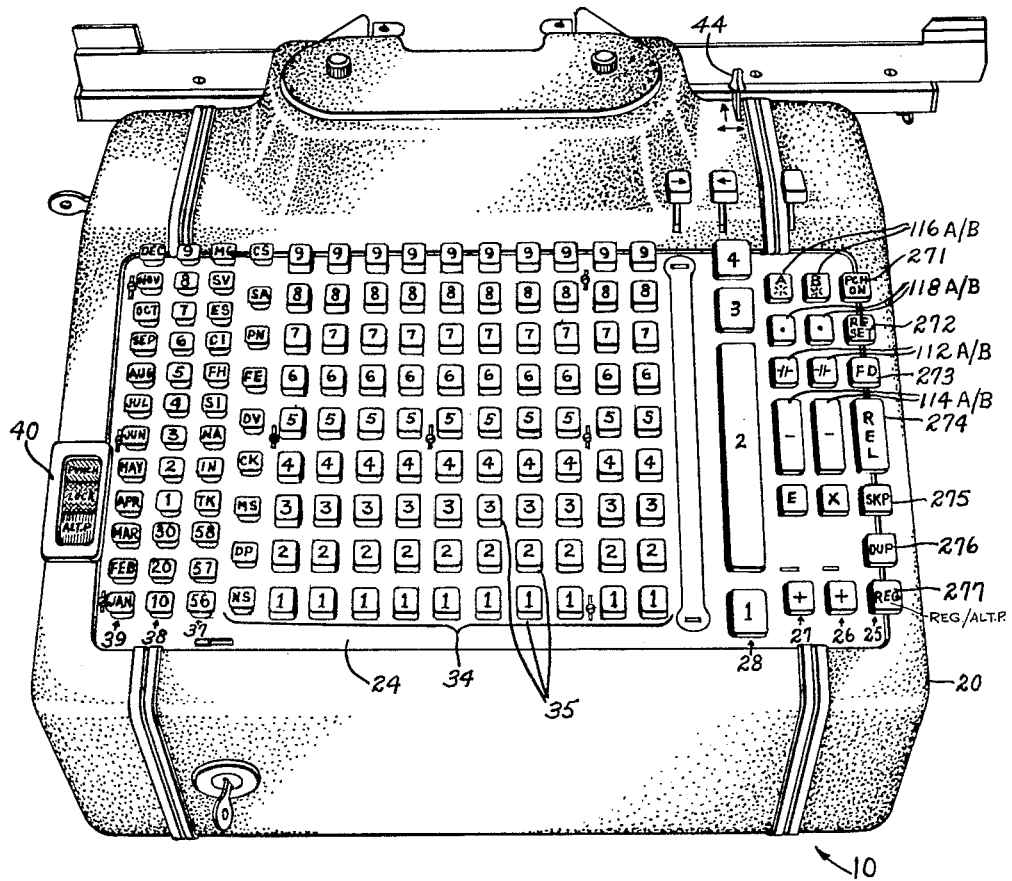
FIG. 2 is a perspective view of the accounting machine showing principally the keyboard thereof.

With reference to FIGS. 1 and 2, the accounting machine 10 comprises, in general, a fixed base member 20 upon which is mounted a movable carriage 21 having a platen 22 upon which a recording member 23 may be rolled to receive printed impressions. The base unit of the machine carries a keyboard 24, the keys of which are depressible to insert information into the machine.

The keyboard 24 generally is like that shown in the aforesaid Butler patent and includes on the right hand side of the keyboard three columns 25, 26, and 27 of functional control keys, column 25 of which has been added to the keyboard of the Butler machine; a column 28 containing 4 motor bar keys; a central area 34 of of eleven columns of information insertion keys 35 each of which columns contains nine keys; and three key columns 37, 38, and 39 which are located on the left hand side of the keyboard, each containing twelve keys for insertion of various kinds of other information into the machine. On the left hand side of the machine, a series of signal lamps 40 is provided for indicating different operating conditions or malfunctions of the apparatus. Located on the right of the machine above the keyboard is a lever 44 which functions to disable or normalize the automatic control apparatus included in the Butler machine and also to control the application of power to the control unit of the present invention.

With reference to FIG. 3, when one of the amount keys 35 of one of the eleven columns 34 of information keys is depressed, it is retained in that position by a keyboard locking slide 58. Depression of a motor bar of column 28 or a control key of columns 26 and/or 27 closes an energizing circuit for an electric drive motor 60 and engages a drive clutch 61 to allow the motor to rotate the main cam shaft 62, as explained more fully in connection with FIGS. 21–23 of the Butler patent. Rotation of the cam shaft results in movement of an index strip 64 rearwardly of the machine to limit on the stem of the depressed key and rotates an index or stop sector 65 clockwise into the path of a formed ear 66 provided on a horizontally reciprocable actuator also called a data rack 68 associated with the column of keys containing the depressed key. Continued rotation of the cam shaft 62 advances an actuating bail 69, which passes transversely through and moves all of the actuator racks, causing the aforesaid actuator rack to move forward to limit on one of the steps 65a of the index sector 65 corresponding to the key that is depressed. When the actuator rack limits on a step of the index sector, the actuating bail 69 cams a pawl or latch 72 pivotally mounted on the rack 68 upwardly to locate a stud 73 carried by the pawl into a tooth space 74 of a stationary lock plate 76, thereby locking the actuator rack in its indexed position.

A vertically extending print bar 80 having a plurality of transversely movable type slugs 82 is provided for each actuator rack, forward movement of which rotates a bull gear 84 of a gear cluster unit 85 which is located below the actuator racks. Gear 84 meshes with a series of rack teeth 86 formed on the lower end of a print bar for the actuator rack associated with the aforesaid depressed key column. Rotation of the gear raises the print bar a vertical distance related to the movement permitted of the actuator rack by the depressed key and automatically places the selected digit type slug 82 into printing position. To the left of the print bars are a plurality of pivotable hammers 88, one of which is provided for each of the print bars. At a point in the machine cycle subsequent to the termination of the forward movement of the actuator racks and the upward movement of their print bars, the hammers 88 are caused, in a manner more fully described in the above identified Butler patent, to rotate clockwise and to drive a selectively aligned slug of printing type rearwardly into the recording medium interposed between the type slugs and the platen.

After the printing operation takes place, the add racks 68 and type bars 80 are restored to normal by the rearward movement of the actuating bail 69 under the control of the main cam shaft.

In order to accumulate successive amounts entered into the machine, the accounting machine is provided with one or more accumulators or totalizing mechanisms, such as is shown at 90A and 90B in FIGS. 3 and 4. The accumulators will be recognized as being of the so-called "cross-footer" variety from which plus and minus totals and subtotals may be taken. It will be appreciated that accumulator 90B could be of the multiple-register variety and that more than two accumulators could be employed, depending upon the model of the machine.

As described more fully in the Butler patent, each of the illustrated accumulators includes, respectively, two sets of inter-meshed pinions 92A, 94A, and 92B, 94B; a bifurcated arm 96A, 96B having a lower hook arm 98A, 98B and an upper hook arm 100A, 100B; an accumulator meshing arm 102A, 102B; and an internal cam member one of which is shown at 104A through which one or the other set 92A or 94A and 92B or 94B of the pinion sets associated with each accumulator may be positioned to mesh with the actuator racks. The accumulator pinions are rocked upwardly during a part of the machine cycle by one of several add, subtract/total, or sub-total control slides 106, 108, and 110, which are provided on the right side of the machine and are reciprocated forwardly and rearwardly thereof from the main cam shaft 62 as shown. As described in the Butler patent, the lower arms 98A and 98B of the accumulator meshing hooks 96A and 96B normally are engaged with the add control slide 106, rearward movement of which pulls the hooks to the right to rock their associated meshing arms 102A and 102B clockwise and engage one of the pinion sets, say 92A and 92B, of A and B accumulators with the actuator racks after the latter have moved forwardly. Thus, when the actuator racks move rearwardly, the pinion sets of both accumulators will be turned in one direction and amounts entered in the keyboard will add simultaneously in and be stored in both accumulators, unless one or the other accumulator is in non-add condition as controlled from the non-add keys 112A, 112B of the result key columns 26 and 27 or from the automatic machine controls.

Subtract operations may be initiated automatically from the carriage controls or manually from the subtract keys 114A, 114B of columns 26 and/or 27. Depression of either one or both of these keys disengages the lower hook arms 98A and 98B of either one or both of the bifurcated arms 96A and 96B from the add control slide 106 and causes the upper hooked arms 100A and 100B thereof to engage the subtract control slide 108. Rearward movement of the subtract slide 108 positions the same set of pinions 92A and 92B of the accumulators for engagement with the actuator racks, which, upon their subsequent forward movement, turn the pinions of both accumulators in the opposite direction from which they were turned during the aforesaid add operation. As described more fully in the Butler patent, the subtract control slide moves forwardly prior to the return movement of the actuator racks and disengages the pinions therefrom.

On non-add operations, which may be indexed manually from either one or both of the non-add keys 112A and 112B of the keyboard or automatically from the carriage controls, the hook arms 96A and 96B do not engage any of the control slides and the pinions are not meshed with the adding racks. Accordingly, no amounts are accumulated.

Reference should be made to the Butler patent for a description of the operation of the machine on totalling and subtotalling operations which may be indexed manually from the total keys 116A, 116B and sub-total keys 118A, 118B or automatically from the carriage controls.

In the rearmost position beneath the differential actuator racks 68, there is now provided a static memory unit in the form of a read-out switch assembly 120 (FIG. 3, 5 and 11) that is settable by coded switch actuator means, which are provided on various ones of the actuator racks, in accordance with the differential position to which the racks are indexed in that machine operation. After being so set, the switch assembly retains such setting until set in accordance with a different amount in a subsequent machine operation. The switches in the assembly 120 are connected in circuits which control the energization of selected punch operating interposer magnets of the card punch machine, as hereinafter described.

The actuator racks associated with the eleven columns of amount insertion keys 34 are of the so-called 10 pitch variety. Secured to the rear portion of each of these racks is a coded slide 122 having a pair of flanged switch setting or actuating members 124 and 126. Each of the downwardly extending portions of the flanged members 124 and 126 is provided with one of a pair of forwardly and rearwardly spaced switch operating projections 128a and 128b and with one of a corresponding pair of forwardly and rearwardly spaced notches 130a and 130b, respectively laterally aligned with the projection 128a and 128b of the other switch setting member as illustrated in FIG. 6.

The actuator racks associated with the keys in the three 12 key columns 37, 38, and 39 of FIG. 2 are of the so-called 12 pitch variety, a fragmentary portion of one of which is shown at 68a in FIG. 7 as having a plurality of rack teeth 134 provided on the upper edge proximate the rear portion thereof. Spaced laterally from the 12 pitch actuator rack that is associated with the twelve key column 37 on the left side of the keyboard is an auxiliary rack 136 having a coded slide 138 comprising a pair of flanged switch setting or actuating members 140 and 142 secured to the lower edge thereof. Each of the downwardly extending portions of the flanged members 140 and 142 is provided with one of a pair of forwardly and rearwardly spaced switch operating projections 144a, 144b, and with one of a corresponding pair of forwardly and rearwardly spaced notches 146a, 146b, respectively laterally aligned with the projection 144a and 144b of the other switch setting members, as illustrated in FIG. 8. A series of rack teeth 148, which are of lesser pitch than that of the teeth 134 on the 12 pitch actuator rack 68a, is provided on the upper edge of the auxiliary rack 136 through which it is adapted to be horizontally reciprocated by a gear 150 that is secured to a shaft 152. Shaft 152 is journaled in a bracket 154 extending from a framing angle 155, which extends between a pair of side frames 156, 157 of the machine, and is driven by a larger gear 158 thereon which meshes with the teeth 134 on the reciprocable 12 pitch actuator rack 68a, as shown in FIG. 9.

It will be appreciated that the incremental movement of the 12 pitch actuator rack 68a is less than that of the 10 pitch racks 68. By the use of the auxiliary rack 136 and its actuating mechanism, the coded slide 138 associated with the 12 pitch actuator rack is made to have an incremental movement compatible to that of the 10 pitch actuator racks. In this manner, read-out switches with the same actuating pin spacings may be employed for both forms of actuator racks.

As illustrated in FIGS. 10 and 11, the switch assembly 120 includes a perforated top plate 160 which extends transversely under all of the coded slides and is supported at its ends by a spaced pair of forwardly extending support arms 162, 163, which are pivotally mounted on studs, one of which is indicated at 164, to the side plates 157 and 156 of the machine frame and form part of the mechanism for indexing the switch assembly 120 against the coded slides of the actuator racks, as will be later described. The plate 160 is formed with a plurality of laterally spaced, double row sets of holes 166, which are aligned with the downward flanges of the switch operating members 124, 126 and 140, 142 of the coded slides 122 and 138 associated with 10 pitch and 12 pitch actuator racks.

Figure 18:
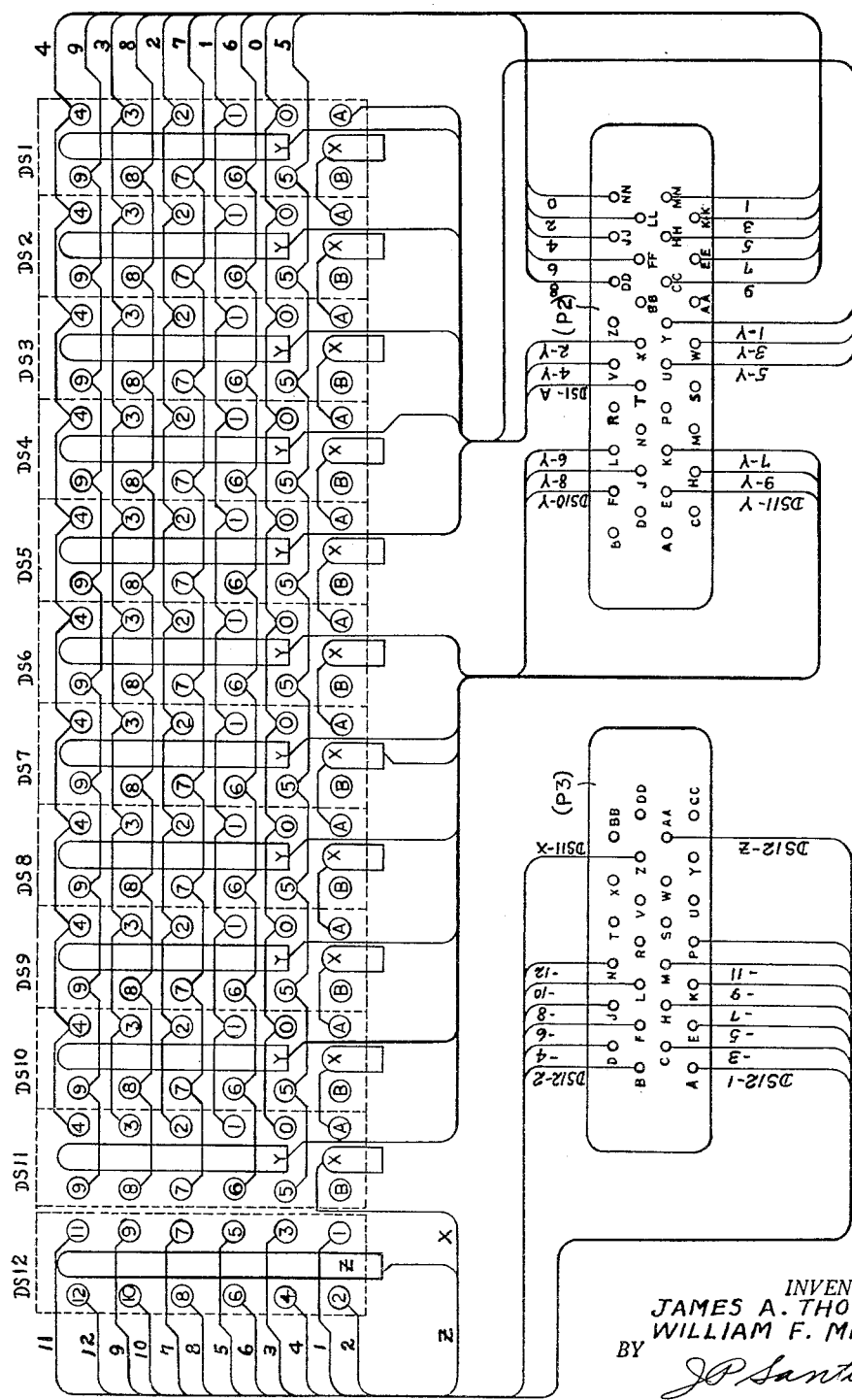
FIG. 18 is a diagrammatic view illustrating the input and output terminals and wiring of the read-out switches and their connections to their associated outlet plug connectors.

In each of the holes 166 is a vertically reciprocable switch operating plunger pin 168. Each hole or pin of each row is spaced longitudinally from an adjacent hole or pin in accordance with the longitudinal spacing of the successive differential positions of the actuator racks. Each of the individual rows of each pair of rows associated with a ten pitch rack includes five longitudinally spaced holes. Each of the rows associated with a twelve pitch rack contains six similarly spaced holes. The quantities indexed or set into a switch when a projection on one of the flanged members of a coded slide is over a pin are indicated in FIGS. 11 and 18. In the "0" position of the rack 68, for example, the projection 128a of the flanged member 126 of a 10 pitch slide will be directly over the rear most or "0" pin of the row of holes aligned with flange 126 as indicated in FIG. 3 and, in the intermediate or "5" position of the rack, the projection 128b of the other flanged member 124 of the same slide is directly above the rearmost pin of its respectively aligned row as indicated in FIG. 11. In the initial position of the 12 pitch actuator rack 68a, the projection 144a of flanged member 142 is directly over the rearmost pin of its aligned row to index a "1" in its associated switch as indicated in FIG. 7.

On the underside of the plate 160, there is provided a series of twelve multiple switch units 170 which are fastened thereto as by straps 171, as shown in FIG. 11. Each switch unit comprises a plurality of three position toggle switches of the type disclosed and claimed in patent application Serial No. 480,266, filed January 6, 1955, and now abandoned, in the name of William W. Deighton. Each multiple switch unit comprises a rectangular block 172 of insulating material formed with a plurality of upwardly opening switch compartments 174, one of which 174a at the rear or left of the block is somewhat greater than twice the thickness of the other compartments 174b so as to accommodate either a double plunger toggle member 176a of FIG. 12 or a spaced pair of the single plunger toggle members 176b as indicated in FIG. 13.

The form of switch unit illustrated in FIG. 13 includes six separately actuable S.P.D.T. switches and is termed a duo-decimal switch, since it affords a selection of any one of 12 different output circuit paths therefrom. One of these switches is provided for the 12 pitch actuator rack 68a associated with the 12 character designation keys of key column 37 of FIG. 2 and will be recognized by the 12 operating pins or plungers 168 associated therewith. The form of switch unit illustrated in FIG. 12 includes four S.P.D.T. switches and one D.P.D.T. switch and is termed an extra-decimal switch by reason of the extra set of switch contacts provided for one of the five separately actuable switch components thereof. One of these switching units is provided for each of the ten pitch actuator racks 68 and is recognized by the 10 operating plungers 168 associated therewith.

While only one duo-decimal switch set is used in the present illustrated embodiment of the invention, it should be understood that others may be provided, depending upon the use of the machine. In fact, the perforated top plate 160 of the present machine provides reserve space at opposite ends of the plate for two additional duo-decimal switches, as indicated at 177 and 178 in FIGURE 10. It is possible, of course, to position all the duo-decimal switch sets desired at one end of the bank of switches, but for reasons of convenience, one space 177 has been provided on the right side of the plate in FIG. 10.

With reference to FIGS. 12, 13 and 18, the extra-decimal switch units will have two input or common terminals X and Y and twelve output contacts or terminals. Ten of these output terminals, labelled 0 through 9, are associated with input terminal Y and correspond to the digital positions of the ten pitch actuator racks 68 and constitute the decimal switch proper. The extra two output terminals, labelled A and B, are associated with input terminal X and are used for sensing the presence of a blank keyboard condition, as will be discussed hereinafter. The duo-decimal switch set has but a single input or common terminal Z and twelve output contact terminals, labelled 1 through 12 corresponding to the 12 positions of the 12 pitch actuator rack, as indicated in FIG. 18, which illustrates the wiring of the various switches of the switch assembly.

The toggle members 176a, 176b located in each switch compartment are free to rock on a rod 182 supported in the ends and in the transverse walls of a block. Each of the single toggle members 176b has an insulating body, which contains a spring urged plunger 184 pressed downwardly against a double armed switch blade 186 and is formed with a pair of upwardly facing shoulders 188 and 189 on opposite sides of the rod 182 for engagement by a respective pair of switch operating plunger pins 168 of the paired rows of pins provided for the various racks, as illustrated in FIGS. 14, 15, and 16.

As best shown in FIG. 17, the switch blade 186 has a contact button 192, 193 at the outer end of each of its two upwardly diverging contact arms 194 and 195, respectively, and is rockably supported in a cradle member 196 formed on the upper end of a central contact post 198. Post 198 passes through the bottom of the block 172 and is connected with one of the above mentioned input terminals X, Y or Z shown as central connection strips secured to the underside of the block by the upset lower ends of various ones of the central contact posts 198 of each block. Located on opposite sides of each contact post 198 is a pair of contacts 200, 201 each united with the head of a pin 202, 203, passing through the bottom of the block and connected with an individual terminal connection such as lug 204 which is secured to the underside of the block and forms one of the output terminals thereof.

The double toggle member 176a contained in the double compartment 174a of the extra-decimal switch unit of FIG. 12 is provided with only a single pair of operating plunger pins 168 but simultaneously actuates a pair of double throw switches, each of which has a separate double armed switch blade and a separate pair of output contacts similar to the switch blade 168 and output contacts arrangement described above. One of the two sets of output contacts associated with the double toggel actuator forms the "0" and "5" output paths of the extra-decimal switch, while the other set of contacts located at the rearmost end of the block of FIG. 12 is used to provide a separate output circuit path for the zero or blank keyboard sensing control circuit employed in the card punch control unit described later herein.

More specifically, when the switch assembly 120 is indexed against the coded strips of the actuator racks by means yet to be described and when an extra decimal switch is indexed against a 10 pitch actuator rack which is in its "0" or "no key depressed" position, the output terminal A of the extra set of switch contacts of one of the switches actuated by the double toggle member 176a will be connected to its input terminal connection strip X, and the "0" output contact of the other set of switch contacts associated with the same double toggle member will be connected to input terminal connection strip Y. The other output terminal, B, of the set of extra-decimal switch contacts, will not have any electrical connection made to it and is not employed. In the other key depressed conditions of a 10 pitch rack, one of the remaining 9 output terminals, 1 through 9, of the extra-decimal switch will be connected to the input terminal connection strip Y. In the duo-decimal switch unit, one of the twelve output terminals, 1–12, corresponding to the key depressed in column 37 will be connected to its output terminal Z when the switch unit is indexed against the coded slide 138 of the auxiliary rack 136 associated with the 12 pitch rack.

The switch assembly 120 is adapted to be rocked from its retracted opsition shown in FIG. 3 to its elevated position shown in FIG. 5 in which it is indexed against the coded slides 122 and 138 of the various actuator racks through the following mechanism which includes the aforementioned support arms 162, 163.

With reference to FIGS. 3, 5, 10 and 11, each of the supporting arms 162, 163 for the switch assembly 120 carries on its outer side a cam follower roller 212, 213 engaged in a cam slot 214, 215 in a cam arm 216, 217 secured on a transverse shaft 218 which is journaled in and extends outwardly through the lower edges of the machine frame plates 156 and 157.

An arm 220, secured at its lower end to the projecting left end of the shaft 218, is pivotally connected at its upper end to the rear end of a link 222. The latter is pivotally connected at its forward end to the lower end of the downward arm of a bell crank 224 pivotally mounted on a stud 226 that is secured to the outer side of the left side plate 157, as indicated in FIG. 10. As best shown in FIG. 5, the two arms of the bell crank 224 carry on the opposite sides of the crank a pair of rollers 228 and 229 cooperating with respective ones of two cam discs 230 and 231 secured on the left end of the main cam shaft 62 which rotates through one full revolution in each cycle of operation of accounting machine as disclosed in the Butler patent.

The parts are so arranged that in about 154° to the 187° portion of the accounting machine cycle, that is, while all the differential actuator racks are stopped in their amount differential positions, the cams 230 and 231 rock the bell crank 224 clockwise to pull the link 222 forwardly and rock the arm 220, shaft 218, and cam arms 216, 217 counterclockwise to elevate the rollers 212, 213 and the support arms 162, 163 about the pivot studs 164, thereby raising the switch assembly 120 to press all of its switch operating pins 168 against the downward flanges of the coded slides 122 for the 10 pitch actuator racks 68 and auxiliary slide 138 of rack 68a. As the switch assembly rises, one or the other of the projections 128a, 128b and 144a, 144b of the coded slides associated with each of the racks will engage and depress one switch operating pin 168 for each of the switch block units.

While the toggle members 176a, 176b are in their central positions, their spring biased plungers 184 press against the centers of the respective switch blades 186 in the vertex of the angle between the two contact arms 194, 195 of each blade and hold the switch blades in their centered open positions, as shown in FIG. 15. Upon depression of either of its operating pins 168, say the left pin in FIG. 14, by a projection on a coded slide, the toggle member is rocked to shift its plunger onto the right arm 195 of its switch blade member 186 and press the contact 193 carried thereby against the associated output contact 201. Upon depression of the opposite or right plunger pin, the toggle member is rocked in the opposite direction to engage its left switch arm 194 with output contact 200 and elevates the left plunger pin 168 into the notch in the opposite switch operating member of the coded slide associated with that switching unit as shown in FIG. 16. All of the remaining switch operating pins 168 are engaged by the downward flanges of the coded slide of switch operating members and, together with their toggle members are returned to normal position to return their associated switch blades 186 to their center or open position.

After such setting of the individual switches of each of the switch blocks in accordance with the amount indexed on their associated actuator racks, the cams 230 and 231 return the bell crank 224, link 222 and shaft 218 to normal position, lowering the switch assembly during about the 187° to 210° portion of the accounting machine cycle before the return of the actuator racks toward their normal or home position.

Figure 19:
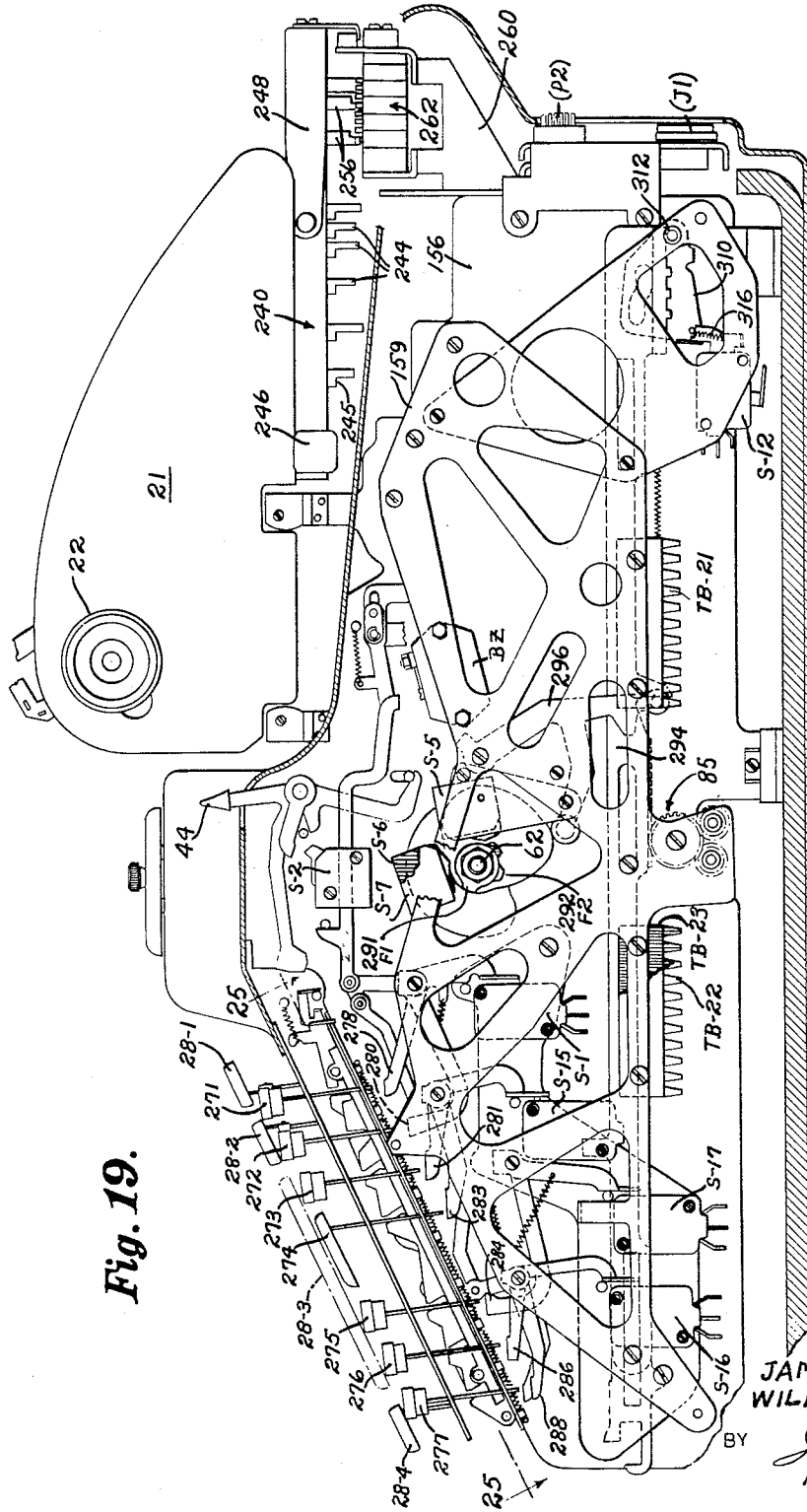
FIG. 19 is a right side elevation view with parts broken away taken in the direction 19—19 of the accounting machine of FIG. 10.

With reference to FIGURES 19, 20 and 21, the accounting machine 10 is provided with an automatic function selection program unit 240, which is readily removably supported on the movable carriage 21. This unit is constructed in accordance with that shown in FIGURES 155 and 156 of the aforesaid Butler patent to which reference should be made for a full and clear description of the function, construction and operation thereof.

Basically, the program unit comprises a rectangular, inverted shallow pan 242 having a plurality of laterally and longitudinally spaced control lugs 244 depending therefrom. The control lugs 244, which are notched as shown at 245, are of various lengths and operate at preselected positions of the carriage a sensing mechanism which includes a series of sensing tappets, bell cranks and associated levers contained within the accounting machine to effect various automatic functional controls of the machine similar to those effected by manually depressing various one of the functional control keys, as described in the Butler patent.

Located on opposite sides of the program tray 242 is a spaced pair of knobs, one of which is shown at 246, provided on the ends of a program selector shaft 247 (FIG. 1) which extends through the program tray. The shaft may be rotated manually by the knobs 246 to any one of four positions to shift the program tray slightly laterally to any one of four corresponding positions in each of which a different set of longitudinally spaced control lugs is positioned at each of the carriage tabulating positions to cooperate with the aforesaid sensing mechanism, thereby affording a selection of several different control programs of accounting machine operation.

Figure 23:
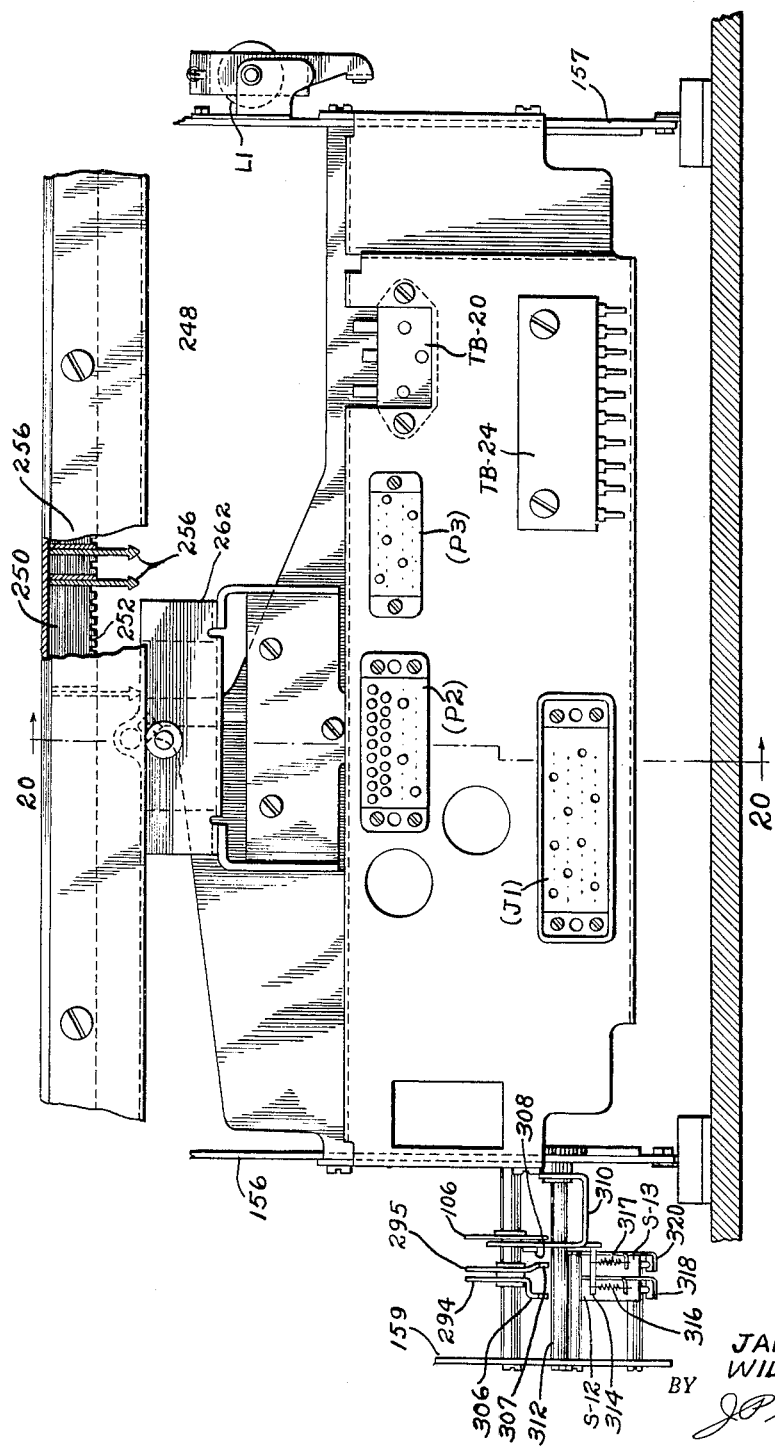
FIG. 23 is a rear view of the accounting machine taken in the direction 23—23 of FIG. 10 illustrating the auxiliary control panel of the carriage and the plug and terminal board connectors on the rear of the accounting machine.
Figure 24:
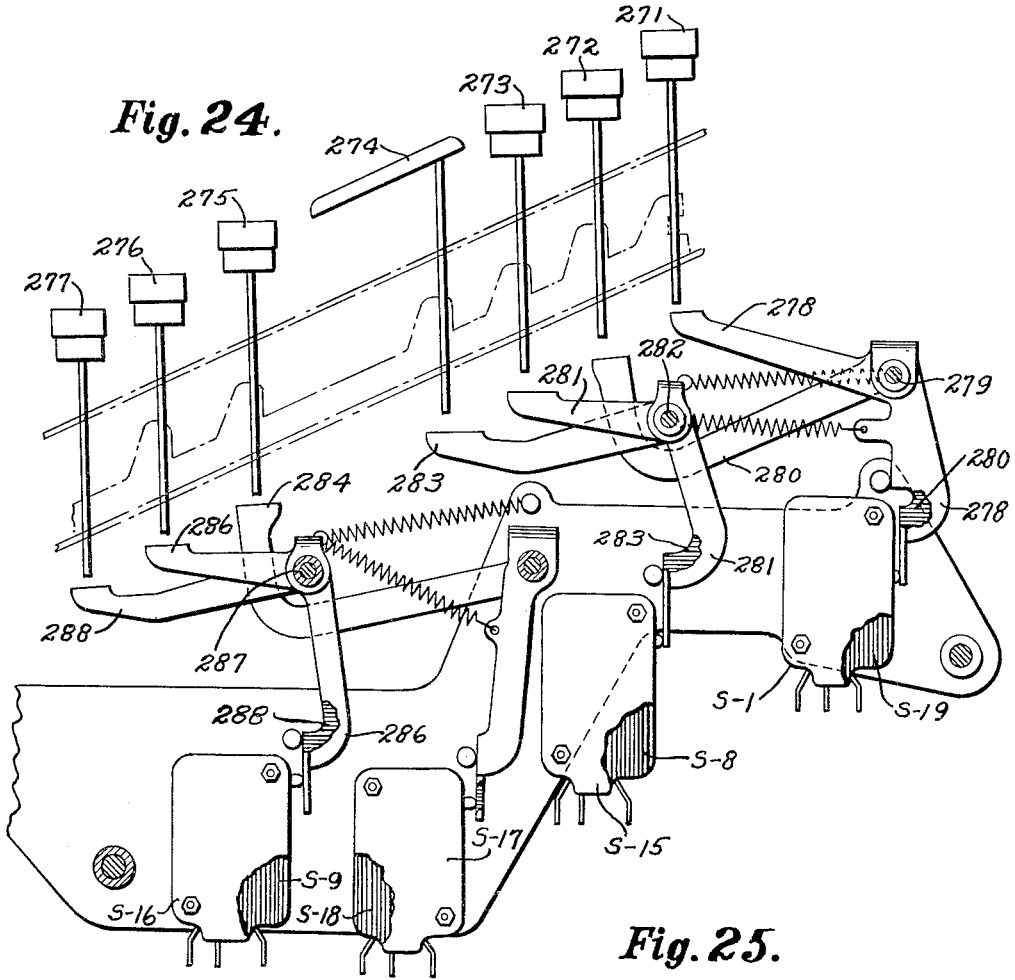
FIG. 24 is a right side elevation view showing the functional control keys and their associated switches employed in the accounting apparatus of the present invention.
Figure 25:
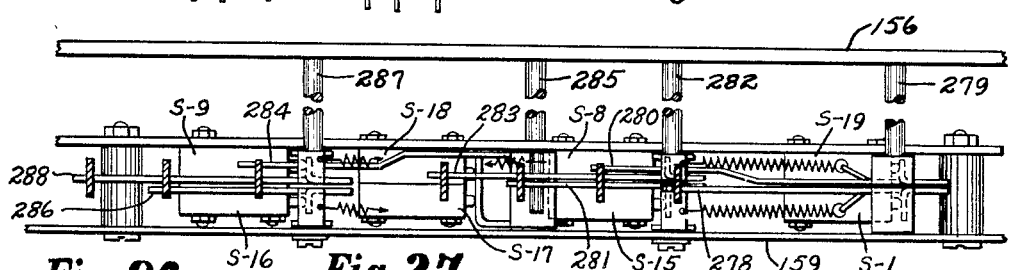
FIG. 25 is a top plan view of FIG. 24.

In order to establish several additional control lanes for controlling the card punch control unit of the present invention, the control tray 242 of the accounting machine has been extended rearwardly by the addition of an auxiliary control tray 248 attached to the rear edge of tray 242. As shown in FIGS. 21 and 23, the tray 248 mounts a forwardly and rearwardly spaced pair of transversely extending bars 250 and 251 which are provided with downwardly opening slots 252 for receiving the ends of a plurality of transversely spaced, longitudinally extending ribbed magazine bars 254 to which are suitably secured the lane switch actuator elements 256 shown as depending skids or lugs. While the bars 254 include positions for supporting only five actuator lugs, each lug may be notched as indicated at 257 to provide two control lanes each or a total of 10 such lanes for a maximum of five pins at each tabulating position of the carriage. The control lanes thus established may be referred to as electrical control lanes, in distinction to the mechanical control lanes provided by the lugs 244 contained in tray 242.

Supported on a bracket 260 from the rear of the machine and positioned beneath tray 248 are a plurality of longitudinally spaced electrical control switches indicated generally at 262 having their individual actuators 264 in position to be engaged by the generally arrow-shaped, lower ends of respective ones of the longitudinally spaced control skids or lugs 256 as tray 248 moves transversely across the accounting machine 10 with the carriage 22.

The individual lane switches of the switch assembly 262 may be of the on-off type illustrated in FIG. 27 herein and are identified by the labels S–26 to S–32 in the schematic electrical circuit control diagrams later to be described. In general, these switches will determine whether or not the card punch machine 12 will be operated, and by which program, as will be explained more fully later. Switch S-26 is actuated by a lane control lug in the first electrical lane from the left of FIG. 20 corresponding to electrical lane 26 and determines whether or not the card punch machine will be actuated. Lane switches S-27 through S-31 determine which one of five possible programs of the card punch control unit 14 will be used to control the card punch machine. Lane switch S-32 controls the energization of a plugboard relay of the card punch control unit and may be used in predetermined carriage positions to alter any programmed functions in the accounting apparatus. This feature is employed in the illustrated embodiment of the invention to permit disabling of the punch in those carriage positions where a control lug is provided in lane 32 or providing an overpunch in other carriage positions where a lug is not provided in lane 32 and when the accumulators are in subtract condition, as will be explained more fully hereinafter.

Figure 26:
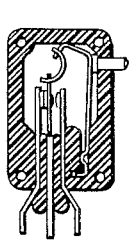
FIGS. 26 and 27 are sectional elevation views of typical switches used in various places in the accounting machine.

In addition to the lane switches S-26 to S-32, the accounting machine is also provided with a manually operable on-off switch S-2 of the type illustrated in FIG. 22 for the carriage control disabling lever 44 and with a separate manually operated switch of the over-center type shown in FIG. 26 for each one of the seven functional control keys 271-277 provided in the additional column of control keys 25 provided on the extreme right of the machine keyboard. Except for its actuator arm, switch S-2, associated with the carriage control disabling lever 44 is similar in construction to the form of siwtch shown in FIG. 27 identified with the electrical control lanes and is actuated when the carriage control lever is at its forward or automatic carriage control position, as indicated in FIG. 22, to place the card punch machine 12 under the control of the accounting machine.

With refeernce to FIGS. 10, 19, 24 and 25, each of the control keys 271-277 is associated with a separate bell crank lever that is pivotally mounted on one of several spaced rods that extend transversely between and are secured to the spaced pair of framing members 156, 159 on the right side of the machine. Depression of the uppermost key 271, labelled "Punch-On," rocks its bell crank 278 on rod 279 to actuate switch S-1, which is connected electrically in series with switch S-2 controlled by the carriage control disabling lever 44 and together therewith and the plugboard interlock switch S-3 of FIG. 40 controls the application of B+ power to the various control relays of the card punch control unit 14. Key 272, labelled "Reset," has its bell crank lever 280 pivotally mounted on rod 279 adjacent crank 278 to actuate switch S-19, which is located adjacent to and behind switch S-1 and functions to reset the stepper in the card punch control unit in the event of malfunction of the stepper. Key 273, labelled "Feed," has its bell crank 281 pivotally mounted on rod 282 and actuates switch S-15, which is connected in the card feed control circuit of the card punch machine.

Control key 274, labelled "Release," has its bell crank 283 pivotally mounted on rod 282 adjacent crank 281 to actuate switch S-8, which is mounted adjacent the card feed switch S-15 and is connected in the card release control circuit in the card punch machine 12. Key 275, lebelled "Skip," has its bell crank 284 pivotally mounted on rod 285 and simultaneously actuates a pair of juxtaposed skip and skip interlock switches S-17 and S-18, respectively, which function to control skipping of the detail card in the card punch machine from the accounting machine. Key 276, lebelled "Dup.," has its bell crank 286 pivotally mounted on rod 287 to actuate Dup. switch S-16, which is electrically connected to a duplication control circuit of the card punch machine and controls duplication therein from the accounting machine. Key 277, labelled "Reg/Alt. P," has its bell crank 288 also pivotally mounted on rod 287 adjacent crank 286 and actuates switch S-9, which is mounted adjacent to switch S-16 and is electrically connected in either the card registration control circuit of the card punch machine or to the alternate program selection circuit, if the particular card punch machine employed is provided with this latter feature.

Figure 27:
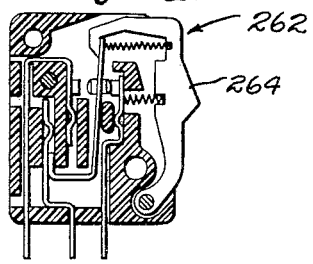

As illustrated in FIGS. 10 and 19, the accounting machine also includes three cam actuated timing switches S-5, S-6, and S-7 which may be of the on-off type illustrated in FIG. 27. These switches are mounted on the inner side of the right side frame 159 of the accounting machine and are actuated by a pair of timing cams 291, 292, also labelled F1 and F2, that are rotated by the main cam shaft 62. Switches S-7 and S-5 are closed by cam F1 from 130° to 160° and from 230° to 260°, respectively, of the accounting machine cycle, while switch S-6, which is mounted in the same position as and is located behind switch S-7, is closed by cam F2 from 200° to 270° of the accounting machine cycle as indicated in the timing chart of FIG. 48A.

Mounted on the framing member 159 and rearwardly of timing switch S-5 is a buzzer labelled BZ which is energized to produce an audible buzzing sound when the "Punch-On" key 271 and carriage control disabling lever 44 of the accounting machine have been actuated and when the card punch machine is not in condition for operation.

In order to sense subtract operations in the accounting machine, the accounting machine is provided with a separate minus indication switch for each of the accumulators employed therein. For the two accumulator machine employed in the illustrated embodiment of the invention, two such switches S-12 and S-13 which may be of the on-off type illustrated in FIG. 26 are employed. It will be appreciated that an additional minus indication switch would be employed, if the accounting machine were equipped with three accumulator sections. The switches S-12 and S-13 are located on the right side near the rear of the machine as shown in FIGS. 10, 19, and 28 and are individually actuated from one or the other of a pair of spaced symbol indexing slides 294 and 295, one of which is provided for each accumulator, 90A, 90B, and from the add control slide 106, the operation of the symbol slides and add control slide being more fully described in connection with FIGS. 36, 97, and 100 of the Butler patent.

In general, the symbol indexing slides 294 and 295, which are located to the right of the add control slide 106, are pulled forward through individual springs as the symbol slide restoring arm 296, which is associated with each slide is rocked clockwise by the rotation of the timing cam 298 located on the main cam shaft 62, as illustrated in FIG. 28. Forward movement of the indexing slides rotates the cluster gear unit 85 to raise the character type bar (not shown) of each symbol slide to a position controlled by the various steps of the symbol designation arms, one of which is shown at 302. The symbol designation arms are selectively positioned in the paths of a formed ear 304 on each of the symbol slides, as by depression of various ones of the result keys of columns 26 and/or 27 to cause the printing of an appropriate symbol for the particular mathematical operation being accomplished, as described in the Butler patent. The operation of the add control slide 106 has been mentioned in connection with FIG. 4, herein.

The symbol slides 294 and 295 carry a pair of laterally spaced coded shoes 306, 307 which, together with a cam follower roller 308 carried by the add control slide 106 and a cooperating yoked plate 310 that is pivotally mounted on a transverse rod 312 extending between the frame plates 156 and 159 of FIG. 23, forms a part of the actuating mechanism for the minus indication switches S-12 and S-13. As indicated in FIGS. 23 and 28, the lower edge of the cam plate 310 carries a stud 314 to which is secured one end of each of a pair of operating springs 316, 317 the other end of each of which is secured to a different one of a pair of pivotable actuator arms 318, 320, one of which is provided for each of the minus indication switches. Rearward movement of the add control slide 106 by its actuating arm 322 shown in FIG. 4 rocks the cam plate 310 upwardly as indicated in FIG. 29 to raise the actuator arms 318, 320 of the switches S-12 and S-13 and normally would open the switches.

If any one of the accumulators 90A or 90B has been indexed for a subtract operation, the indexed symbol designator arm 302 of the character slide associated with that accumulator will limit the forward movement of that slide to a position such that one of spaced projections 324 carried by its coded shoe 306 or 307 will engage an extension plate shown at 326 provided on the actuator arm of each of the minus indication switches and prevent upward movement of the actuator arm of that switch, with the result that the minus indication switch associated with that slide will remain in its normally closed position. In the switch actuated position of FIG. 29, the extension plate 326 has been permitted to move upwardly beyond the projection 324, whereby the minus indication switch with which it is associated will be operated to its open or circuit interrupting position.

In addition to the above switches, the accounting machine further includes two other switches S-10 and S-11, which may be of the on-off type illustrated in FIG. 27 herein and are used to prevent operation of the card punch unit when totalling operations are performed in the accounting machine. These switches are shown in FIG. 10 on the left side of the accounting machine and are actuated from their normally closed position by an index lock bail 330 of the accounting machine. This bail operates on "total" and "sub-total" cycles to lock the keyboard and prevent movement of the indexing slides 64 and sectors 65 of FIG. 4. With the slides and sectors immobilized, the accounting machine is compelled to "read-out" the values stored in the accumulators, as described in connection with FIGS. 51 and 94 of the Butler patent.

Also shown on the left side of the accounting machine of FIG. 10 is a Machine Block Solenoid L1 which may be selectively energized during an accounting machine cycle to activate an interlock, which, although having no effect on the present machine cycle, prevents commencement of the next accounting cycle until the card punch control unit has progressed sufficiently in its operating cycle to avoid any possibility of interference, should the accounting machine be operated for the next accounting cycle.

Figure 30:
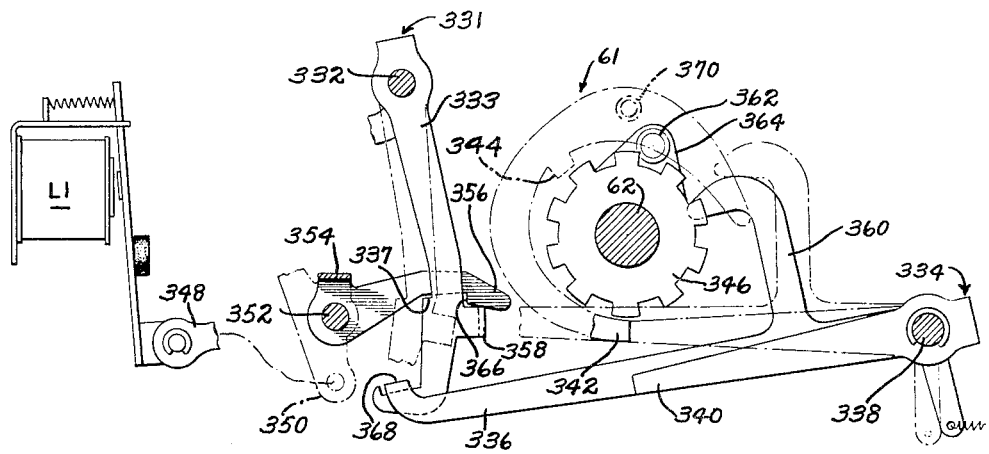
FIGS. 30 and 31 are diagrammatic views of the operating linkage actuated by the machine block solenoid employed in the accounting machine.
Figure 31:
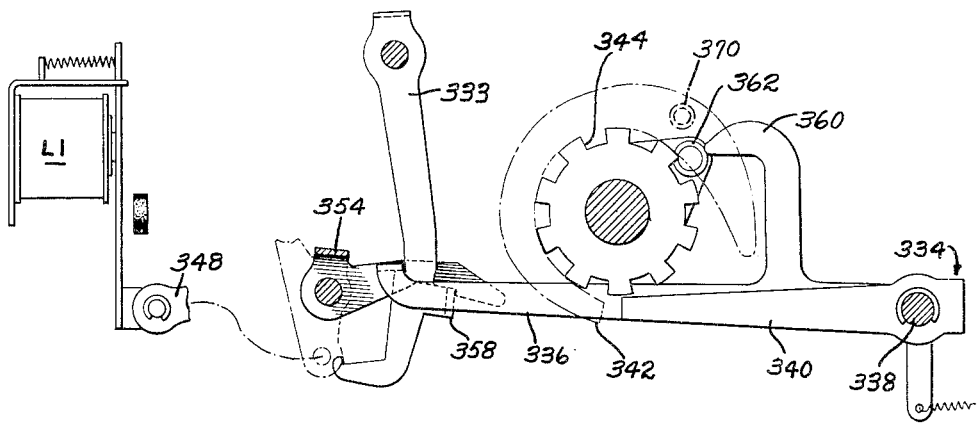

With reference to FIG. 21 of the Butler patent and FIGS. 10, 30 and 31 herein, an accounting machine cycle may be initiated as by depressing a motor bar of column 28 to cause yoke 331 to be rocked forwardly or to the right on rod 332 by means disclosed in the Butler patent to release or drop the longer arm 336 of another yoke member 334 from the step or shoulder 337 on the left side of arm 333 of yoke 331. This permits the yoke 334 to pivot downwardly about rod 338 and releases the shorter arm 340 of this yoke from the end of the pivotable pawl 342 of the clutch 61 which then drops its tooth 344 between the teeth of the notched or toothed sleeve element 346 as indicated in FIG. 31 to engage the clutch 61 with the motor drive 60 of FIG. 3. During this cycle, the Machine Block Solenoid L1 is energized to move link 348 and rock crank 350 which rotates shaft 352 and bail 354 secured thereto and positions the hooked arm 356 of bail 354 over the laterally offset ear 358 shown on the right side of the yoke arm 333 in FIG. 31.

Near the end of the cycle, follower arm 360 of yoke 334 is actuated by roller 362 on cam 364 on the clutch shaft to rock yoke 334 clockwise in FIGS. 30 and 31. Yoke arm 333 is moved rearwardly or to left by means disclosed in the Butler patent to position the ear 358 shown on the right side thereof behind the step 366 of the notched hook 356 of bail 354 and position the shoulder 337 shown on the left side of yoke arm 333 under the laterally offset ear 368 of the longer arm 336 of the yoke member 334, as in FIG. 31. As the clutch shaft completes its cycle of rotation, the clutch pawl 342 engages the end of the shorter arm 340 of yoke 334, which has been rocked upwardly, and is moved clockwise about its pivot 370 to disengage the clutch mechanism as indicated in FIG. 30. While L1 is energized, it will not be possible to initiate a subsequent accounting cycle, since the hooked arm 356 of bail 354 prevents the yoke arm 333 from releasing the longer arm 336 of the clutch actuating yoke 334.

The electrical conductors connected to the various electrical control elements contained within the accounting machine are represented in FIGS. 18 and 32, the location of the various terminal boards and cable connector plugs of which are shown in FIGS. 19, 20, and 23. TB-21 shown in FIG. 19 includes the input and output circuit connections for the minus indication switches S-12 and S-13 while the laterally spaced terminal boards TB-22 and TB-23 provide connections for the terminals of the keyboard switches S-1, S-2, S-8, S-9, and S-15 to S-19. Terminal board TB-28 is located below the signal lamp assembly 40 of FIG. 10 while TB-24 is mounted on the rear of the machine case or housing as indicated in FIG. 23. The various pin contacts of the male connectors (P2) and (P3) are connected to the various input and output terminals of the duo-decimal switch and extra-decimal switches of the switching assembly 120 as indicated in FIG. 18, while the various socket contacts of the female connector (J1) are connected to power plug terminal board TB-20 and to the various terminal boards TB-21 through TB-24, TB-28 and to the remaining electrical elements as indicated in FIG. 32. The various cable plug connectors and their associated cables for interconnecting the basic units 10, 12 and 14 of the accounting apparatus are illustrated diagrammatically in FIG. 33 in which the legends (P1), (P2), etc., indicate the male portion of the respective connectors and the legends (J1), (J2), etc., the female portions thereof.

*Card punch machine*

The card punch unit 12 employed in the accounting apparatus of the present invention may be an IBM card punch machine such as is described in U.S. Patents 2,647,581 and 2,753,789 to E. W. Gardinor et al. and is employed with record cards of the well-known IBM variety illustrated in FIGS. 49A and B herein having twelve horizontal rows of designation receiving positions and eighty vertical columns.

Figure 34:
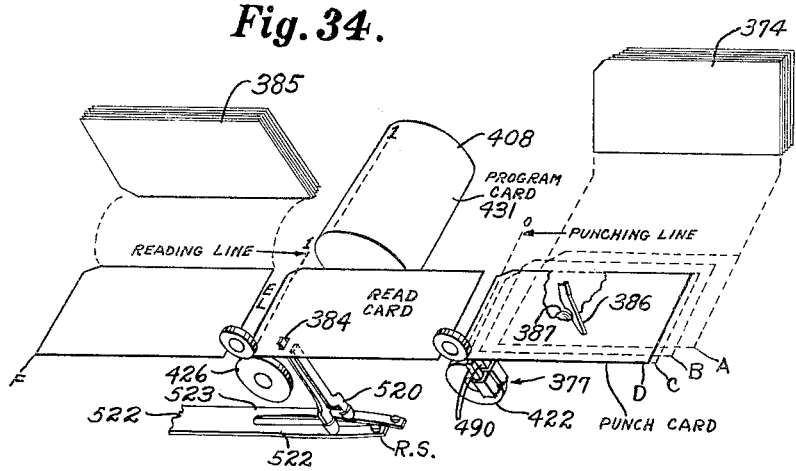
FIG. 34 is a diagrammatic view illustrating the path of a record card in the card punch machine.

With reference to FIGS. 1 and 34, this instrument includes in general a card hopper 374 at the upper right of the machine from which cards are adapted to be released and fed in succession past a punching station head 376, which includes punching mechanism 377 for punching of a card column by column under the control of a keyboard 378 and a program unit 380, and then advanced past a reading station head 382. As a card is being punched, the card just previously completed is being fed under the reading station head which includes mechanism 383 that senses the absence or presence of a hole such as 384 punched therein to enable duplication of any card column or group of punched columns from the card at the reading station into the subsequent card at the punching station. Such duplication is controlled by the program drum included in the program unit or from the keyboard. After the read card has been advanced past the read station, it is automatically ejected and stacked in its original sequence in a card stacker 385 at the upper left of the machine.

The mechanical and electrical elements for effecting and controlling the various functions of the machine including feeding, alignment, registration, punching, releasing, reading, ejecting, and stacking of the cards are described in the aforesaid Gardinor patents to which reference should be made for a more complete understanding of the construction and operation of this machine.

The card feed path through the machine is illustrated in the diagrammatic view of FIG. 34 herein. On the first card feed cycle, a card is fed from the hopper at 374 and advanced to a position A and then shifted to a position B, hereinafter referred to as the pre-registration position. In moving to the position A, the card enters between a spring-urged lever 386 and a contact button 387, which are identified by the numerals 60 and 61 in the Gardinor patents and operate a card lever switch CLS that is associated with the card feed control circuit included in the simplified schematic of FIG. 51A. During the second card feed cycle, the first card is shifted and aligned at position C and then advanced to the full line position D in preparation for punching with its first column located one step or column to the right of the punching line, and a second card is advanced from the hopper to position A and then shifted under the first card to position B where it remains until the third card feed cycle.

The first card is then advanced under control of the keyboard or program drum from the D position step by step past the punching line, until column 80 has traversed thereby when a third card feed cycle is initiated to advance the first card to a position E, where its first column is positioned at the reading line. During this third cycle, the second card is advanced from position B to position D and a third card is released from the hopper and advanced from position A to position B. From here on, the first and second cards are moved concurrently, so that one passes the reading line as the other advances past the punching line until the second card has completely traversed the punching line.

Thereupon, a fourth card feed cycle is initiated, during which the first card is advanced to position F from where it is shifted at right angles and delivered into the hopper 385.

Figure 35:
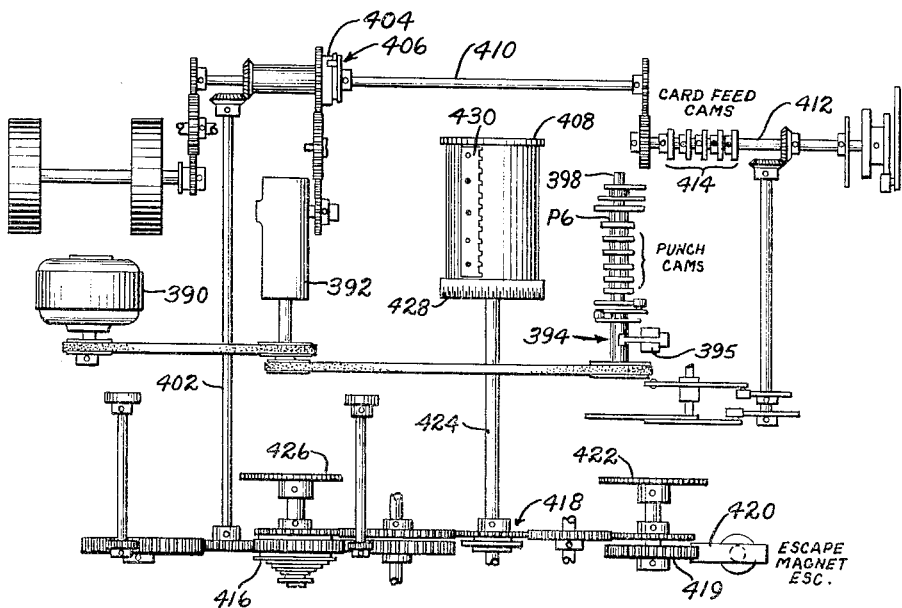
FIG. 35 is a general drive schematic of the card punch machine.
Figure 39:
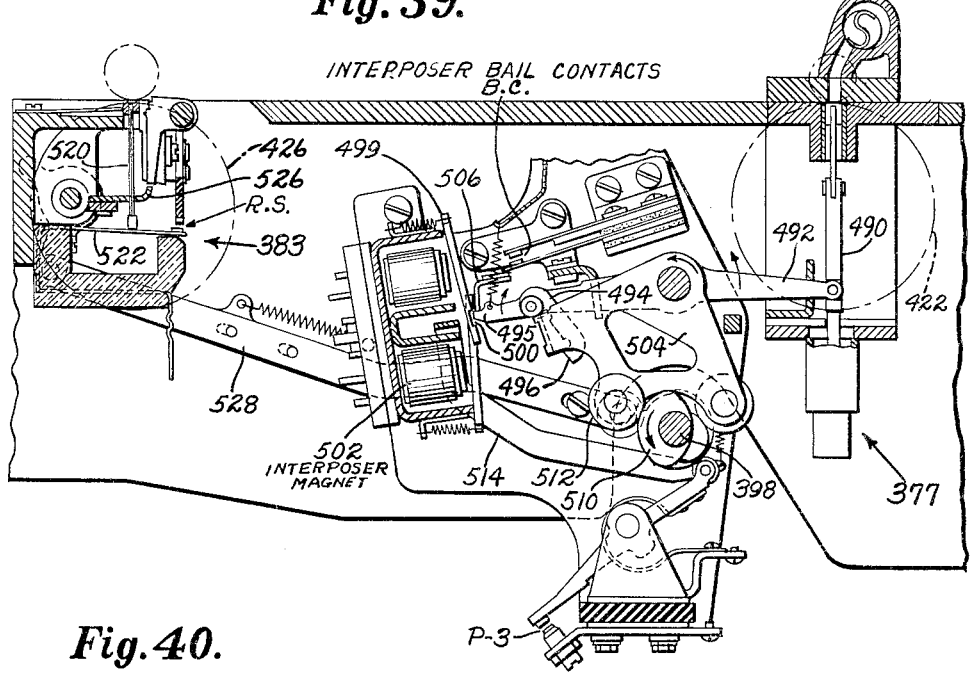
FIG. 39 is a sectional elevation view showing the mechanical and electrical components associated with the reading and punching mechanism of the card punch machine.

FIG. 35 is a drive schematic showing the relationship of various mechanical components of the machine and includes, in the main, a continuously running drive motor 390 which drives a reduction gear unit 392 and a part of an electromagnetically operated, one-revolution punch clutch 394 described in the Gardinor patents. Energization of the punch clutch operating magnet, shown at 395, causes the drive to be applied to a punch cam shaft 398 on which is mounted a plurality of spaced timing cams. Associated with each of the cams labelled P1 to P5 in FIGS. 51A and 51B is a separate set of switch contacts P-1 to P-5, one set P-3 of which is illustrated in FIG. 39 herein. In order to advance the stepper switch of the card punch control unit from the card punch machine upon operation of the latter, an additional timing cam P6 having a set of switch contacts P-6 has been added to the punch cam shaft for purposes of the present invention.

The reduction gear unit 392 is geared to a transverse drive shaft 402 and to a card feed clutch ratchet 404, which is cooperatively associated with an electro-magnetically operated one-revolution card feed clutch 406 which is shown together with its actuating magnet in FIG. 6 of the Gardinor patents. Energization of the card feed clutch magnet through depression of a card feed key or the register key of the keyboard of the IBM machine or through a set of cam actuated switch contacts PC-2 provided on the program drum 408 of FIG. 36 herein engages the card feed clutch 406 with a card feed shaft 410 which is geared to a card feed cam shaft 412 having a number of electrical switch actuating card feed cams 414 mounted thereon. The transverse drive shaft 402 applies power through a frictional drive disc clutch 416 to an escapement gear train 418, which is under the control of an escape magnet labelled ESC. to operate in synchronism a punch feed roll 422, the shaft 424 of the program drum 408, and a read feed roll 426 when the escape magnet is energized.

Figure 36:
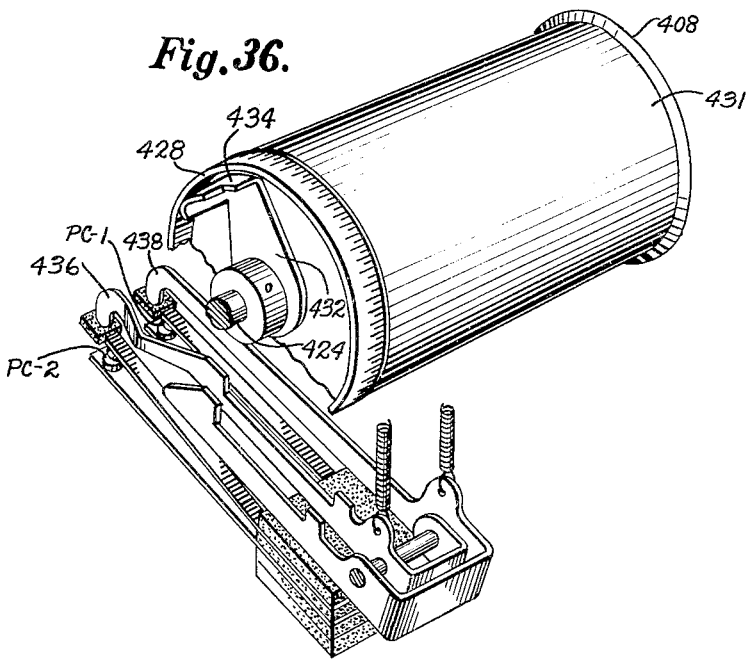
FIG. 36 is a perspective view of the program drum employed in the card punch machine.

The program drum assembly illustrated in FIG. 36 herein includes the shaft 424, which is driven from the escapement gear train 418, a program column indicator disc 428 fixedly mounted on the shaft, and the program drum 408, which is releasably mounted on the shaft and disc. Extending axially of the drum is a manually releasable clamping plate 430 for holding a standard size record card 431 wrapped around the surface of the drum. Mounted on the shaft 424 on the under side of the column indicator disc is a cam arm 432 having a notched program cam extension 434 thereon which cooperates with a pair of spring-biased contact levers 436, 438 each of which is arranged to actuate a pair of electrical switch contacts designated PC-1 and PC-2. The configuration of the camming surface extension of the arm 432 is such that switch contacts PC-1 will close when the program drum has advanced past the 80th column sensing position and will restore at column 88, while switch contacts PC-2 close at columns 81½ and restore at column 88 of the column indicator disc.

Figure 37:
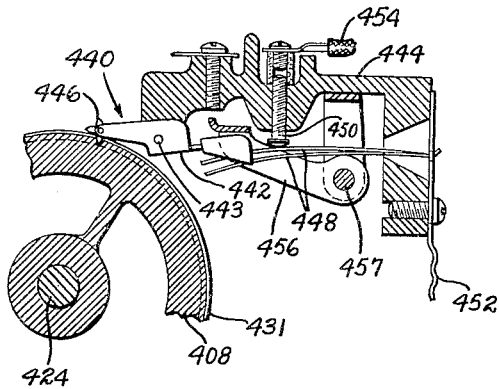
FIG. 37 is a sectional view illustrating a star wheel sensing mechanism for the program drum.

Extending transaxially and across the top of the drum is a row of star wheel sensing devices one of which is illustrated at 440 in FIG. 37 herein. One of these sensing devices may be used for each of the 12 rows of perforated positions in the program card 431 and includes a lever 442 pivoted at 443 to a stationary block 444. Each lever has pivoted thereto a five-point star wheel 446 that is urged against the card on the drum by wire contact pressure springs 448 which bias the lever downwardly as viewed in FIG. 37. When the wheel 446 drops into a perforation in the card, it causes the wire spring 448 to engage a terminal post 450 mounted on the block to close an electrical control circuit from terminal 452 and through wire contact 448 and post 450 to conductor 454. A bail 456 extending over the ends of each of the star wheel levers is mounted on a shaft 457 which is journaled in the block 444 and may be oscillated or turned through a program handle knob 456 which is accessable from the front of the machine, as shown in FIG. 1, to raise or lower the switch levers with respect to the program drum as is apparent in FIG. 37.

Figure 38:
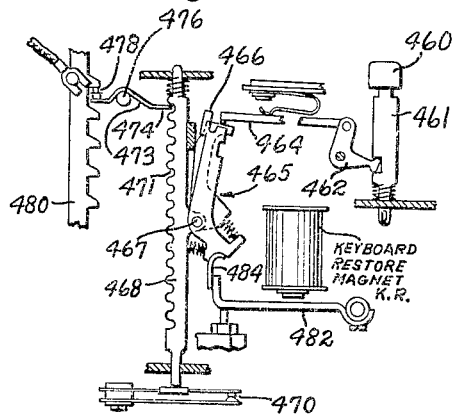
FIG. 38 is a diagrammatic view illustrating certain mechanical and electrical components associated with a key of the keyboard of the card punch machine.
Figure 40:
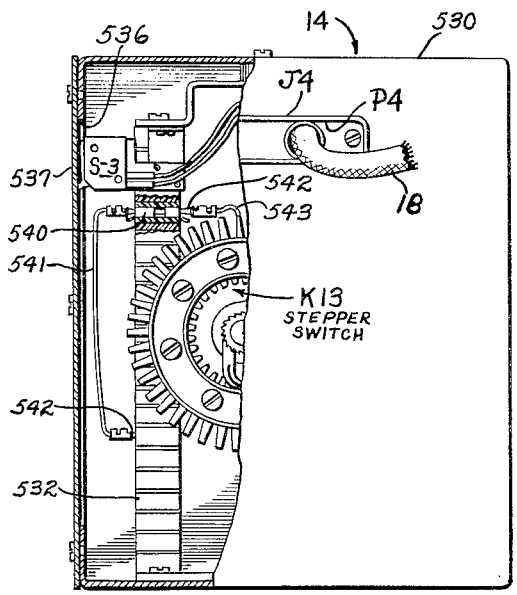
FIG. 40 is a diagrammatic left side elevation view with parts broken away of a cabinet housing for the card punch control unit illustrating some of the mechanical components thereof.

The keyboard of the IBM machine is illustrated in FIGS. 32 and 40 of the aforesaid Gardinor patents and includes a plurality of alphabetical and symbol keys, numerical keys and several functional control keys. Some of the mechanism associated with a key 460 is illustrated in FIG. 38 herein and includes a key stem 461, a bell crank 462, and latch pull bar 464, and a latch assembly 465, which includes a notched latch 466 pivoted at 467 to a vertical slide bar 468, also called a permutation bar. The slide bar associated with certain ones of the keys is adapted to close a set of latch contacts 470. Each of the slide bars 468 has a series of notches 471 formed along one side thereof in which is received the finger 474 of one of a series of vertically spaced plates or contact bails 473, each of which is mounted on a separate oscillatable rod 476. Each contact bail 473 carries an electrical contact 478 which is adapted to engage upon rocking of the bail a fixed bar 430 providing a common conductor strip wired in the control circuit to effect certain punching and control operations, as explained more fully in the Gardinor patents. To effect restoration of the slides 468, there is provided a keyboard restore magnet labelled K.R. energization of which actuates its armature 482 to elevate a keyboard restore bail 484, which raises and rocks the latches 466 in a counter-clockwise direction until the latches are in their normal vertical position.

The punching mechanism 377 includes a row of 12 punches, one of which is shown at 490 in FIG. 39 herein for each of the 12 vertically spaced rows of the detail card. Each punch receives one end of a pivotally mounted punch operating lever arm 492, the other end of which has a punch operating interposer in the form of a bell crank lever 494 pivotally mounted thereon. One end of the bell crank forms a latch arm 495 which normally engages the hooked end 500 of an armature 499 controlled by a punch interposer magnet 502, one of which is provided for each of the 12 punches. Energization of the magnet unlatches the punch operating interposer 494 to swing its hooked arm 496 downwardly beneath a punch operating bail 504 and its latch arm 495 upwardly to raise an interposer bail 506 and close a set of interposer bail contacts, labelled B.C. These contacts are actuated by the interposer bail 506 whenever any of the 12 punch interposer magnets 502 or a space interposer magnet (FIG. 50B) is energized and function to bring about an escapement through energization of the escape magnet ESC. which causes the energization of the punch clutch magnet 395.

The escape magnet ESC. may be energized by depression of a key on the IBM keyboard which energizes an interposer magnet such as 502 and trips the interposer bail 506 to close bail contacts B.C. through which power is supplied to energize the escape magnet. The escape magnet then unlatches its armature 420 from an escapement wheel 419 at the end of the escapement gear train 418 to advance the escapement wheel and the elements driven through the escapement gear train. At the end of the escapement armature travel, the energizing circuit of the escape magnet is interrupted, as described later herein, to permit the escapement wheel to be advanced one step corresponding to one card column, and an energizing circuit is completed to the punch clutch magnet 395. Energization of the punch clutch magnet 395 engages the punch clutch 394 with the drive motor 390 to bring about a cycle of revolution of operation of the punch cam shaft 398. The latter mounts a pair of spaced cams, one of which is shown at 510, engaged by a roller 512 to cause oscillation of the punch operating interposer bail 504 of FIG. 39. When the bail 504 is engaged by the hooked ends 496 of the selected punch operating interposer bell cranks 494, it will rock the associated lever or levers 492 counterclockwise to elevate the related punches 490 which strike the record card at approximately 93° of the punch cycle. At 36° of the punching cycle, the punch interposer magnets 502 are caused to be restored mechanically by an auxiliary or restoring bail 514 actuated from the punch shaft, as illustrated, in order to permit the magnets to be re-energized by the sensing pin contacts of the card reading mechanism when the sensing pin contacts make at 76° of the punching cycle. Since the punch operating bail 504 has already started to operate by the time the sensing pin contacts make, information read on one cycle will not be punched until the following cycle.

The card reading mechanism, illustrated generally at 383 in FIG. 39 herein, is operated concurrently with the punching mechanism from the common drive shaft 398, and includes a row of 12 sets of dual sensing pins, one set of which is illustrated at 520 in FIG. 34 herein. The sensing pins rest upon the bifurcated spring arms 523, 524, of a spring contact blade 522, and are retracted by a guide bail 526. Bail 526 is driven from a cam on the punch shaft 398 through link 528 and is rocked counterclockwise to permit the pins to be raised through their spring contacts at approximately 76°±5° of the punch cycle in order to sense the presence or absence of a punching in the card at the reading station, as explained in the Gardinor patents. The presence of a hole or holes in the read card permits the read pin or pins to be raised fully and close a set of switch contacts labelled R.S. one set of which is provided for each set of sensing pins. The pins are retracted and restored to their normal open switch by bail 526 at approximately 176°±5° of the punching cycle.

*Card punch control unit*

The card punch control unit 14 is housed in a cabinet 530 below the accounting machine and includes in general a control board 532, a gas-filled discharge tube 534, and a plurality of electromagnetic relays K1—K15, relay K13 of which is a relay operated stepper switch a portion of the mechanical structure of which is illustrated in FIG. 40 herein.

The control board 532 may be a commercially available patch board or may be fabricated from commercially available components and is accessible from an opening 536 in the rear of the control cabinet. Fastened to the cabinet over the rear opening is a readily detachable cover 537, the inner surface of which bears against the actuator arm of a plugboard interlock safety switch labelled S–3, mounted in the cabinet. Switch S–3, which may be of the on-off type illustrated in FIG. 22 herein, is electrically wired to open the B+ supply circuit to the control elements of the control unit when the cover is removed for access to the plugboard.

The various terminal areas of the plugboard or control panel are indicated in the board of FIG. 46 which includes 10 horizontally spaced, vertically extending columns labelled A–K, each of which contains 21 vertically spaced sets of double connectors 540 which extend through the front and rear faces of the panel. The end of each connector terminating on the front face of the panel provides a pair of interconnected female sockets, each of which is adapted to receive a tapered pin such as 542 on one end of a programming wire 541 wired to another double connector on the front face of the board, while the end of each connector terminating on the rear face of the panel provides a pair of similar interconnected sockets, each of which is adapted to receive a tapered pin on one end of a circuit conductor 542 that is permanently wired to some part of the card punch unit control circuit.

Connected to the rear of the contact connectors of Rows 19, 20 and 21 of Columns A–K of the plugboard and in the areas bearing the legends Buffers, Entries and Exits are 10 separate sets of single-entry, double-exit buffer circuits 544 that are used for circuit isolation purposes and/or for distributing or routing a single entry pulse to two different locations in the control unit. Each buffer set includes a pair of germanium or selenium diodes, 545, 546, the cathodes of which are connected in common to the rear of one of the socket connectors of Row 19, labelled Entries, of the plugboard, and their respective anodes separately connected to the rear of a socket connector of Exit Row 20 and a contactor of Exit Row 21, respectively, contained in the same column as the Entry contactor, in the manner indicated in the schematic wiring diagram of FIG. 46A.

Figures 47B, 48:
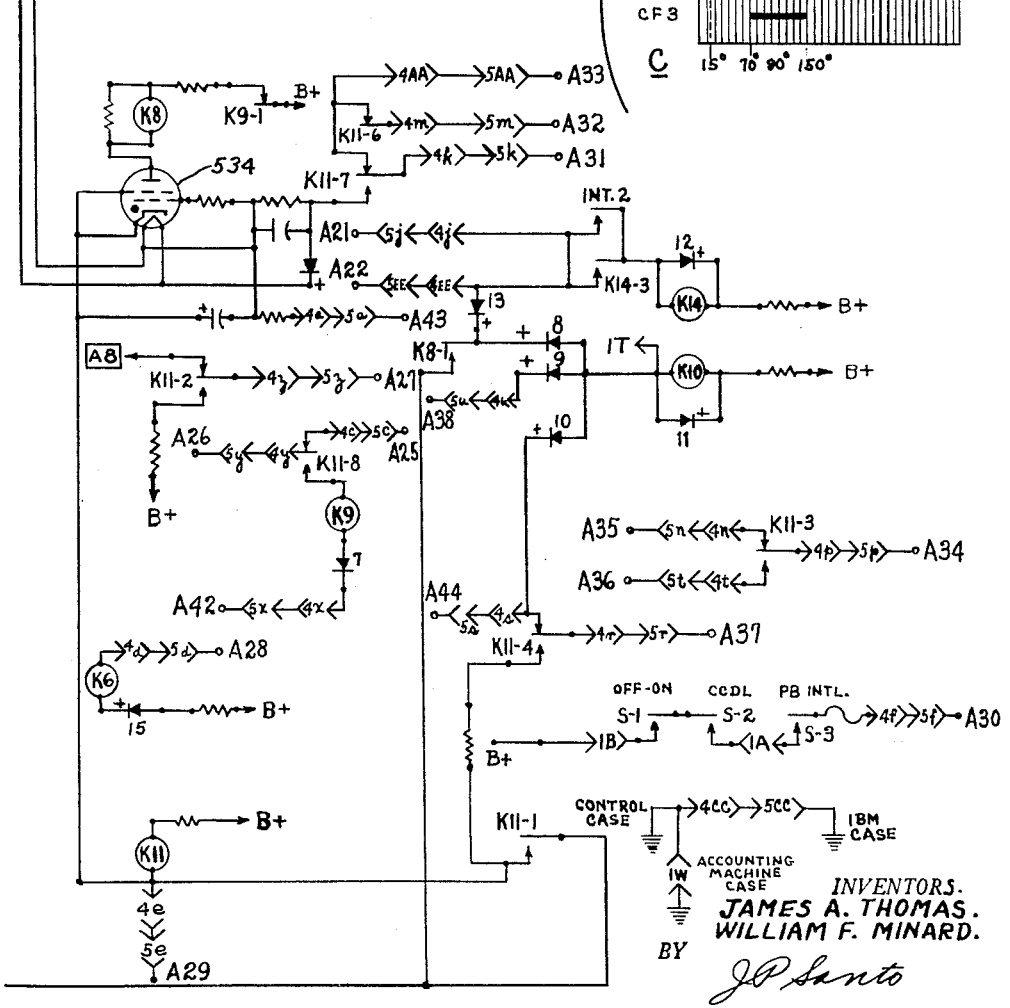

The discharge tube 534, illustrated in the schematic electrical circuit diagrams of FIGS. 47B and 51A herein may be a type 5727 or 2D21 thyratron tube, which is included in a card feed interlock circuit of the card punch control unit, as will be described in the operation of the system.

Relays K1—K11 and Stepper relay K13 are commercially available relays which are illustrated schematically in the aforesaid electrical control circuit diagrams. Relays K1—K5 are Program Selector relays; relay K6, a No-Card Indication relay; relay K7, a Word Length Sensing relay; and relay K9, a Card Feed Interlock Release relay, all of which may be Clare Type "R" relays having four sets of Form "C" contacts. Relay K8 is a Card Feed Interlock relay which may be a Potter and Brunfield type relay having two sets of Form "C" contacts. Relay K10 is an Interposer Interlock relay and relay K14, a Duplication Interlock relay, both of which may be Clare Type "R" relays having two sets of Form "B" contacts and one set of Form "A" contacts. Relay K11 is a Control Transfer relay and may be Clare Type "C" relay having 8 sets of Form "C" contacts and one set of Form "A" contacts. The Stepper relay K13 may be a Clare Type 20 stepper switch having 8 banks or switching levels. Each bank includes 20 separate contacts. One of the banks labelled K13–8 in FIG. 47A is of the bridging type and the remaining seven banks are of the non-bridging type. Only 6 of the 7 non-bridging levels are employed in FIG. 51A in which they are labelled K13–1 to K13–6. The stepper switch also includes a set of off-normal Form "C" contacts labelled ON1S and another set of off-normal Form "A" contacts labelled ON2S, a set of Form "B" interrupter contacts labelled INT.1, and another set of Form "A" interrupter contacts labelled INT.2.

Figure 41:
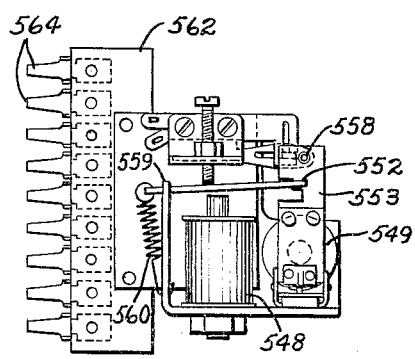
FIGS. 41 and 42 illustrate one form of relay employed in the card punch control unit of the present invention.
Figure 42:
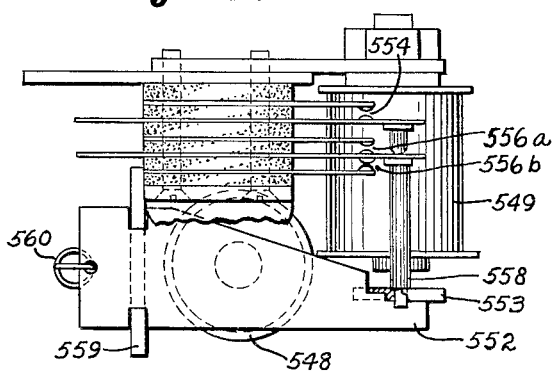

Relay K12 is a latching relay of the type that can be maintained in a fixed position during certain periods of operation. A form of relay suitable for this purpose is illustrated in FIGURE 41 herein and includes a pair of electromagnets 548, 549 which are mounted upon a bracket 550 with their axes normal to each other and are provided with individual clappers 552 and 553 respectively. The clapper 553 of electromagnet 549 is arranged to actuate a S.P.S.T. switch 554 and a S.P.D.T. switch 556 through an insulated push rod assembly 558 as shown in FIGURE 42. Energization of electromagnet 549 draws its clapper 553 rearwardly away from the viewer of FIG. 41 or upwardly with reference to FIG. 42 thus to close switches 554 and 556a and to open switch 556b. When clapper 553 reaches its rearward position, it is removed from the path of movement of clapper 552 of electromagnet 548 permitting clapper 552 to be swung upwardly about its pivot 559 through the action of bias spring 560, thus to move clapper 552 into latching engagement with clapper 553 and to hold the latter in a position in which switches 554 and 556a are held in their closed position, even though electromagnet 549 is subsequently de-energized.

Release of clapper 552 from its latched position to permit actuator rod 558 to open switches 554 and 556a and to close switch 556b, is accomplished by energizing electromagnet 548, whereupon clapper 552 is attracted downwardly away from latching engagement with clapper 553. A terminal board 562 having a plurality of terminal contacts 564 along one side of the board is provided to enable circuit connections to be made to the electromagnets 548 and 549 and the contacts of switches 554 and 556.

Plugboard relays K15, and K16 are "pulse-pulse" relays which may be of the type illustrated in FIGS. 43, 44, and 45 herein. Each relay includes a printed circuit board or panel 568, upon which is mounted by a U-shaped bracket 570, a pair of axially opposing electromagnets 572, 573 which are energized selectively as described more fully hereinafter through input terminals 575, printed wiring 576, and output terminals 577 which are connected to the electromagnets. Also printed on board 568 of FIG. 44 are output wires and terminals 578a, b, c, d, e, and f, adapted to be bridged by wire contactor elements 580 of FIG. 45 mounted upon an insulating card 581 carried upon the upper end of an arm 582 having its lower end 583 pivotally mounted at the bottom of the U-shaped bracket 570. Energization of electromagnet 572 moves arm 582 to the left, as seen in FIG. 43, thus to close the contacts designated a—e and c—f. Energization of electromagnet 573 moves arm 582 to the right to break the aforesaid contacts and make contacts b—e and d—f, respectively.

The switch contact terminals A—F of the plugboard relays K15 and K16 are adapted to be connected to the rear of the control board 532 in the areas labelled "Selector" Row 18, Columns D—K and "Lane 32 Selector," Row 17, columns E—K, respectively, as indicated in the schematic diagram of FIG. 46B herein. The coordinate designations F17 . . . G17 and F18 . . . H18 enclosed in the rectangular blocks connected to different ones of the switch contacts of relays K16 and K15 denote the location by column and row of the contact connectors of the control board to which the switch contact terminals are connected. This form of notation is used throughout the schematic electrical circuit diagram of the card punch control unit of FIGS. 47A and B herein, which together with FIGS. 46, 46A, B, and C, indicates the control circuit sources or connection points from which other connections are made to the rear of various ones of the contact connectors of the control board 532.

For example, the contact connectors of Rows 1 to 5 of the section labelled Word Length Exits included in Column A of the control board are connected to a different one of each of the transfer contacts of the switch contact sets K1–4 to K5–4 of the Program Selector relays K1 to K5, as indicated in FIG. 47A. As indicated in FIG. 46C, the contact connectors of Rows 1 to 12 of the Card Entry section included in Column B are connected over one set of branch conductors through plug connector 2 to the output terminals of the switch assembly of FIG. 18 in the accounting machine and over another set of branch connectors through plug connectors 4 and 5 to the connection points A12 to A1, which are located on the circuit diagram of the card punch machine of FIGS. 50A, B and C. The contacts of rows 1 to 12 of the Character Rack section included in column C of the control board are connected from the card punch control unit and through connector plug 3 to the accounting machine in which they are connected by internal wiring to the output terminals of the duo-decimal switch as illustrated in FIG. 18; while the contacts of rows 1 through 14 of the Data Rack section included in column D are connected from the card punch control unit and the various terminals of connector plugs 2 and 3 to the input or common terminals of the duo-decimal switch and extra-decimal switches employed in the read-out switch assembly of the illustrated embodiment of the present invention.

Provision is made on the control board of FIG. 46 for the inclusion of wiring to the rear of contact connectors D1 and D14 thereof from either one or both of a pair of additional duo-decimal switches for reading of additional twelve-pitch actuator racks which may be provided in certain styles of accounting machines other than the particular machine illustrated herein in which read-out switch units for but 12 racks are employed.

The remaining circuit connections to the rear of the other sections of the control board will be apparent from further study of FIGS. 46C and 48A and B to which reference will be made in the description of the operation of the control system of the accounting apparatus of the present invention below.

The electrical schematic circuit diagram of a commercially available form of card punch machine suited for use in the accounting apparatus of the present invention is illustrated on the three sheets of drawings containing FIGS. 50A, B and C herein. In order to adapt the card punch machine for use in the accounting apparatus of the present invention, however, several slight circuit changes have been made in this circuit diagram including the disconnection of certain circuit connections indicated by the crossed-out conductors 590—596 thereon, the addition of a circuit connection indicated by the sinuous conductor 598 extending from one contact of an unused set of contacts 49–6 of the Skip Magnet 49 to the transfer contact of switch contacts 49–3 of the Skip Magnet, and the addition of circuit connections from a female plug (J5) of a multiple conductor cable connector to certain circuit terminals or connection points designated A1—A19 and A21—A44 thereon.

The female plug (J5) is shown in the connector plug diagram of FIG. 33 herein which illustrates the cables 16 and 18 and their associated multiple conductor cable connectors (J1), (P1); (P2), (J2); (P3), (J3); (P4), (J4); and (P5), (J5) for interconnecting the accounting machine 10, card punch control unit 14 and card punch machine 12. This figure, together with the card punch machine circuit schematic of FIGS. 50A, B and C, the card punch control unit schematic of FIGS. 47A and B, the plugboard wiring diagrams of FIGS. 46A, B and C, and FIGS. 33 and 18 illustrating the terminal board wiring and read-out switch wiring of the accounting machine, illustrate the electrical circuit wiring of the various components of the accounting apparatus of the present invention.

However, for purposes of simplification and facilitating tracing of the various circuits, reference will be made, for the most part, to the simplified schematic, electric circuit diagram illustrated on the two sheets of drawings containing FIGS. 51A and 51B which have been drawn without regard to the cable grouping of the various conductors shown therein.

Figure 51A:
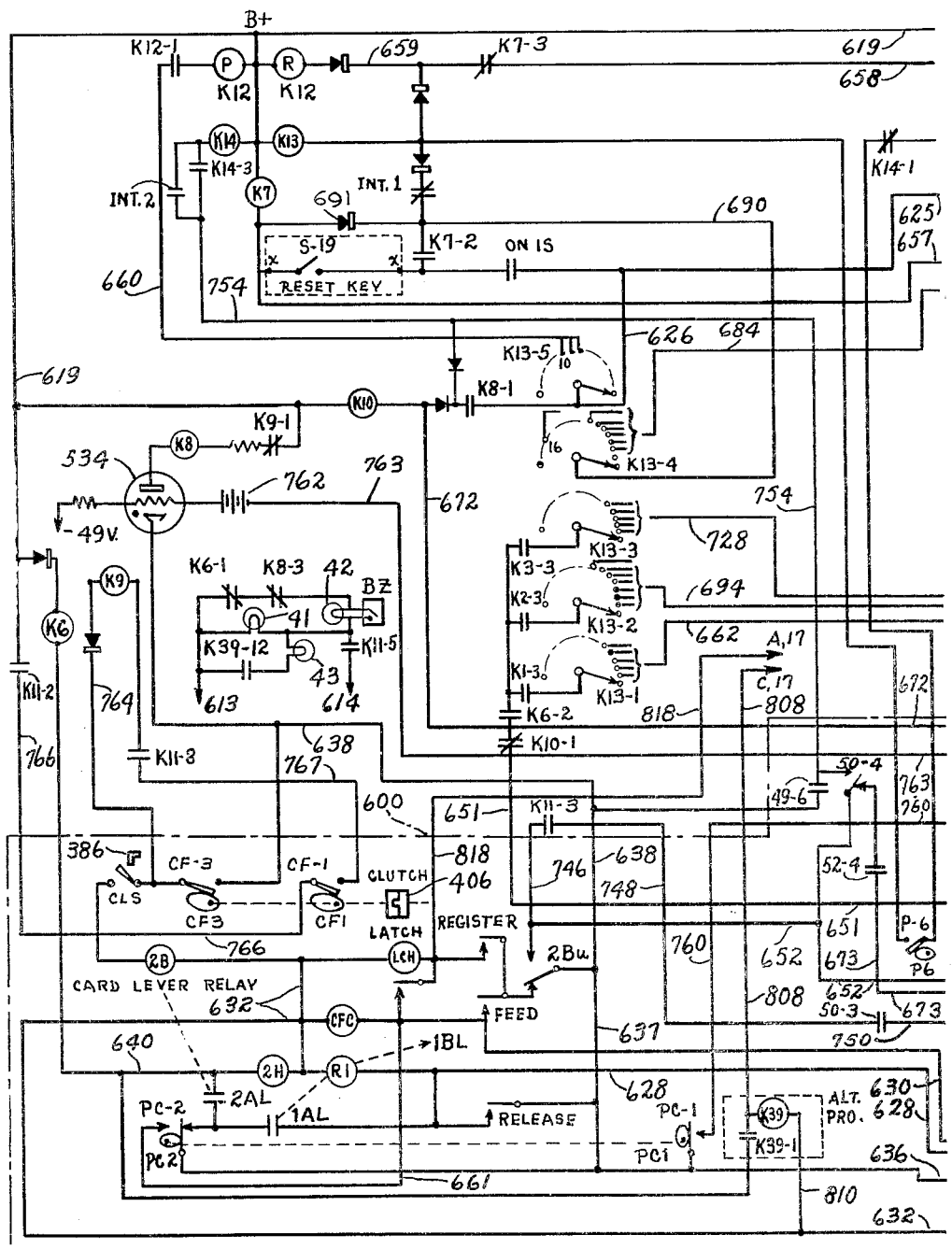
Figure 51B:
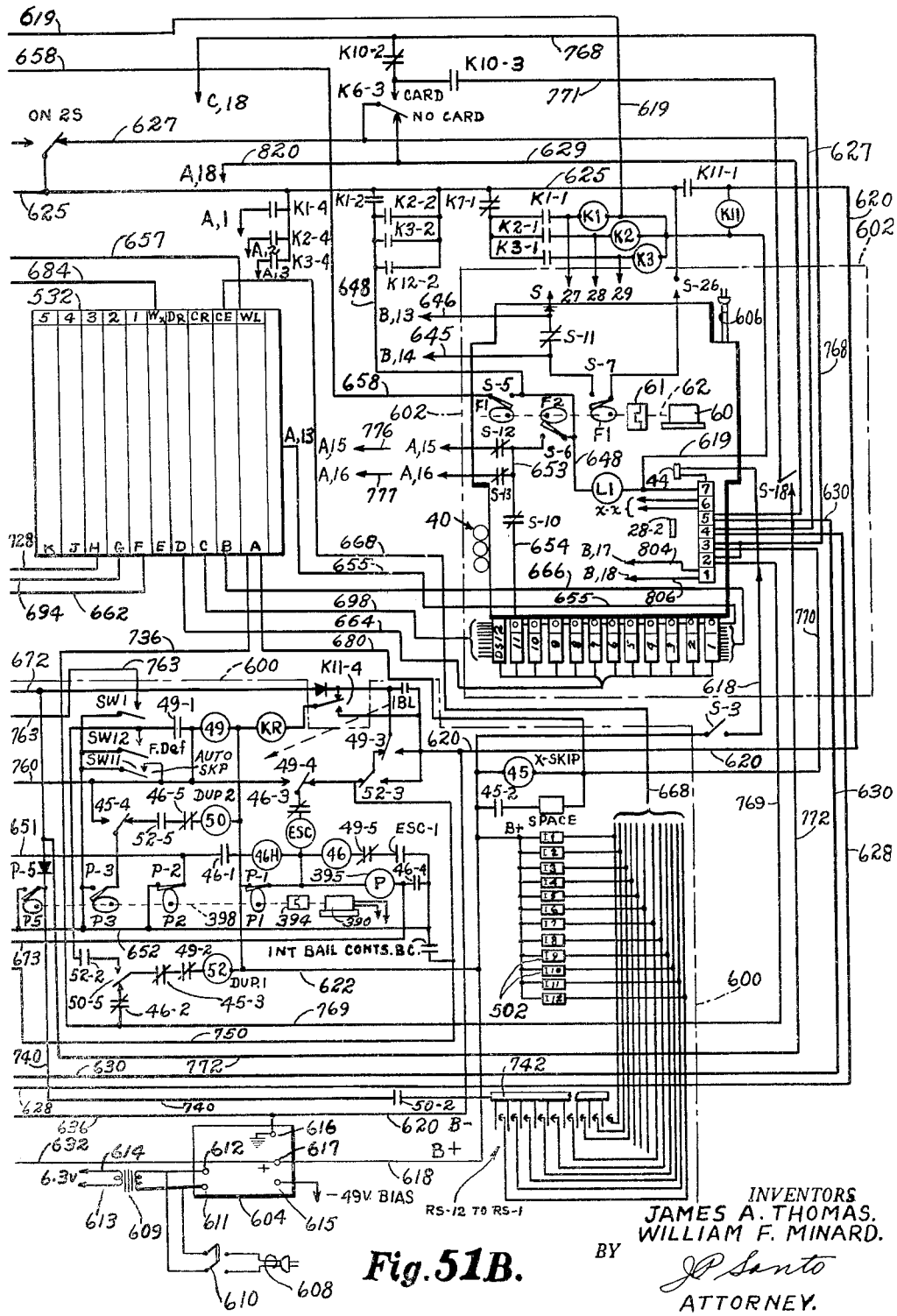

The lower part of the circuit diagram enclosed by the broken line 600 of FIGS. 51A and B represents the basic electrical components of the card punch machine 12 that are considered necessary to obtain a general understanding of the operation of the present invention, while the dash-dot rectangular enclosure 602 on FIG. 51B represents the electrical components contained within the accounting machine 10. Except for the circuit conductors extending between the various components of the three operating units of the system, certain ones of the circuit isolation junction rectifiers, and for the stepper Reset switch S-19, which is contained in the accounting machine and is shown in the upper left of FIG. 51A, the remaining components without the aforesaid enclosures are contained in the card punch control unit 14. The relay operated stepper switch K13 of the latter unit is shown as having only 5 switching banks or sequence wafers, only 3 of which, labelled K13-1, K13-2, and K13-3, are used for the simplified accounting operating programs described below. Depending upon the application of the system, however, all of the sequence wafers and their associated lane selector switches and program selector relays of FIGS. 47A and B may be employed. Also, the operating voltage for the various components of the system, except for the drive motor 60 of the accounting machine, is shown as being derived from a common power supply 604 contained in the card punch machine 12. However, a separate power supply for the control components of the card punch control unit and accounting machine may be employed, if desired.

*Operation*

With reference to FIGS. 51A and 51B, the system is conditioned for operation by plugging the individual line cords 606 and 608 of the accounting machine and the card punch machine to the local 110 volt, 60 cycle mains and closing the main line switch 610 on the card punch machine to apply operating voltage to the input terminals 611, 612 of the power supply 604, also shown as having a −49 volt bias voltage, B− or ground, and 150 volt B+ output terminals 615, 616 and 617, respectively. Connected to the input terminals of the power supply is a filament transformer 609 the secondary winding of which provides 6.3 volts between conductors 613 and 614 thereof.

B+ bus 618 connected to output terminal 617 extends serially through the plugboard interlock switch S-3 of FIG. 40 and switch S-2 of FIG. 22 operated by the carriage control disabling lever 44 to one side of switch S-1 operated by the "Punch" on control key 271 of FIG. 22, the other side of which is connected via conductor 619 to the high potential side of the Control Transfer relay K11 contained in the card punch control unit. The other or low potential side of relay K11 is connected over bus conductor 620 to the ground terminal 616 of the power supply. Upon energization, relay K11 transfers all of its contacts, including contacts K11-1, K11-4, K11-5. The switch contacts of the various relays are shown in the de-energized condition of their respective relays. The closing of contacts K11-1 makes ground available from the power supply of the card punch machine to the various components of the card punch control unit and the accounting machine. The actuation of K11-4 to the opposite position shown completes a ground circuit from the power supply to one side of the Keyboard Restore magnet K.R., the other side of which is shown connected to B+ bus conductor 618 over conductor 622. Energization of the Keyboard Restore magnet locks up the keyboard of the card punch machine, as explained earlier in connection with FIG. 38. The closing of contacts K11-5 completes an energizing circuit from the 6.3 volt low voltage terminals 613, 614 of the power supply 604 to the "Punch" on signal lamp 41 and an auxiliary signal circuit through the normally closed contacts K6-1 and K8-3 of the Card Sensing relay K6 and the Card Feed Interlock relay K8 to the "Lock" or no-card signal lamp 42 and the audible signal buzzer BZ provided on the accounting machine.

*Card feed cycle*

A card feed cycle is then initiated by depressing the Card Feed Control key 273 (key #5) on the accounting machine to actuate switch S-15 and provide ground from the power supply 604 over a circuit traced from now closed contacts K11-1 of the Control Transfer relay K11, conductor 625 connected to the normally closed contact set of the off-normal switch ON2S of the Stepper relay K13, conductor 627, the front contacts of relay operated switch K6-3 shown in its lower or "no-card" contact position, conductor 629, Card Feed switch S-15, and conductor 630 connected to the low potential side of the Card Feed Clutch Magnet 407. The other side of the clutch magnet 407 is connected by conductor 632 to the B+ terminal of the power supply. The energized clutch magnet engages the one-revolution Card Feed Clutch 406 with the main drive motor 390 to cause a card to be released from the hopper of the card punch machine and shifted to the pre-registration position B in the card bed, as described in connection with FIG. 34 herein. The Card Feed Control key 273 on the accounting machine is again depressed to actuate switch S-15 to re-energize the card feed clutch magnet and start a second card feed cycle, causing a second card to be fed from the hopper to the registration position D at the punching station where it will be positioned one card column in advance of the card column 1, as indicated in FIG. 34. The program card 431 mounted on the program drum 408 of the card punch machine will be positioned at card column 1.

When the first card is received at the punching station, it closes the aforementioned Card Lever Switch CLS to permit energization of the Card Lever Relay 2B upon closure of cam actuated switch CF-3, which is closed by card feed cam CF3 from 70° to 150° of the card feed cycle as indicated in the timing chart of FIG. 48C. The closing of switch CF-3 completes a ground circuit extending serially from the power supply over conductors 636, 637, and 638, cam actuated switch CF-3 and the card lever operated switch CLS to relay 2B, the other side of which is connected to B+ conductor 632. Relay 2B is thus energized and transfers the grounded common contact of switch 2BU to the opposite position from that shown and also closes an auxiliary set of switch contacts 2AL. The latter contacts are connected to ground conductor 636 through switch contacts PC-2 of the program drum and to conductor 640, which is connected to one side of the Card Sensing relay K-6 and to a hold relay 2H for the Card Lever relay 2B. The other side of relay K6 is connected to B+ conductor 619 through a junction rectifier used for circuit isolation purposes while the other side of relay 2H is connected to B+ conductor 632. Relay 2H maintains the switch arm or common contact of relay switch 2BU in its upper or transferred position after the energizing circuit for relay 2B is broken upon opening of the Card Feed cam switch CF-3 at 150° of the card feed cycle. The now energized relay K6 opens its contacts K6-2 to turn off the "Lock" signal lamp 42 and the buzzer BZ and transfers the common contact of its set of switch contacts K6–3 from its lower or "no-card" contact position to the opposite or upper contact position, labelled "Card," to interrupt the ground circuit to the Card Feed Clutch magnet 407 previously applied through the Card Feed switch S–15 on the accounting machine. This action electrically disables the card feed control key 273 and prevents further feeding of cards while there is a card in the punching station and at the pre-registration position.

After two cards have been positioned in the card bed of the card punch machine and the "Lock" or no-card warning lamp 42 and the buzzer BZ on the accounting machine are de-energized, the operator may then operate the accounting machine.

*Program selection*

After the quantities are indexed in the keyboard 24, the operator actuates a motor bar control key, such as 28–2, which closes a switch (not shown) that energizes the drive motor 60 and causes engagement of the clutch 61 with the motor drive to rotate the main cam shaft 62, as explained in the Butler patent. At 130° of the accounting machine cycle, cam 291, labelled F1, closes timing switch S–7 of FIG. 19 to apply ground from the now closed contacts K11–1 of the Control Transfer relay K11 to one side of the lane operated program cycle indication switch S–26, the other side of which is connected to one side of timing switch S–7. The other side of switch S–7 is connected through total sensing switch S–11 and a circuit isolation diode to the common terminal, labelled "S," of each of the program selecting lane operated switches S–27, S–28, S–29, only three of which are employed for the accounting programs to be described herein. Switch S–11 and its companion switch S–10 are normally closed switches that are actuated by the index lock bail 330 in the accounting machine as mentioned previously herein and function to prevent operation of the card punch machine and consequent punching of the detail card on totalling operations of the accounting machine. However, if it is desired to punch the card on such totalling operations, switch S–11 may be shunted by jumpering contact pins B13 and B14 of the plugboard with a program wire 644 to connect conductors 645 and 646 which are connected to the opposite sides of this switch and to the rear of the said plugboard pin contacts, as indicated.

Depending on carriage position, one of the program selector lane switches S–27, S–28, S–29 will be closed to complete a ground circuit through switches S–26, S–7 and S–11, if the latter switch is closed, to the low potential side of one of the Program Selector relays K1, K2, K3, one of which is provided for each accounting program of the accounting machine. Energization of any one of the Program Selector relays, say relay K1 through lane switch S–27, causes it to transfer all of its contacts K1–1, K1–2, K1–3, and K1–4 to establish the following control circuits. Contacts K1–1 establish a holding circuit to ground for relay K1 through the now transferred contacts K11–1 of the Control Transfer relay K11, the normally closed contacts K7–1 of the Word Length Sensing relay K7 and conductors 625 and 620. Contacts K1–2 close to connect ground conductor 625 to conductor 648, which is connected to one side of each of the timing switches S–5 and S–6 and also to the Machine Blocking Solenoid L1 that locks up the accounting machine to prevent initiation of a subsequent machine cycle as has been previously explained. Contacts K1–3 complete a ground circuit to the movable switch arm of the first stepper bank or program sequence wafer K13–1 of the stepper K13 over a circuit which includes conductor 650, the now closed contacts K6–2 of the energized Card Sensing relay K6, the normally closed contacts K10–1 of the Interposer Interlock relay K10, conductor 651, and a set of switch contacts P–2 which are actuated by punch cam P2 on the punch cam shaft 398 of the card punch machine. The latter contacts are closed from 140° to 65° of the punch cycle, as indicated in the timing chart of FIG. 48B, and are connected by conductor 652, the transferred contacts of the Card Lever relay operated switch 2BU and conductors 637 and 636 to the grounded terminal of the power supply. The fourth set of contacts K1–4 of relay K1 close to supply ground from ground conductor 625 and contacts K11–1 to the rear of the pin contact A1 of Column A, row 1 of the Word Length Exit section of the plugboard 532.

*Blank keyboard*

At 200° of the accounting machine cycle, timing switch S–6, which is closed by cam F2 from 200° to 260° of the accounting machine cycle, closes to supply ground over a circuit which includes conductor 620, the now closed contacts K11–1, conductor 625, closed contacts K1–2, conductor 648, switch S–6, conductor 653, the normally closed contacts of total sensing switch S–10, and conductor 654 to the input terminal or contact X of the extra set of contacts of the extra-decimal switch DS11. Only one output contact, say contact A and the common or input terminal X of each of the extra decimal set of contacts of each of the eleven extra-decimal switches is used, as previously mentioned, the extra-decimal switch contacts of which are wired in series, as indicated in the wiring diagram of FIG. 18 herein. Thus, if all of the 10 pitch racks are in their zero position, corresponding to a blank keyboard condition, the above described ground circuit will be completed through all of the extra-decimal contact sets X–A of the extra-decimal switches DS11 to DS1 to output conductor 655 which is connected to the rear of pin contact A13 in the Blank Keyboard section of the plugboard 532.

Pin A13 is connected on the front of the plugboard by program wire 656 which is connected to the front of pin A12 of the "Punch Disabled" section of the plugboard. The rear of pin A12 is connected by conductor 657 to the low potential side of the relay K7, the other side of which is connected to the B+ bus connected conductor 619. Relay K7 is thus energized and opens its normally closed contacts K7–1 and K7–3 to drop out the hold-in energizing circuit for Program Selector relay K1 and to prevent ground from being subsequently applied to the Stepper relay K13 through the otherwise normally closed contacts K7–3 of relay K7 and cam actuated timing switch S–5, when the latter switch is caused to close at 230° of the accounting machine cycle. The stepper switch is thus prevented from advancing and otherwise establishing an energizing circuit to a selected punch operating interposer magnet of the card punch machine, and punching therein will be disabled.

Punching of the card may also be disabled on totalling operations of the accounting machine by removing plugboard program wire 644 from pins B13 and B14 so that upon operation of the total sensing switch S–11, the ground circuit to the Program Selector relays K1, K2, K3 will be interrupted to prevent selection of a control program and consequent operation of the stepper. If it is desired to read the data racks on totalling operations, switch S–11 is shunted by connecting plugboard program wire 644 to the pin contacts B13 and B14 of the plugboard, and the data racks are read in the normal manner described below.

*Reading of data racks*

In the absence of a blank keyboard condition, at 230° of the accounting machine cycle, cam F1 closes timing switch S–5 to apply ground over a circuit traced from conductor 620, contacts K11–1, conductor 625, contacts K1–2, conductor 648, switch S–5, conductor 658, the normally closed contacts K7–3 of relay K–7 and conductor 659 which is connected through circuit isolation diodes to one side of the reset coil K12R of Interlock relay K12 and Stepper relay K13. The other side of each of these relays is connected over conductor 619 to the B+ bus 618 through switches S-1, S-2, and S-3. Energization of coil K12R of the Interlock relay K12 closes contacts K12-2, shunting contacts K1-2, to provide a holding circuit for the accounting machine locking solenoid L1, and also closes its contacts K12-1, which are connected to the low potential side of the pull-in coil K12P of relay K12 and to conductor 660, which is connected to an intermediate set of contacts of the timing bank or stepper sequence wafer K13-5.

At 260° of the accounting machine cycle, cam F1 opens timing switch S-5 and removes ground from the Stepper relay K13 which is then de-energized. Upon de-energization, the stepper operates to advance the stepper arms of each of its sequence wafers from their normal or home position to the first contact position. Operation of the stepper from its home position also causes its off-normal switch contacts ON1S to close and transfers its second set of off-normal contacts ON2S to the opposite position from which they are shown. The latter removes ground from the switches S-16 and S-17 of the Skip and Dup. control keys 275 and 276 contained in column 25 of functional control keys on the right side of the keyboard of the accounting machine. Thus the Dup. and Skip keys are effective only when the stepper is at its home position and relay K6 is in its energized or "card" position, as will be explained more fully hereinafter.

*Program I*

Figure 49B:
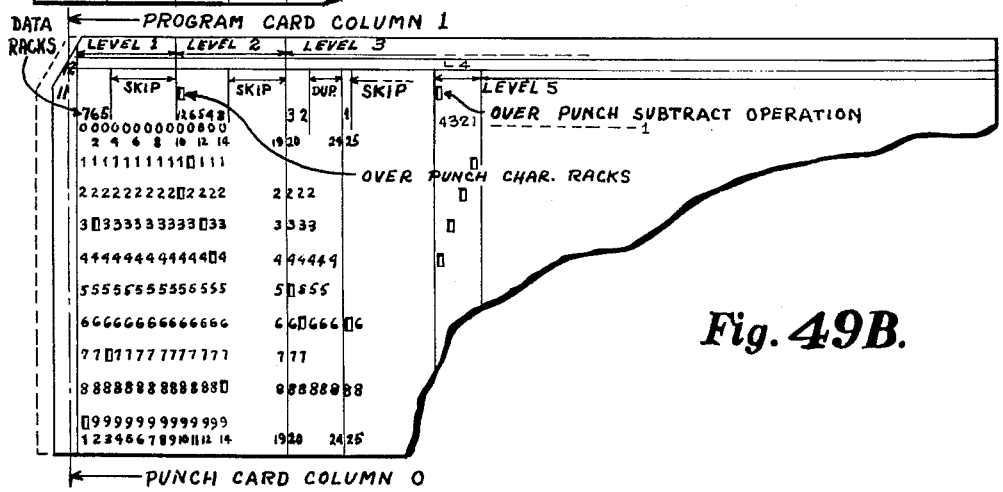

Assume that when the accounting machine is in a carriage position to cause energization of Program Selector relay K1 to select Control Program I, it is desired to read actuator racks 7, 6, and 5 and to punch columns 1, 2, and 3 of the detail card and then skip six card columns to card column 9, as indicated in FIG. 49B. Ground is supplied over a circuit which includes ground conductors 636 and 637, the transferred contacts of the Card Lever operated relay switch 2BU and conductor 652 to one side of the aforementioned switch P-2. This switch is actuated by punch cam P2 and is closed when the punch cams P1–P6 are resting at their normal 345° position prior to the initiation of a punch cycle, as explained in the Gardinor patents. From switch P-2, ground is then supplied over conductor 651 through the normally closed contacts K10-1 of the Interposer Interlock relay K10, the now closed contacts K6-2 of the Card Sensing Relay K6, conductor 650 and the closed contacts K1-3 of Program Relay K1 to the switch arm of stepper bank K13-1 which has been advanced to its first contact position from home position by the closing and opening of timing switch S-5 in the accounting machine, as explained above. This contact of wafer K13-1 is connected by one of the conductors 662-1 contained in stepper output cable 662 to the rear of input contact pin F1 of Column F, Row 1 of the plugboard section labelled Program Sequence Wafer No. 1. Contact pin F1 is connected by program wire 663 on the front of the plugboard to the front of contact pin D7 of the Data Rack section of Column D of the plugboard. The rear of pin contact D7 is connected over one of the conductors 664-7 of cable 664 to the common or input terminal Y of extra-decimal switch DS7 associated with actuator rack No. 7 of the accounting machine.

The conductors of input terminal cable 664 are connected to the rear of a different one of the first 14 pin contacts contained in Rows 1 to 14 of plugboard Column D, as indicated in FIG. 46C. Only 12 of these conductors, however, are wired to the input terminals of the twelve read-out switches employed in the illustrated embodiment of the invention, the conductors from pin contacts D1 and D14 being provided for other machine styles or accounting applications where it is desired to read more than twelve actuator racks.

The respective output contacts 0–9 of the eleven extra-decimal switches are bussed or connected in parallel as indicated in FIG. 18 to provide separate output data busses which are contained in cable 666.

Depending upon the differential position of actuator rack 7, one of the output terminals, say output terminal 9, of extra-decimal switch DS7 will be connected to its input terminal Y to ground one of the data output bus conductors, 666-9, of cable 666 which is taken back to the rear of the plugboard and has its individual bus conductors connected to the rear of respective ones of the pin contacts, which correspond to the output contacts of the decimal switches of the Card Entry section contained in column B of the plugboard.

In the illustrated embodiment of the present invention, only 10 of the conductors of output cable 666 are connected to the rear of the plugboard, and these conductors are connected to pin contacts 10 to 1 contained in Rows 3–12 of Column B thereof. However, provision is made in cable 666 for two additional output conductors, which would be wired to the rear of pin contacts B1 and B2 in the event that one or more duo-decimal switches were employed to read, say, an additional character rack or a register selection rack, depending upon the style of machine and/or accounting application.

As indicated in FIG. 46C, the pin contacts B1 to B12 also are connected from the rear of the plugboard over a twelve conductor cable 668 of FIG. 51B to a different one of the punch operating interposer magnets, labelled I-1 through I-12 contained in the card punch machine, the energizing circuits for the punch magnets I-11 and I-12 being established from plugboard circuit connections to pin contacts B1 and B2, as will be later described.

*Card punch cycle*

Energization of any one of the punch operating interposer magnets, say #9 interposer or I-9, sets up a corresponding punch (#9) in the card punch machine corresponding to the quantity indexed in the accounting machine and as read by the closed data switch (DS7-9) of extra-decimal switch DS7 and also closes the aforementioned interposer bail contacts B.C. When the interposer bail contacts close, ground is supplied over a circuit which includes conductors 636 and 637, the transferred contacts of the Card Lever relay operated switch 2BU, conductor 652, interposer bail contacts B.C., the normal contacts of a two position switch 49-4 operated by a Skip Magnet 49, and the normally closed contacts 46-3 of an Escape Interlock Magnet 46 connected to the low potential side of the Escape Magnet ESC, all contained in the card punch machine. The other side of the Escape Magnet is connected to the B+ but 618 through cam actuated switch contacts P-1 which are closed by punch cam P1 from 180° to 360° of the punch cycle of the card punch machine.

As mentioned earlier, prior to the initiation of the punch cycle before the drive is applied to the punch cam shaft 398 from the drive motor 390, the punch cams are sitting at their 345° rest position, so that punch cam switch P-1 is closed to complete the energizing circuit to the Escape Magnet ESC. The latter then closes its contacts ESC-1 to supply ground from conductor 652 through the normally closed contacts 49-5 of the Skip Magnet 49 to the low potential side of the Escape Interlock Magnet 46, which also receives B+ through punch cam actuated switch P-1. Energization of the Escape Interlock Magnet 46 opens its normally closed contacts 46-3 to de-energize the Escape Magnet ESC, thus permitting one escapement of the card punch machine to advance the detail card at the punching station from its zero to its first column position in which it is to be punched in card column 1.

The Escape Interlock Magnet 46 also closes two additional sets of contacts including contacts 46-4 to energize the punch clutch magnet 395 and contacts 46-1 to ground one side of a hold coil 46H for the Escape Interlock Magnet 46 through cam switch P-2, which is still closed as indicated in FIG. 48B. Upon energization, the punch clutch magnet 395 actuates the punch clutch 394 to engage the punch shaft 398 with the main drive motor 390, which is energized from the input terminals of the power supply 604. This starts the punch cycle causing cam P1 to open its associated switch contacts P-1 at 0° and removes B+ from the punch clutch magnet and the Escape Interlock Magnet 46. The energized hold coil 46H of the Escape Interlock Magnet 46 retains contacts 46-3 open to prevent reenergization of the Escape Magnet ESC when Magnet 46 is deenergized, since reenergization of the Escape Magnet would otherwise cause further escapement and undesired advancement of the card at this time.

Closing of the interposer bail contacts B.C. also supplies ground from conductor 652 through a series circuit provided by the normal contacts 52-3 and 49-3 of the de-energized Dup. 1 Magnet 52 and Skip Magnet 49, conductor 672, and an isolation diode to one side of the Interposer Interlock Relay K10, the other side of which is connected to B+ conductor 619 as indicated in FIG. 51A. Relay K10 then opens its normally-closed contacts K10-1 to interrupt the ground circuit applied serially through the switch arm of Program Wafer K13-1 and the activated output terminal of decimal switch DS7 to #9 interposer, and thus de-energizes the interposer magnet. This permits the interposers to be mechanically reset in the normal manner provided in the card punch machine by 36° of the punch cycle, as mentioned in connection with FIG. 39 herein, and removes the mechanical load that would otherwise be applied to the interposer restoring bail 514 in the normal course of resetting the interposer magnets if the selected punch operating interposer magnet or magnets were held energized beyond this point of time.

During the punch cycle, switch contacts P-6, which are actuated by auxiliary cam P6 of FIG. 35 added to the punch drive shaft of the card punch machine, are caused to close at 10° of the punch cycle, permitting energization of the Stepper relay K13 through its transferred contacts ON2S, which are connected to ground conductor 625, and the normally closed switch contacts K14-1 of the de-energized Duplication Interlock relay K14. At 120° of the punch cycle, auxiliary cam switch contacts P-6 open to de-energize the Stepper relay and thus cause the stepper to advance all of its switch arms to their second contact position from their home position.

The second contact of the selected Program Sequence Wafer K13-1 is connected over conductor 662-2 of Wafer 1 output cable 662 to the rear of plugboard pin input contact F2 the front of which is connected by plugboard connector 674 to the front of contact pin D8 of the Data Rack section of the plugboard. The rear of pin D8 is connected over one of the conductors 664-6 of input cable 664 to the common or input terminal Y of extra-decimal switch DS6 actuated by data rack #6, then through one of the output contacts, say DS6-3, of DS6 back to the plugboard over output bus conductor 666-3 contained in cable 666 to the rear of pin B10 of the Card Entry Section and then over conductor 668-3 of interposer magnet cable 668 to punch operating interposer magnet I-3 to operate the #3 punch corresponding to the "3" indexed in the extra-decimal switch DS6.

Energization of this interposer closes the interposer bail contacts B.C. to initiate another card escapement and punching cycle and steps the stepper to the third contact position upon a cycle of alternate energization and deenergization thereof through the operation of auxiliary cam switch P-6. The third contact of the selected program sequence wafer is programmed through program wire 676 to read actuator rack #5 through DS5 which fires another interposer, say I-7, initiates another card escapement and punching cycle and advances the stepper switch to the fourth contact position for which a skip of six card columns to card column 9 has been programmed, as mentioned above.

*Skipping operation programmed from stepper*

With the switch arm of K13-1 now resting at its fourth contact position and the punch card at its third column position in which it has been punched after reading actuator rack #5, the fourth contact of the first stepper bank K13-1 is connected over conductor 662-4 of Wafer 1 output of cable 662 to the rear of plugboard pin contact F4. The front of this pin contact is connected by plugboard program wire 678 to the front of the Skip pin contact A7, the rear of which is connected by conductor 680 to supply ground to one side of the X-Skip Magnet or relay 45, the other side of which is connected to B+ bus conductor 618. The X-Skip Magnet 45 then closes its contacts 45-2 to energize the Space Interposer Magnet, labelled Space, which closes the interposer bail contacts B.C. The latter complete an energizing circuit to the Escape Magnet ESC, which in turn energizes the Escape Interlock Magnet 46, as described above. This causes an escapement of the detail or punch card to card column 4 from column 3 in which it was previously punched upon reading of actuator rack #5 and results in energization of the Punch magnet 395 which starts a punch cycle. At 10° of the punch cycle, ground is supplied to energize the Skip Magnet 49 through the transferred contacts 45-4 of the energized X-Skip Magnet 45 and the switch contacts P-3 closed by punch cam P3 from 10° to 60° of the punch cycle. The Skip Magnet 49 then closes its contacts 49-1 to place its continued energization under control of the Field Definition switch, labelled Field DEF., which is actuated by the star wheel aligned with Row 12 of the program card and is closed whenever the star wheel senses a hole punched in the 12th row of the program card. The normally closed contacts 49-5 of the now energized Skip Magnet 49 open to prevent re-energization of the Escape Interlock Magnet 46 which would otherwise de-energize the Escape Magnet ESC. The Escape Magnet is now held energized through the transferred switch contacts 49-4 of the energized Skip Magnet and the restored contacts 46-3 of the de-energized Escape Interlock Magnet 46, and thus provides continuous escapement of the detail card under control of field definition.

If 6 card columns are to be skipped as designated above, it will be necessary to have 5 holes punched in columns 5 through 9 of the 12th row of the program card on the program drum as indicated in FIG. 49A herein. Prior to initiating the skip operation, the punch card will be at card column 3, but the program card, which is always one column in advance of the card at the punching station, will be at card column 4. Thus when the X-Skip Magnet 45 is energized upon initiation of the skip cycle, the subsequent energization of the Escape Magnet ESC escapes the punch card to column 4 and the program card to column 5 at which the Field Definition star wheel will find a hole in Row 12 of the program card and will continue the skipping operation through program card column 9 to cause advancement of the program card to column 10 and of the punch card to column 9. At column 10 of the program card, the field definition star wheel finds the absence of a punching, resulting in the raising of the field definition star wheel and opening of the contacts of the Field DEF switch, which de-energizes and causes the Escape Magnet ESC and the Skip Magnet 49 to restore.

*Interposer interlock during skipping cycle*

It will be noted that during the skipping operation, ground is supplied to the Interposer Interlock Relay K10 through the transferred contacts 49-3 of the energized Skip Magnet 49 to energize relay K10 which opens its contacts K10-1 to prevent application of ground from the stepper to an interposer and consequent punching during the skipping operation.

*Word length sensing*

The fourth punching cycle initiated by the skipping operation will have advanced the arms of each of the stepper banks to their fifth contact position. Stepper banks K13–2 and K13–3 are, of course, electrically disabled because Program Selector relays K2 and K3 are not energized and their contacts K2–3 and K3–3 are open. The contacts of the Word Length Sensing Wafer or Stepper bank K13–4 starting with the second contact from home position are shown connected over separate conductors of multi-conductor cable 684 to the rear of pin contacts 1–16 of the Word Length Entry section (Rows 1–16, Column E) of the plugboard, thus providing a maximum word length of 16 card punch operations from each program sequence wafer of the stepper.

Plugboard contact E4 is shown connected by plugboard conductor 686 to the front of pin contact A1 of the Word Length Exit section of the plugboard. The rear of pin contact A1 is connected to the ground bus 620 through the closed contacts K1–4 of the energized Program Selector relay K1, conductor 625, and contacts K11–1. Ground is supplied over the above circuit to the fifth contact of the Word Length Stepper Bank K13–4 and then through its switch arm and conductor 690 to the low potential side of the Word Length Sensing relay K–7 through a circuit isolating diode 691. Relay K–7 is thus energized through the Word Length Sensing Bank K13–4 after the stepper has advanced the stepper switch arms to their fifth contact positions following the fourth punching cycle initiated by the programmed skip operation. Relay K7 thus closes its contacts K7–2 and opens its contacts K7–3 and K7–1.

The opening of contacts K7–1 interrupts the energization of Program Selector relay K1 which then drops out or restores all of its contacts including K1–3 which open to prevent subsequent energization of an interposer through the stepper. Contacts K7–2 provide continuous energization for the Stepper relay K13 through the transferred contacts ON1S of the stepper and interrupter contacts, labelled INT.1. Each time that the Stepper relay K13 is energized INT.1 contacts open to interrupt the energization of the stepper, which then advances to its next contact position, when INT.1 will again close and re-energize the Stepper relay through the contacts K7–2. The latter contacts hold relay K7 energized through the transferred contacts ON1S after the ground circuit from the fifth contact of Word Length Bank K13–4 is removed when the stepper is advanced to its sixth contact position. The stepper switch thus advances to home position during the skipping operation programmed from the stepper. When the stepper reaches its home position, the ground circuit for the Stepper relay K13 and for the stepper resetting Word Length Sensing relay K7 are opened through the opening of ON1S. Upon de-energization of relay K7, its holding contacts K7–2 are restored to their normally open position.

*Timing*

The Timing Wafer, stepper bank K13–5, prevents the accounting machine Interlock relay K12 from opening its contacts K12–2 through which ground is supplied to the Machine Block Solenoid L1 to prevent unlocking of the accounting machine until the stepper has advanced to a contact position such that it will have sufficient time to reach home position prior to the initiation of a subsequent cycle of operation of the card punch control unit, if the accounting machine should be caused to operate, as by a carriage controlled automatic repeat operation, before the stepper has advanced to home position. Locking Solenoid L1 is thus held energized through the contacts K12–2, even after the contacts K7–1 of relay K7 drop out Program Selector relay K1, until the switch arm of the Timing Bank K13–5 of the stepper has advanced to the tenth contact position. From this contact of K13–5, ground will be supplied from conductor 620, through the still closed contacts K11–1, conductors 625 and 626, the switch arm of K13–5, conductor 660 and the closed contacts K12–1 to energize the pull-in coil K12P of the Interlock relay K12. Energization of K12P opens contacts K12–2 to de-energize solenoid L1, which unlocks the accounting machine, and also opens contacts K12–1 to de-energize the pull-in coil K12P. It will be noted that the inductive circuit of relay K12 is broken through its own heavy duty contacts K12–1 and not through the lighter contacts of the timing bank of the stepper relay.

After the accounting machine has been unlocked, the operator may then initiate the second accounting cycle, as by depressing a motor actuating key such as motor bar 28–2, if the quantities for this accounting operation or program have been entered into the keyboard 24 and the accounting machine has been indexed to the second carriage position under the control of the automatic program panel.

*Programming from program sequence wafer 2*

At this carriage position, another lane switch, say lane switch S–28, will be closed to provide ground through timing switch S–7 at 130° of the accounting machine cycle to energize Program Selector relay K2, which closes its hold-in contacts K2–1; contacts K2–2 through which the machine Block Solenoid L1 is re-energized to lock the accounting machine for the subsequent or third punch operating accounting cycle; contacts K2–3 to ground the switch arm of the selected second Program Sequence Wafer K13–2 through contacts K6–2, K10–1 and punch cam actuated switch P–2; and contacts K2–4, through which ground is supplied to one of the contacts of the Word Length Sensing Wafer K13–4 through pin contact A2 of the plugboard. The card punch control unit of the accounting apparatus is thus conditioned for its next operating cycle or program.

Assume that when the accounting machine is at its second carriage position to close lane switch S–28, it is desired to read the differential position of a character rack (rack No. 12) and punch a hole or holes in column 10 of the punch card; and then to read racks 6, 5, 4 and 3, punching holes in card columns 11, 12, 13 and 14 respectively; and then to skip from card column 14 to card column 19.

The switch arms of the stepper banks will be advanced to their first contact position from home position upon a cycle of closing and then opening of cam actuated timing switch S–5 terminating at 260° of the accounting machine cycle. The first contact of Program Sequence Wafer 2 is connected by one of the conductors of multi-conductor Wafer 2 output cable 694 to the rear of the contact G1 of the plugboard section labelled Program Sequence Wafer No. 2. The front of pin contact G1 is connected by plugboard conductor 696 to the front of Data Rack pin contact D2 for data rack 12, which is a twelve-pitch character rack associated with keyboard column 37 of the accounting machine. The rear of pin contact D2 is connected over one of the conductors 664–12 contained in input cable 664 to the common or input terminal Z of the duo-decimal switch DS12, which is actuated by the above identified character rack.

*Reading of character rack*

Further, assume that when, say, the tenth key of this character rack key column of the accounting machine is depressed, it is desired to punch a letter in the IBM detail card and that a digit is to be punched in the card whenever any other key of the character rack is indexed. That is when the first key of the character rack column was depressed a "1" would be punched, a "2" for the second key, etc., an "11" for the eleventh key, and a "12" for the twelfth key.

As brought out in the Gardinor patents, a letter in the IBM card is represented by two holes punched in the same column, so whenever the tenth key of the character rack column is indexed, it will cause the punching of two holes in the same column of the IBM card, say a "two" and an "eleven" which signify the letter "K."

The individual output contacts 1 through 12 of the duo-decimal switch DS12 associated with 12 pitch actuator rack #12 are not bussed to the output bus conductors of output cable 666. Instead, they are brought out through separate character rack output bus conductors contained in the 12 conductor output character cable 698, the separate conductors of which are connected to the rear of the respective pin contacts 1–12 of Column C of the Character Rack Section of the plugboard 532. These pin contacts, except for contact C3, are then connected by individual plugboard connectors 700—710 from the front of the plugboard to the corresponding pins of the adjacent Card Entry section of Column B in accordance with the character rack program designated above and is indicated in the wired program board of FIG. 46 herein. In order to punch the letter designated for the tenth key of the character rack, the pin contact C3 corresponding to the tenth character rack key is connected over plugboard connector 714 to the front of pin contact A19, which is an entry pin for one of the isolating germanium diode buffers of FIG. 46A, the two exits of which are wired to the rear of pin contacts A20 and A21.

Exit pin A21 is connected by plugboard conductor 716 to the front of pin contact B2 of the Card Entry section. The rear of pin contact B2 is connected by conductor 668–11 of interposer cable 668 to the #11 interposer magnet, while the front of buffer exit pin contact A20 is connected by plugboard conductor 718 to the front of pin contact B11 of the Card Entry section. The rear of pin B11 is connected over one of the conductors 668–2 of cable 668 to the #2 interposer in the card punch machine.

Upon firing of the "2" and "11" interposers, the interposer bail contacts B.C. are closed to set up the "2" and "11" punches, and initiate an escapement of the card from card column 9 to card column 10 and a punching cycle in which the "2" and "11" punches are simultaneously actuated to punch a "2" and "11" in column 10 of the detail card.

Upon completion of the punching, for character rack 12, the switch arms of the stepper are advanced to their second contact position through the energization and de-energization cycle of the Stepper relay coil K13 caused by the closing and opening of auxiliary cam switch P–6.

With the plugboard wired as indicated in FIG. 46, racks 6, 5, 4 and 3 are then read in sequence, resulting in the punching of holes, say a 1, 3, 4 and 8, in punch card columns 11–14, respectively and advancing of the stepper switch to its sixth contact position. In this position a skip of 5 card columns is initiated from Program Sequence Wafer 2 under the control of Field Definition to advance the IBM card at the punching station to card column 19. Upon the first punching cycle initiated by the skipping operation programmed from the sixth step of the stepper bank K13–2, the switch arms of the stepper will have advanced to their seventh contact position.

The seventh step or contact of the World Length Sensing Bank or Wafer K13–4 is connected over one of the conductors of cable 684 to the rear of plugboard pin contact E6, which is connected by plugboard conductor 726 to the front of pin contact A2 of the Word Length Exit section, where the Word Length Sensing wafer K13–4 of the card punch control unit "sees" word length through closed contacts K2–4 to ground and energize the stepper reset or Word Length Sensing relay K7. The latter homes the stepper during the skipping of card columns 15 through 19, in the manner previously described, in preparation for a subsequent punching operation in the next operating cycle of the control unit.

*Programming from program sequence wafer 3*

Assume that when the accounting machine is at carriage position 3, lane switch S–29 is actuated, and that it is desired to read racks 3, 2, and 1 in which holes are to be punched in card columns 20 and 21 of the card at the punch station for racks 3 and 2 to be followed by a duplication in card columns 22, 23, 24 of holes punched in the corresponding columns in the card at the read station, after which it is desired to read rack 1 and punch a hole in card column 25. It will be necessary to assume that a pre-punched lead card or master card has been positioned at the reading station, or that the card at the reading station was the first card released from the card hopper and the card at the punching station was, say, the second card. A card may be automatically positioned at the read station by depressing the Release key 274 (key #4) after the first two cards have been fed from the card hopper, as described under the section entitled Operation herein, to apply ground over a circuit traced from conductor 620, contacts K11–1, conductor 625, contacts ON2S, conductor 627, Release key operated switch S–8, and conductor 628 to the Release relay R1. Energization of R1 releases the first card at the registration position at the punching station to the reading station, shifts the second card to the registration position and feeds a third card from the hopper to the pre-registration position, as explained in the Gardinor patents.

Upon completion of the duplication cycle and the reading of rack 1, further assume that it is desired to skip the card at the punching station from card column 26 to the end of the card at card column 80. At column 80 the card is to be automatically released from the punching station and then advanced to the reading station, while the following card at the pre-registration position B is advanced to registration position D and another card is fed from the hopper to the pre-registration position B of FIG. 34.

Upon indexing of the amount keys contained in the three lowest denominational orders of amount keys of section 34 of the keyboard of the accounting machine and actuation of a motor bar key, the Stepper relay K13 is alternately energized and de-energized by the closing and opening of timing switch S–5 and the switch arms of the stepper banks are advanced to their first step or contact off-home position. In this carriage position, Program Selector relay K3 is energized through lane switch S–29 to apply ground through the switch arm of the third Program Sequence Wafer K13–3. The first step or contact of this sequence wafer is connected over one of the conductors of multi-conductor Wafer 3 output cable 728 to the rear of plugboard pin contact H1. The front of this contact is connected by plugboard connector 730 to pin contact G5 which is connected by connector 731 to Data Rack pin contact D11. The rear of D11 is connected by one of the conductors 664–3 of input cable 664 to the input of decimal switch DS3 to read rack 3 and energize an interposer, say I–5, as described above. This initiates a card escapement of the punch card to column 20 followed by a punch cycle and advancement of the stepper switch to its second contact position. Ground is then supplied from the second step or contact position of K13–3 to the rear of plugboard contact H2, which is shown connected by plugboard connector 732 to the front of Data Rack pin contact D12. The latter is connected from the rear of the plugboard to the input terminal Y of extra-decimal switch DS2 to read rack 2, fire another interposer, say I–6, initiate another card escapement and punch cycle, and advance the stepper to its third step or contact position from which a duplication operation has been programmed through the activated bank K13–3. The card at the punching station has now been punched for racks 3 and 2 in columns 20, 21 and is sitting at the punching station in the last column punched therein, i.e. card column 21.

*Duplication programmed from stepper*

The third contact of Program Sequence Wafer K13–3 is connected over conductor 728–3 of Wafer 3 output cable 728 to the rear of plugboard pin contact H3, which is connected by plugboard connector 734 to the front of Dup. pin contact A8 of the plugboard. Contact A8 is connected from the rear of the plugboard by circuit conductor 736, the normally closed contact 46–2 of the Escape Interlock Magnet 46 and the lower or normal switch contacts of 50–5 of the de-energized Dup. 2 relay magnet 50 to the low potential side of Dup. 1 Magnet 52, the high potential side of which is connected to B+ bus 618 by conductor 622. Energization of Dup. 1 Magnet 52 transfers all of its relay contacts, including 52–4 which close to provide ground from conductors 636 and 637, the upper or transferred contacts of switch 2BU of the Card Lever Relay 2B, conductor 652, the normal or illustrated contact position of switch 50–4 of the de-energized Dup. 2 relay 50, the closed contacts 52–4 and conductor 673 to energize the one-revolution Punch Clutch Magnet 395. This starts a punch cycle without initiation of an escapement, since the interposer bail contacts B.C. where not closed to energize the Escape Magnet ESC and to start a punch cycle in the manner described above. The card at the punching station, therefore, is still sitting there in card column 21.

During the duplication initiated punch cycle, punch cam P3 closes the contacts of its associated switch P–3 at 10° of the punch cycle to provide ground from conductors 636 and 637 through the transferred contacts of the card lever relay operated switch 2BU, conductor 652, cam switch P–3, the normal contacts of switch 45–4 of the de-energized X-Skip relay 45, the now closed contacts 52–5 of the energized Dup. 1 Magnet 52, and the normally closed contacts 46–5 of the de-energized Escape Interlock Magnet 46, thereby to energize Dup. 2 Magnet 50. Dup. 2 Magnet 50 then transfers all of its switch contacts including 50–4 to interrupt the above described energizing circuit for the Punch Clutch Magnet 395 and prevents initiation of any further punch cycles in this manner.

Contacts 50–2 of Dup. 2 Magnet have closed to permit ground to be applied from the transferred contacts of switch 2BU through switch contacts P–5, which are closed by punch cam P5 at 86° of the punch cycle, over conductor 740 through the now closed contacts 50–2 of Dup. 2 Magnet 50 to the card sensing pin contact bus 742. The read switch contact actuating pins of the card sensing mechanism are raised at approximately 76° and retracted at approximately 176° of the punch cycle to sense the presence or absence of a hole in the read card, as previously described herein. The presence of a hole or holes in the column of the card located above the row of sensing pins at the reading station will close one of the 12 sets of card sensing pin switch contacts RS–1 to RS–12 to furnish ground therethrough from the above-described ground circuit to one of the punch operating interposer magnets, energizing the same and setting up a corresponding punch.

It will be recalled that in the normal course of operation of the card punch machine, the punches strike the record card at approximately 93° of the punch cycle, and it will be apparent that it is now too late in the punching cycle to punch a hole in the card at the punching station, since cam switch P–1 through which B+ is supplied to the Escape Magnet ESC and the Punch Clutch Magnet 395 is now open so that a card escapement and consequent punching cannot occur until cam switch P–1 closes at 180° of the punch cycle. While the interposer magnet selected through the activated read switch closed by the selected card sensing pin becomes de-energized when cam switch P–5 removes ground from the conductor 740 connected to the sensing pin contact bus 742 at 166° of the punching cycle, the interposer magnet remains tripped and keeps the interposer bail contacts B.C. closed. At 180° of the punch cycle, the Escape Magnet ESC and Punch Clutch Magnet 395 will be energized through the closing of cam switch P–1 to initiate an escapement of the punch card to column 22 and cause the punching of a hole therein, thereby duplicating the hole sensed by the read contacts in the card at the read station.

The punch card is now sitting at column 22 and the program card at column 23. If a hole is punched in the columns 23 and 24 of the 12th Row of the program card 431 as indicated in FIG. 49A, the star wheel actuated Field Definition switch will close and hold the Dup. 2 and Dup. 1 Magnets 50 and 52 energized to continue the duplication in columns 23 and 24 of the punch card of the quantities punched in the corresponding columns of the card at the read station.

*Duplication of blank columns*

It will be noted that if the card at the read station had a blank column at, say, card column 23, none of the duplication sensing switch contacts RS–1 to RS–12 would be closed. Therefore, none of the punch operating interposer magnets can be fired. Thus, the interposer bail contacts B.C. will remain open and no escapement and punching cycle can be initiated. Accordingly, the card punch machine will be disabled, with the card at the read and punch stations remaining at column 23, and 22, respectively.

In order to avoid this difficulty and to continue operation of the system under this condition, the card punch control unit is provided with a Duplication of Blank Columns feature by means of which ground is supplied over a circuit extending through the transferred contacts of the Card Lever relay operated switch 2BU, conductor 746, the closed contacts KII–3 of the energized Control Transfer relay K11, and conductor 748 connected to one side of a set of switch contacts 50–3 operated by Dup. 2 Magnet 50, which is energized as previously described, during a duplication cycle. The other side of switch contacts 50–3 is connected by conductor 750 as shown in FIG. 51B to complete an energizing circuit for the Escape Magnet ESC through the normal contacts of switch 49–4 of the de-energized Skip Magnet 49 and the normally closed contacts 46–3 of the Escape Interlock Magnet 46 to energize the Escape Magnet and provide an escapement to the next card column (column 24) in the event that there should be a blank column in the preceding column of the card at the read station.

*Interposer interlock*

It will be noted that when Dup. 1 Magnet 52 was energized, it provided ground from ground conductor 620 through its transferred contacts 52–3 and the normal contacts of switch 49–3 of Skip Magnet 49 and conductor 672 to energize the Interposer Interlock relay K10. K10 then opens its contacts K10–1 in the stepper ground circuit to prevent firing of an interposer through the stepper during the repeated duplication cycles.

It will be noted that the Interposer Interlock relay K10 is also energized through cam switch P–5 from 86° to 166° of each punch cycle. During programmed duplication cycles, K10 is already energized, as mentioned above. For operations other than duplication operations, the energization of relay K10 through cam switch P–5 serves to delay the application of ground through the stepper to an interposer in order to prevent unwanted duplication from a preceding card while the duplication read or sensing pin contacts RS1 to RS12 of the Card Punch Machine are operated.

It will be recalled that the card sensing pins associated with these contacts are raised during each punch cycle at approximately 76° of the punch cycle and are retracted or restored at around 176°. Thus, if the card at the read station had two holes, say a "1" and a "6," punched in the column positioned under the read pins of the card reading mechanism, and if the number 1 punch interposer magnet were energized through the stepper at this time, ground would also be applied to read pin switch bus 742 through read switch RS–1, which is closed by the hole punched in row 1 of the card at the read station.

Since read switch RS–6 would also be closed by the hole punched in the sixth row of the card at the read station, ground would also be applied from contact bus 742 through switch RS–6 to energize the number 6 interposer, as well. Thus, in addition to punching a "1" in the card at the punch station, a "6" would also be punched in row 6 of the punch card, which is, of course objectionable since a duplication was not programmed in this case.

Therefore, by energizing the Interposer Interlock relay K10 through cam switch P–5 from 86° to 166° of the punch cycle, the application of stepper ground is delayed until such time that the energization of an interposer from a contact of the stepper will take place after the read sensing pins are retracted. Thus, unwanted duplication, that might otherwise occur, is prevented in this manner.

*Stepper duplication interlock*

In order to prevent advancing of the stepper during the repeated duplication cycles programmed from the stepper, the Duplication Interlock relay K14 is caused to be energized through the transferred contacts of switch 50–4 operated by the energized Dup. 2 Magnet 50 and the second set of interrupter contacts INT.2 of the stepper switch. Contacts INT.2 close upon the energization of the Stepper relay K13 through auxiliary cam switch P–6, which closes at 10° of the first punch cycle initiated by the energization of Dup. 1 Magnet 52 upon initiation of the programmed duplication cycles from the stepper, and applies ground from conductor 652 through the transferred contacts of 50–4, conductor 754, and INT.2 contacts to energize relay K14. Relay K14 thus opens its normally closed set of contacts K14–1, which are connected in series with the auxiliary cam operated switch P–6, and prevents subsequent energization of the Stepper relay K13 each time cam switch P–6 opens and closes during the subsequent duplication and punching cycles in card columns 23 and 24 initiated under the control of the star wheel actuated Field Definition switch. The stepper, therefore, is advanced to the fourth contact of its respective stepper banks upon initiation of the first duplication cycle in punch card column 22 and remains at that position during the duplication of card columns 23 and 24.

The duplication programmed from the stepper will be terminated at program card column 25 when the Field Definition star wheel senses the absence of a hole in the 12th Row of the program card and opens the contacts of the Field Definition Switch. This results in de-energization of the Dup. 1 and Dup. 2 Magnets 52 and 50 and terminates the duplication cycle as explained in the Gardinor patents. The card at the punching station then will be at card column 24 and the stepper switch will be at its fourth step or contact position.

The fourth contact of the activated Program Sequence Wafer K13–3 is connected over conductor 728–4 of Wafer 3 output cable 728 to the rear of pin contact H4 of the Program Sequence Wafer No. 3 section of the plugboard, the front of which pin contact is connected by program wire 756 to the front of Data Rack pin contact D13. The latter pin contact is connected from the rear of the plugboard by one of the conductors 664–1 of input cable 664 to the input terminal Y of decimal switch DS1 to read actuator rack 1 and fire an interposer to close bail contacts B.C., escape the punch card to column 25, punch a hole, say a "6," in column 25 and advance the stepper to its fifth contact position.

The fifth contact of the selected Program Sequence Wafer K13–3 is connected via conductor 728–5 of Wafer 3 output cable 728 to the rear of pin contact H5, which is shown connected by program wire 758 to the front of pin contact G6. The latter contact is shown connected by programming wire 759 to pin contact F4 which in turn is connected by program wire 678 to the front of Skip contact A7. Pin contact A7 is connected via conductor 680 from the rear of the plugboard to the X-Skip Magnet 45. Energization of the X-Skip Magnet 45 closes its contacts 45–2 to energize the Space Interposer Magnet which closes the interposer bail contacts B.C. to cause an escapement of one card column of the program card and record card and to initiate a skip operation, as previously described, under the control of Field Definition. The skip may be programmed to the end of the card at card column 80 by punching holes in each column of Row 12 of the program card from column 27 through 80, the program card being situated at card column 26 upon the completion of the reading of rack 1 in which a hole was punched in column 25 of the punch card and being advanced to program card column 27 upon initiation of the subsequent skip operation from the stepper.

Initiating the skip cycle closes the interposer bail contacts B.C. and causes an escapement and punch cycle during which the Stepper relay is alternately energized and de-energized through the operation of auxiliary punch cam actuated switch contacts P–6 and the stepper switch is advanced to its sixth step or contact position. At this position, the Word Length Sequence Wafer K13–4 "sees" word length and homes the stepper through the Word Length Sensing stepper reset relay K7, as previously described, while the card is skipping out. During the homing of the stepper, the machine block is removed from the accounting machine through the Timing Bank K13–5 and Relay K12, as previously described.

Should the stepping operation of the stepper malfunction for any reason when the stepper is off of its home position, the Reset Key 272 on the accounting machine may be actuated to establish an independent energizing circuit for relay K7 through the Reset Key operated switch S–19, the off-normal contacts ON1S of the stepper, conductor 625, switch contacts K11–1 and ground conductor 620.

At the end of the skipping operation, the IBM card at the punching station will be at card column 80 and ready to be released in the normal manner described below provided in the card punch machine.

*Card release cycle*

The program card 431 on the program drum 408 is always one card column in advance of the card at the punching station and will be at program card column 81, where cam switch contacts PC–1 of the program drum will be closed at program card column 80 1/3, as mentioned earlier. B— is thus applied from ground conductor 636 through PC–1 contacts and conductor 760 to the Skip Magnet 49, which transfers its contacts 49–4 and energizes the Escape Magnet ESC to start a card escapement cycle. Switch contacts 49–5 of Skip Magnet 49 open to prevent energization of the Escape Interlock Magnet 46, thereby permitting continuous escapement.

Program drum cam switch PC–2 transfers its common contact to the opposite position shown at program card column 82 1/2 to apply B— from ground conductor 636 through contacts PC–2 and over conductor 661 to the Card Feed Clutch Magnet 407 which starts a card feed cycle advancing the card at the pre-registration position B to registration position D, feeding a new card from the hopper to the pre-registration position and advancing the completed punched card to position E at the reading station. The program drum cam switch contacts PC–2 restore at program card column 87 to prevent re-energization of the Card Feed Clutch Magnet. Program drum cam switch PC–1 contacts open at program card column 88 1/6 to de-energize the Skip Magnet 49 and the Escape Magnet ESC and stop the escapement, following which the cards will be registered at the reading and punching stations.

*Card feed cycle interposer interlock*

In order to prevent the stepper from energizing an interposer and initiating a punching cycle while a completed card is being released during the card feed cycle, the aforementioned Interposer Interlock relay K10 is caused to be energized through an electronically controlled switching circuit which includes the thyratron 534, Card Feed Interlock relay K-8, and the Card Feed Interlock Release relay K-9. Filament power for the thyratron tube 534 is supplied from the 6.3 volt terminals 613, 614 of the step-down transformer 609 connected to the input terminals of the power supply, the —49 volt bias terminal 615 of which is connected to the thyratron control grid. A suitable source of potential, such as a battery shown at 762, has its positive terminal connected to the grid of the thyratron and its negative terminal connected via conductor 763 to one side of another star wheel controlled switch SW-1, which is actuated from the program drum of the IBM machine and is closed whenever the star wheel associated with switch SW-1 senses a hole punched in Row 1 of the IBM program card. Such a hole is provided in the program card after the last column punched therein, as indicated in FIG. 49A. For the program schedule designated herein, this would be program card column 27, since the program card was sitting at column 26 after a hole was punched in punch card column 25 upon reading of rack 1 and was advanced to program column 27 upon initiation of the skip operation programmed from the fifth contact of Program Sequence Wafer No. 3.

Thus, when the star wheel actuated switch SW-1 is closed to overcome the bias on the thyratron, the thyratron fires and energizes relay K8 through the normally closed contacts K9-1 of relay K9. Relay K8 then closes its contacts K8-1 to supply ground to the Interposer Interlock relay K10 from ground conductor 620, contacts K11-1, and conductors 625 and 626, as shown in FIG. 51A. Energization of relay K10 opens its contacts K10-1 in the ground circuit of the switch arms of the program sequence wafers to prevent application of stepper ground to a punch interposer magnet while the completed card is being released from the punching station. Contacts K9-1 of relay K9 open at 90° of the card feed cycle, which is initiated as discussed above upon release of the card from the punching station. Relay K9 receives ground from circuit conductors 636, 637 and 638, cam actuated switch CF-3, conductor 764 and a circuit isolation diode when CF-3 closes at 70° of the card feed cycle and receives B+ from B+ connected conductor 619 contacts K11-2, conductor 766, cam actuated switch CF-1, conductor 767, and contacts K11-8 when CF-1 closes at 90° of the card feed cycle, at which time the subsequent card will be in proper punching position located one card column in advance of card column one at the punching station.

Thus the Interposer Interlock relay K10 will be held energized until 90° of the card feed cycle, during which time its contacts K10-1 will be open to prevent application of stepper ground through any one of the actuator rack read-out switches and thus prevents firing of an interposer and initiation of a card escapement and punching operation during the card feed cycle. Contacts K9-1 will remain open from 90°, until CF-3 opens at 150° of the card feed cycle. The opening of switch contacts K9-1 removes the operating voltage from the anode of the thyratron, which then de-ionizes and drops out relay K-8. Switch contacts K8-1 of relay K8 then open to de-energize relay K10, which then restores its contacts K10-1 to their normally closed position. The card punch control unit is then conditioned for operation with the new card at the punching station.

*Manual skip and duplication*

The switches actuated by the Skip Key 275 and Dup. Key 276 (keys 3 and 2) of control key column 25 of the accounting machine are effective only when the switch arms of the stepper are at their home position and when a card is in position at the punching station. Under these conditions, either of these keys can be depressed, say Dup. Key 276, to supply ground over a circuit traced from ground conductor 620, switch contacts K11-1, conductor 625, switch ON2S in its home or normal position shown, conductor 627, the upper or transferred contacts of switch K6-3, the normally closed switch contacts K10-2, and conductor 768, which is connected to one side of each of the switches S-16 and S-17 actuated by the Dup. Key and the Skip Key. The other side of the Dup. key operated switch S-16 is connected by conductor 769 to energize Dup. 1 Magnet 52 through the normally closed contacts 46-2 of the de-energized Escape Interlock Magnet 46 and the normal contacts 50-5 of the de-energized Dup. 2 Magnet 50. This initiates a duplication cycle as previously described and applies ground to energize the Interposer Interlock relay K10 from ground conductor 620, the transferred contacts 52-3 of the now energized Dup. 1 Magnet 52, the normal contacts 49-3 of the Skip Magnet 49, a circuit isolation diode and conductor 672 connected to K10, which opens its switch contacts K10-2, thereby placing the energization of Dup. 1 Magnet 52 under the control of Field Definition. If no hole is provided in Row 12 of the program card, the Field Definition switch actuated by star wheel 12 will remain open and drop out Dup. 1 Magnet 52 to terminate the duplication after duplication of one card column. Relay K10 will drop out upon restoration of switch 52-3 to its normal position shown and recloses its contacts K10-2 to permit another duplication cycle, if the Dup. Key 276 is again actuated or is held depressed.

Depression of the Skip Key 275 on the accounting machine completes the above-described ground circuit from switch contacts K11-1, switch contacts ON2S, the transferred switch contacts K6-3, and closed switch contacts K10-2 to one side of Skip switch S-17, the other side of which is connected by circuit conductor 770 to the low potential side of the X-Skip Magnet 45. Energization of the latter, closes the interposer bail contacts B.C. through energization of the Space Interposer Magnet SPACE to initiate a card escapement and punch cycle and causes the energization of the Skip Magnet 49 through punch cam switch contacts P-3 at 10° of the punch cycle. Upon energization, Skip Magnet 49 completes a ground circuit path for the Interposer Interlock relay K10 through the transferred contacts of switch 49-3. The switch contacts K10-2 of thus energized relay K10 open to prevent the continued depression of the Skip Key 275 (key #3) from initiating another skipping operation through Skip switch S-17. The depression of the Skip Key also closes the Skip Interlock switch S-18 through which ground is supplied over a circuit traced from conductor 620, K11-1, conductor 625, switch contacts ON2S, conductor 627, the transferred contacts of switch K6-3, now closed switch contacts K10-3, conductor 771, Skip Interlock switch S-18, and conductors 772 and 672 to maintain relay K10 energized until the Skip Key is released.

A skip of more than one card column can be provided in this manner by placing the energization of the Skip Magnet 49 under the control of the Field Definition Switch actuated from the Field Definition Star Wheel (Star Wheel 12) by the punching of holes in the 12th Row of the program card. In this connection, it will now be apparent that Auto-Skip operations can be programmed from the program card through the use of a star wheel actuated switch, SW-11, and the provision of holes in the corresponding or 11th row of the program card, thereby to energize the Skip Magnet 49, as indicated in FIG. 51B. Auto-Dup. operations can be provided similarly by the use of still another star wheel actuated switch to energize the Dup. 2 Magnet as indicated in FIG. 50C.

*Subtract operations*

Subtract operations of the accounting machine are sensed by the minus indication switches S-12 and S-13 which are actuated from the symbol indexing slides and the add control slide, as mentioned in connection with FIGS. 28 and 29 herein. For add operations, the switches are open and one or more of them may be closed for subtract operations. For such subtract operations, it may be desired to disable the punching operation of the card punch machine so as not to punch a hole in the punch card. This may be accomplished in the present system by providing ground upon closing of timing switch S–6 at 200° of the accounting machine cycle to one side of each of the switches S–12 and S–13. The other side of each of the minus indication switches for accumulators A and B is connected by circuit conductors 776 and 777 to the rear of plugboard pin contacts A15 and A16, respectively. If it is desired to disable the punch, these pin contacts are connected via program wires 780 and 781 to the front of plugboard Punch Disable pin contact A12, which is connected via circuit conductor 657 from the rear of the plugboard to relay K7. Relay K7 is thus energized to open its contacts K7–3 and prevent energization of the Stepper relay K13 when timing switch S–5 closes at 230° of the accounting machine cycle. Thus, the stepper is prevented from advancing from its home to its first contact position and an interposer cannot be fired, whenever the accumulators are in subtract condition in any carriage position of the accounting machine.

Through the use of the Plugboard Selector Relays K15 and K16, the control apparatus of the present invention affords a selection of punching of the card on subtract operations at certain carriage positions of the accounting machine, providing at a different carriage position or positions a coded overpunch in which a hole is punched in, say, the eleventh row of the punch card over the first significant digit of the negative quantity, or disabling the punching of the card when the accumulators are in subtract condition at still other carriage positions of the accounting machine. The manner in which this is accomplished will be explained with reference to the schematic circuit diagram of the card punch control unit of FIGS. 47A and 47B in which provision is made for five different control programs from the first five switching levels of the stepper relay shown therein. In this case, program wire 781 is removed and replaced with a program wire 782 extending from pin contact A16 to the front of pin contact G17 of the Lane 32 Selector section of the plugboard. The rear of pin contacts E17; F17; G17; H17; J17; and K17 of this section of the plugboard are connected to the various terminals of relay K16, as indicated in FIG. 46B herein. As shown in FIG. 49A, one side of the Pull-In coil and the Reset coil of relay 16 is connected to B+, and their opposite sides are selectively connected through a respective one of the two positions of a two-position switch S–32, which is actuated by a control lug in lane 32 of the accounting machine, to the transfer or lower contact of timing switch S–7.

If the accounting machine is in a carriage position where the control panel 248 thereof does not contain a control lug in lane 32, lane switch S-32 will be in its normal position shown, and the input or common terminals of relay 16 will be connected to their respective normal contacts.

Assume that the accounting machine is at a carriage position where a subtract quantity, say "−4321," is inserted in the accounting machine and that the punch card is to be punched in columns 33 to 36 by programming from, say, Stepping Switch Level No. 4 of FIG. 47A. Further assume that it is desired to provide an "11" overpunch over, say, the first significant digit, i.e. the "4," of the minus quantity to be entered at this carriage position. It also will be necessary to modify the previously described punching of the program card so that the skipping operation programmed from Program Sequence Wafer K13-3 of FIG. 51A does not skip the punch card to the end of the card.

In this case, a lane control pin in lane 32 will not be provided and lane switch S-32 will remain in its position shown. The Reset coil of relay K16 will be energized upon closing of timing switch S–7 at 130° of the accounting machine cycle to connect pin contact G17 to F17 over a circuit completed through a common and a normal contact of relay K16 connected to the rear of the plugboard. Plugboard pin contact F17 is connected by program wire 783 to pin contact D18 of the Selector section, the rear of which pin contact is connected to the low potential side of the Pull-in coil of Plugboard Selector relay K15, as indicated in FIG. 47A. The high potential side of the Pull-in coil and of the Reset coil of relay K15 are connected to B+, and the low potential side of the Reset coil is connected over circuit conductor 784 and through circuit isolation diode 785 to the transfer or lower contact of timing switch S-7, as indicated.

Thus, in the absence of a control pin in lane 32, ground is supplied from one or both of the minus indication switches S–12 or S–13 to one or both of the plugboard pin contacts A16 and A15, which are connected by program wires 780, 782 and 783 to energize the Pull-in coil of relay K15. Relay K15 then transfers its common contacts one of which is connected to the rear of the plugboard pin contact G18, to its transfer contact connected to the rear of pin contact E–18. The common pin contact G18 is connected by program wire 788 to a buffer exit pin contact, say, G21. The transfer pin contact E18 is connected by program wire 790 to pin contact A21 which is connected by program wire 716 Card Entry pin contact B2, the rear of which is connected to Interposer 11. Buffer Entry pin contact G19 is connected by program wire 792 to contact pin J1, which is connected to the first pin contact of Program Sequence Wafer No. 4, while buffer exit pin G20 is shown connected by program wire 794 to the front of one of the pin contacts, say, D10, corresponding to the actuator rack for the highest denominational order of the negative quantity to be entered at this carriage position. The rear of pin contact D10 is connected to the common or input terminal Y of decimal switch DS4 associated with actuator rack #8 of the accounting machine.

A circuit will then be completed from the first step or contact of Program Sequence Wafer No. 4 of the stepper switch to the plugboard pin contact J1, program wires 792 and 794 to read, decimal switch DS4 and energize an interposer magnet, say I–4, in accordance with the differential setting of rack 4 and switch DS4. A branch circuit will also be completed from buffer exit pin contact G21 and program wire 788 to pin contact G18, which is connected through the common terminal of the energized relay K15, to the rear of transfer pin contact E18, the front of which is connected by program wires 790 and 716 to pin contact B2. The rear of the latter pin contact is connected to the number "eleven" interposer of the card punch machine, as previously described. Thus, a hole corresponding to the position of data rack #4 will be punched in this column of the punch card together with a hole in Row 11 thereof to indicate that the punched quantity is a subtract or minus amount.

If a control lug had been provided in lane 32 to actuate lane switch S-32, the Pull-in coil of relay K16 would have been energized to transfer its switch contacts connected to the rear of the Lane 32 Selector section of the plugboard, so that at 200° of the accounting machine cycle and before the stepper relay can be energized, ground would be supplied from the closed minus indication switches S–12 or S–13 to pin contact A16 and/or A15 and over program wire 782 to pin contact G17, which is now connected to the rear of relay 16 transfer pin contact E17. The latter is connected by program wire 796 to pin contact A12 of the Punch Disabled section of the plugboard, and the rear of contact A12 is connected by circuit conductor 657 of FIG. 51A to the low potential side of the reset relay K7. Energization of relay K7 opens its contacts K7-3 to interrupt the energizing circuit for the Stepper relay K13 when timing switch S-5 closes at 230° of the accounting machine cycle and thus prevents advancing of the stepper and the consequent energization of an interposer magnet, as previously described.

The card punch control unit also permits punching of minus quantities in other carriage positions of the accounting machine without providing an overpunch, if desired. Assume that at the carriage position in which lane switch S-31 of FIG. 47 is actuated to energize Program Selector relay K5 and actuate stepping switch level No. 5, a minus quantity is to be punched without providing an overpunch. Instead of wiring pin contact K1 to a buffer entry pin contact, as was done in the case of contact pin J1 of Program Sequence Wafer No. 4 section of the plugboard, this pin contact is connected directly by program wire 798 to a pin contact, say D10 of the plugboard Data Rack section corresponding to the highest order actuator rack or first significant digit of the minus quantity to be entered at this carriage position. Thus, the data racks are read, just as in the case of the operations programmed from Program Sequence Wafers 1, 2, and 3 described in connection with FIGS. 51A and B. While the minus switches S-12 and S-13 are closed, no entry connection is made to a buffer entry pin contact and an "11" overpunch will not be provided.

From the foregoing, it should be apparent that carriage selective punching and overpunching can be provided for add operations as well as for subtract operations by the use of lane switch S-32 and the Plugboard Selector relays K15 and K16. In fact, lane switch S-32 and the plugboard relays permit carriage selective modification of any punching operation programmed from the stepper.

*Alternate program*

Certain models of the IBM card punch machine are provided with an alternate program feature by means of which two different control programs may be provided from the program card to permit punching of cards with two different formats. The alternate program is derived from the lower half of the program card in which holes may be punched in Rows 4 to 7 of the non-printing model and in Rows 4 to 9 for the printing model for providing Field Definition, Skip, Duplication and other operations similar to those provided by the punchings in the upper half of the program card.

The alternate program is made active by depression of the "Alt. Prog." key to energize an alternate program control relay, identified as K-39 in FIG. 51A herein. Energization of the Alternate Program relay K-39 causes it to transfer its contacts to disable the electrical control circuits of the star wheel actuated switches associated with the upper half of the program card and to render effective the electrical control circuits of the star wheel actuated switches associated with the lower half of the program card, in a manner known to those familiar with this style of card punch machine.

If the card punch machine is equipped with this feature, the card punch control unit of the present invention may be readily adapted for use therewith simply by wiring pin contact plugboard terminals B17 to C17 and B18 to C18 via program wires 800 and 802, respectively. As indicated in FIG. 51B, the rear of pin contacts B17 and B18 are connected by separate circuit conductors 804 and 806 to switch S-19 operated by the "Reg. Alt. Pro." control key 277 of the accounting machine. Pin contact C17 is connected from the rear of the plugboard by circuit conductor 808 to one side of the Alternate Program relay K39, the other side of which is connected by conductor 810 to B+ conductor 632, while pin contact terminal C18 is connected from the rear of the plugboard by circuit conductor 812 to circuit conductor 768. Thus, depression of control key 277 on the accounting machine, actuates switch S-19 to energize the Alternate Program relay K39 to render the alternate program control circuits effective. Relay K39 holds itself energized through its hold-in contacts K39-1 and also completes an energizing circuit through its contacts K39-12 for the Alternate-Program signal lamp 43 on the accounting machine.

If the card punch machine is not equipped with an alternate program feature, the program wires 800 and 802 are removed and the pin contacts B17 and B18 are connected instead to pin contacts A17 and A18, respectively by program wires 814 and 816, respectively, shown in dashed form. Pin contact A17 is connected from the rear of the plugboard by circuit conductor 818 to the low potential side of the Card Feed Latch Magnet which is contained in the card punch machine and is energized through the Register Key provided therein. The Card Feed Latch Magnet controls the card registration mechanism in the card punch machine to permit advancing of a card to the rear or punch feed rolls without releasing a card from the card hopper. Plugboard pin contact A18 is connected by circuit conductor 820 to conductor 629 to supply ground to pin contact A18 over a circuit which includes ground conductor 620, switch contacts K11-1, conductor 625, stepper switch contacts ON2S, conductor 627, the normal contacts of switch K6-3, and conductors 629 and 820. By depressing the control key 277 on the accounting machine to actuate switch S-19, the Card Feed Latch Magnet may be energized, when the stepper switch is at its home position and there is no card in the card bed of the card punch machine, to permit registration of a card in the card punch machine from the accounting machine.

While a sequential selection of electrical control programs or stepper switching levels has been described herein, it is apparent that the programs or switching levels can be selected in any desired order depending upon the location of the program lane switch actuating control lugs of the auxiliary carriage program panel at the various carriage tabulating positions of the accounting machine.

From the foregoing description, it will be seen that the present invention provides an integrated punched card data processing system in which a card punch machine is operated directly from an accounting machine without the use of any intervening agency such as a punched tape. It will be appreciated also that various control programs and applications of the accounting apparatus can be made other than the simplified version chosen for ease of explaining and understanding the invention.

We claim:

1. The combination with a recording device having a plurality of selectively energizable recording elements and a device having a movable carriage and a plurality of differentially positionable data racks, of an electrical power supply having one side connected to one side of each of said recording elements, means for sensing the differential positions of each of said data racks, and control means connected between said devices including first switching means operated from one of said devices and affording a selection at selected carriage positions of said movable carriage device of any one of several different groups of selectively operable control circuit paths extending from the other side of said power supply through various ones of said sensing means to the other side of each of said recording elements, second switching means actuable from both said devices to complete in succession the individual circuit paths of a selected group of control circuits and to energize said recording elements through different ones of said sensing means in accordance with the differential positions of the data racks to be read in a selected carriage position of said movable carriage device and means operable through said sensing means preventing actuation of said second switching means when all of said data racks are in their zero setting position.

2. The combination with a recording device having a plurality of selectively energizable recording elements and a device having a movable carriage and a plurality of differentially positionable data racks, of an electrical power supply having one side connected to one side of each of said recording elements, means for sensing the differential positions of each of said racks, and control means connected between said devices including switching means having a plurality of multiple-contact switching levels providing several different groups of control circuit paths from the other side of said power supply through various ones of said sensing means to the other side of each of said recording elements, switching level selecting means operated from said movable carriage device affording a selection of any one of said switching levels at selected carriage positions thereof, means operated from said movable carriage device to advance a selected switching level to a contact position connected to an individual control circuit containing the sensing means for the first data rack to be read in a selected carriage position of the movable carriage device, means operated from said recording device upon operation of said recording elements thereof to advance said selected switching level to its subsequent contact positions in succession and to complete successive circuit paths containing the sensing means for the subsequent data racks to be read at the said selected carriage position and means operable from said data rack sensing means preventing advancement of the switching levels of said switching means and operation of said recording device when all of said data racks are in their zero setting position.

3. The combination with a recording device having a plurality of selectively energizable recording elements and a device having a movable carriage and a plurality of differentially positionable data racks, of an electrical power supply having one side connected to one side of each of said recording elements, means for sensing the differential positions of each of said racks, and control means connected between said devices including switching means having a plurality of multiple-contact switching levels providing several different groups of control circuit paths from the other side of said power supply through various ones of said sensing means to the other side of each of said recording elements, switching level selecting means operated from said movable carriage device affording a selection of any one of said switching levels at selected carriage positions thereof, means operated from said movable carriage device to advance a selected switching level to a contact position connected to an individual control circuit containing the sensing means for the first data rack to be read at a selected carriage position thereof, means operated from said recording device upon operation of said recording elements thereof to advance said selected switching level to its subsequent contact positions in succession and to complete successive circuit paths containing the sensing means for the subsequent data racks to be read at the said selected carriage position, and means including an additional multiple contact switching level advanceable with a selected switching level over a plurality of contact positions for resetting said switching levels from various selected contact positions of said additional switching level for a subsequent cycle of operation of said control means after the selected switching level has been advanced to a contact position connected to the last one of the control circuits of the group of control circuits provided from said selected level.

4. In apparatus including a recording device having a plurality of selectively energizable recording elements and a device operable through repeated cycles of operation having a movable carriage, a plurality of differentially positionable data racks, and means for moving said carriage to different carriage positions and said data racks to different data representing positions at each of said carriage positions, the combination of an electrical power supply having one side connected to one side of each of said recording elements, means for sensing the differential positions of each of said data racks, and control means connected between said devices including switching means having a plurality of multiple-contact switching levels providing several different groups of control circuit paths from the other side of said power supply through various ones of said sensing means to the other side of each of said recording elements, switching level selecting means operated from said movable carriage device affording a selection of any one of said switching levels at selected carriage positions thereof, means operated from both said devices to advance said switching means including a selected one of said switching levels to successive contact positions connected to individual ones of said control circuits containing the sensing means for the data racks to be read at a selected carriage position of the movable carriage device, means for resetting said switching means for a subsequent cycle of operation of said control means at a different carriage position of said movable carriage device after the selected switching level has been advanced to a contact position connected to the last one of the control circuits of the group of control circuits provided therefrom, said control means also including locking means actuated from said movable carriage device upon initiation of a cycle of operation thereof to prevent initiation of a subsequent cycle of operation thereof during operation of said switching means and unlocking means actuated from an intermediate contact of an auxiliary switching level of said switching means to unlock said movable carriage device in preparation for a subsequent cycle of operation thereof after the said auxiliary switching level has been advanced to its said intermediate contact position.

5. The combination with a recording device having a plurality of selectively energizable recording elements and a device having a movable carriage and a plurality of differentially positionable data racks, of an electrical power supply having one side connected to one side of each of said recording elements, means for sensing the differential positions of each of said data racks, and control means connected between said devices including program selector means operated from said movable carriage device affording a selection at selected carriage positions thereof of any one of several different groups of selectively operable control circuit paths extending from the other side of said power supply through various ones of said sensing means to the other side of each of said recording elements, individual circuit selector means advanceable through a plurality of successive circuit completing positions to complete individual ones of said circuits of a selected group of control circuit paths in succession, first switching means operated from said movable carriage device to advance said individual circuit selector means to a first circuit completing position and to energize said recording elements through the sensing means for the first data rack to be read at a selected carriage position, and auxiliary switching means operated from said recording device upon operation of said recording elements thereof to advance said individual circuit selector means to its successive circuit completing positions and energize said recording elements in accordance with the differential positions of successive ones of said data racks to be read in the said selected carriage position, and means operable through said data rack sensing means preventing advancement of said circuit selector means and disabling operation of said recording device when all of the data racks of said movable carriage device are in their normal or zero setting position.

6. The combination in accordance with claim 5 above wherein said sensing means includes a read-out switch for each data rack having an input terminal and a plurality of output terminals selectively engageable with the input terminal in accordance with the differential position of the data rack sensed thereby, and wherein said disabling means includes an extra set of switch contacts for each of said read-out switches adapted to complete a zero position sensing circuit extending serially through the extra contacts of each of said read-out switches when all of the data racks are in their zero setting position and means energized from said power supply through said zero sensing circuit to disable operation of said program selector means and said circuit selector means in the event that all of the said data racks are in the aforesaid zero setting position.

7. The combination with an auxiliary recording device having a plurality of selectively energizable, electrically operated recording elements for recording a quantity on an auxiliary recording medium and an accounting device of the type having a movable carriage, a plurality of different orders of amount keys for entering quantities into said accounting device, a data rack for each order of amount keys differentially positionable in accordance with a quantity entered into the accounting device, and recording means controlled by the data racks for recording on a recording medium quantities entered into said accounting device; of an electrical power supply having one side connected to one side of each of said auxiliary recording elements of said auxiliary recording device, means for sensing the differential positions of each of said data racks including a read-out switch for each rack having an input terminal and a plurality of output terminals selectively engageable with said input terminal in accordance with the differential positions of the data rack sensed thereby, and control means connected between said devices including a stepping relay having an operating coil, a plurality of banks of separate switch contact elements and a plurality of ganged switch contact arms progressively movable between adjacent contact elements of different ones of said contact banks upon alternate energization and de-energization of said operating coil, program selecting means including a program selecting switch selectively actuated in accordance with the carriage position of said accounting device, a plurality of electrical circuits each including one of said program selecting switches connecting the contact arm of a selected one of said stepper banks to the other side of said power supply, circuit means connecting a different successive uninterrupted group of switch contact elements of each of said stepper switch banks to the input terminals of individual ones of said read-out switches assigned to the data racks to be read in any one of the carriage positions of the accounting device, circuit means connecting each of the output contacts of said read-out switches to a different one of said auxiliary recording elements of said auxiliary recording device, and means for advancing the position of the contact arms of said stepper relay from one switch contact element of a bank to an adjacent switch contact element, thereby to read the differential position of different ones of said data racks, including switching means operated from said auxiliary recording device upon operation of said auxiliary recording elements and circuit means connecting said stepper operating coil across said power supply throught said last-named switching means.

8. The combination with an auxiliary recording device having a plurality of selectively energizable, electrically operated recording elements for recording a quantity on a recording medium and an accounting device of the type having a movable carriage, at least one accumulator section for accumulating positive and negative quantities entered into said accounting device, means for entering quantities into said accumulator section including a plurality of different orders of amount keys, a data rack for each order of amount keys differentially positionable in accordance with a quantity entered into the accounting device, recording means controlled by said data racks for recording the quantities entered into said accounting device on another recording medium, and carriage selective program scheduling means including a program control panel on the carriage of the accounting device scheduling said quantities into different accounting operations performed in the accounting device at different carriage positions thereof; of an electrical power supply having one side connected to one side of each of said electrically operated recording elements of said auxiliary recording device, means for sensing the differential positions of each of said data racks, and control means connected between said devices providing a plurality of selectively operable control circuit paths from the other side of said power supply through different ones of said sensing means to the other side of each of said auxiliary recording elements, said control means including program selector means operated from one of said devices affording a selection of several different groups of said control circuit paths, circuit selector means actuable from both said devices to complete successive individual circuits of a selected group of control circuit paths and to energize said auxiliary recording elements through different ones of said sensing means in accordance with the differential positions of the data racks to be read in a selected carriage position of said movable carriage device, switching means operable from said accounting device for sensing the algebraic sign of the quantities entered into said accumulator section, additional switching means operated from the program panel of said accounting device affording a selection with said switching means of altering the recording from said auxiliary recording device of certain algebraic quantities entered in said accounting device at certain carriage positions thereof and of disabling the recording of such algebraic quantities entered in said accounting device at other carriage positions thereof.

9. The combination with a record punching device having a plurality of selectively energizable, electrically operated punching elements for recording a quantity on a recording medium and an accounting device of the type having a movable carriage, at least one accumulator section for accumulating positive and negative quantities, means for entering quantities into said accumulator section including a plurality of different orders of amount keys, a data rack for each order of amount keys differentially positionable in accordance with a quantity entered into the accounting device, recording means controlled by said data racks for recording the quantities entered into said accounting device on another recording medium, and carriage selective program scheduling means including a program control panel on the carriage of the accounting device scheduling said quantities into different accounting operations performed in the accounting device at different carriage positions thereof; of an electrical power supply having one side connected to one side of each of said electrically operated punching elements of said punching device, means for sensing the differential positions of each of said data racks, and control means connected between said devices providing a plurality of selectively operable control circuit paths from the other side of said power supply through different ones of said sensing means to the other side of each of said electrically operated punching elements, said control means including program selector means operated from one of said devices affording a selection of several different groups of said control circuit paths, circuit selector means actuable from both said devices to complete successive individual circuits of a selected group of control circuit paths and to energize said punching elements through different ones of said sensing means in accordance with the differential positions of the data racks to be read in a selected carriage position of said movable carriage device, switching means operable from said accounting device for sensing the algebraic sign of the quantities entered into said accumulator section, additional switching means operated from the program panel of said accounting device affording a selection with said switching means of overpunching certain algebraic quantities entered in said accounting device at certain carriage positions thereof and of disabling the punching for such algebraic quantities entered in said accounting device at other carriage positions thereof.

10. The combination with a record punching device having a plurality of selectively energizable, electrically operated punching elements for recording a quantity on a recording medium and an accounting device of the type having a movable carriage, at least one accumulator section for accumulating positive and negative quantities, means for entering quantities into said accumulator section including a plurality of different orders of amount keys, a data rack for each order of amount keys differentially positionable in accordance with a quantity entered into the accounting device, recording means controlled by said data racks for recording the quantities entered into said accounting device on another recording medium, and carriage position controlled program scheduling means including a program panel on the carriage of the accounting device scheduling said quantities into different accounting operations performed in the accounting device at different carriage positions thereof; of an electrical power supply having one side connected to one side of each of said electrically operated punching elements of said punching device, means for sensing the differential positions of each of said data racks, and control means connected between said devices providing a plurality of selectively operable control circuit paths from the other side of said power supply through different ones of said sensing means to the other side of each of said recording elements, said control means including program selector means operated from one of said devices affording a selection of several different groups of said control circuit paths, circuit selector means actuable from both said devices to complete successive individual circuits of a selected group of control circuit paths and to energize said recording elements through different ones of said sensing means in accordance with the differential positions of the data racks to be read in a selected carriage position of said movable carriage device, switching means operable from said accounting device for sensing negative quantities entered into said accumulator section, additional switching means operated from the program panel of said accounting device affording a selection with said switching means of overpunching such negative quantities entered in said accounting device at certain carriage positions thereof, disabling the punch for such negative quantities entered in said accounting device at other carriage positions thereof, and punching of such negative quantities entered in said accounting device at still other carriage positions thereof.

11. The combination with a card punch device including a punching mechanism having a plurality of selectively operable punch operating elements and means for advancing a record card column by column to said punching mechanism including a keyboard having a plurality of depressible keys controlling the actuation of the card punch operating elements and a keyboard restoring magnet for restoring a depressed key upon operation of a punch operating element actuated thereby; and an accounting device including a keyboard having a plurality of depressible keys and a plurality of data racks differentially positionable in accordance with the depression of said keys; of control means connected between said devices for controlling the operation of said card punch device directly from said accounting device including means operable from said accounting device controlling the energization of said keyboard restore magnet of the card punch device and preventing operation of the latter device from the said keyboard thereof.

12. The combination with a card punch device having a card hopper, a punching station having a plurality of selectively operable punch operating elements, a reading station, a program unit including a program drum having a pre-punched program card thereon and means for sensing of punchings therein, means for feeding record cards in succession from the card hopper to the punching station and from the punching station to the reading station including means for advancing the cards at the punching station and the reading station and on the program drum in column by column synchronization past said punching station and said reading station and said program card sensing means, respectively, duplication means controlling the duplication of punchings in a card at the punching station from a card at the reading station, skipping means controlling the skipping of said cards column by column at said punching station and said reading station, a keyboard having a plurality of depressible keys controlling the actuation of said card punch operating elements and said duplication control means and skipping control means, and a keyboard restoring magnet for restoring a depressed key upon operation of a punch operating element actuated thereby; and an accounting device including a keyboard having a plurality of depressible keys and a plurality of data racks differentially positionable in accordance with the depression of said keys thereof; of control means connected between said devices for controlling the operation of said card punch device from said accounting device including means operable from said accounting device controlling the energization of said keyboard restore magnet and preventing operation of the card punch device from the said keyboard thereof and additional control means operable from said accounting device controlling said card feed means, duplication means and skipping means from the accounting device.

13. The combination with a card punch device having a card hopper, a punching station having a plurality of selectively operable punch operating elements, a reading station, a program unit including a program drum having a pre-punched program card thereon and means for sensing of punchings therein, means for feeding record cards in succession from the card hopper to the punching station and from the punching station to the reading station including means for advancing the cards at the punching station and the reading station and on the program drum in column by column synchronization past said punching station and said reading stations and said program card sensing means, respectively, duplication means controlling the duplication of punchings in a card at the punching station from a card at the reading station, and skipping means controlling the skipping of said cards column by column at said punching station and said reading station; and an accounting device including a movable carriage, a keyboard having a plurality of depressable keys and a plurality of data racks differentially positionable in accordance with the depression of the keys thereof; of an electrical power supply having one side connected to one side of each of said punch operating elements and to said duplication control means and said skipping control means, means for sensing the differential positions of said data racks, and control means connected between said devices providing a plurality of selectively operable control circuit paths for controlling said card punch device from said accounting device, said control means including program selector means operated from said accounting device affording a selection of several different groups of control circuits paths at different carriage positions thereof, step by step switching means operable from said devices and providing a plurality of switching positions to complete successive individual circuit paths of a selected group of control circuit paths from the other side of said power supply through various ones of the sensing means for the data racks to be read in a carriage position of said accounting device and through said duplication control means and said skipping control means of said card punch device, and control means preventing advancement of said switching means during duplication operations initiated therefrom.

14. The combination with a card punch device having a card hopper, a punching station having a plurality of selectively operable punch operating elements, a reading station, a program unit including a program drum having a pre-punched program card thereon and means for sensing of punchings therein, means for feeding record cards in succession from the card hopper to a card registration position at the punching station and from the punching station to a registration position at the reading station including means for advancing the cards at the punching station and the reading station and on the program drum in column by column synchronization past said punching station and said reading stations and said program card sensing means, respectively; and an accounting device including a movable carriage, a keyboard having a plurality of depressable keys and a plurality of data racks differentially positionable in accordance with the depression of the keys thereof; of an electrical power supply having one side connected to one side of each of said punch operating elements, means for sensing the differential positions of said data racks, and control means connected between said devices providing a plurality of selectively operable control circuit paths for controlling said card punch device from said accounting device, said control means including program selector means operated from said accounting device affording a selection of several different groups of control circuits paths at different carriage positions thereof, switching means advanceable through a plurality of successive positions and controlled from both said devices to complete successive individual circuit paths of a selected group of control circuit paths from the other side of said power supply through various ones of the sensing means for the data racks to be read in a carriage position of said accounting device, and control means preventing advancement of said switching means during the feeding of said cards by said card feed means to their registration positions at the punching station and reading station of said card punch device.

15. The combination with a card punch machine including a plurality of selectively energizable punch operating elements for columnar punching of a detail card, a plurality of selectively energizable functional control means controlling functional operations of the card punch machine, a keyboard having a plurality of depressable keys controlling energization of said punch operating elements and said functional control means, and a keyboard magnet controlling the operation of said keys, and a cyclically operable accounting machine having a carriage movable to different stop positions, a plurality of differentially positionable data racks and a keyboard for entering data therein and for initiating cyclical operations at different carriage stop positions thereof; of a potential supply source connected to one side of each of said punch operating elements and said functional control means; a plurality of electrical read-out devices co-operating with said data racks for sensing data entered in the accounting machine in one of the carriage stop positions thereof, each of said devices having an input terminal and a plurality of data output terminals connected to the other side of different ones of said punch operating elements; and control means connected between said machines including programming means providing a plurality of selectively operable control circuit paths each having one side connected to the other side of said potential supply source, said control means including a programming plugboard having a plurality of input terminals thereon connected to the other side of different ones of said control circuit paths, a plurality of data rack terminals connected to the input terminals of different ones of said read-out devices, and a plurality of functional control terminals connected to the other side of different ones of said functional control means, various ones of said plugboard input terminals being program wired to different ones of the data rack terminals and others to different ones of the functional control terminals thereon, switching means operated from both of said machines after the initiation of an accounting machine cycle for activating successive ones of said selectively operable control circuit paths from the other side of the potential supply source to the other side of said punch operating elements and said functional control means of the card punch machine through the input, data rack and functional control terminal sections of the plugboard as programmed on the plugboard and control means operable from said accounting device controlling the energization of the keyboard magnet of the card punch machine to prevent operation of the latter machine from the keyboard thereof.

16. The combination with a card punch machine including a plurality of selectively energizable punch operating elements for columnar punching of a detail card, a plurality of selectively energizable functional control means controlling functional operations of the card punch machine, a keyboard having a plurality of depressible keys controlling energization of said punch operating elements and said functional control means, and a keyboard magnet controlling the operation of said keys, and a cyclically operable accounting machine having a carriage movable to different stop positions, a plurality of differentially positionable data racks and a keyboard for entering data therein and for initiating cyclical operations at different carriage stop positions thereof; of a potential supply source connected to one side of each of said punch operating elements and said functional control means; a plurality of electrical read-out devices cooperating with said data racks for sensing data entered in the accounting machine in one of the carriage stop positions thereof, each of said devices having an input terminal and a plurality of data output terminals connected to the other side of different ones of said punch operating elements; and control means connected between said machines including programming means providing a plurality of selectively operable control circuit paths each having one side connected to the other side of said potential supply source, said programming means including a programming plugboard having a plurality of input terminals thereon connected to the other side of different ones of said control circuit paths, a plurality of data rack terminals connected to the input terminals of different ones of said read-out devices, and a plurality of functional control terminals connected to the other side of different ones of said functional control means, various ones of said plugboard input terminals being program wired to different ones of the data rack input terminals and others to different ones of the functional control terminals thereon, switching means operated from the accounting machine upon initiation of a cycle of operation thereof to activate a first one of said control circuit paths extending from a point connected to the other side of said potential supply source to one of the input terminals of the plugboard and from that terminal to one of the data rack or functional control terminals thereon depending on the programming thereof to initiate a corresponding operation of the card punch machine, additional switching means operated thereafter from the card punch machine to activate subsequent control circuit paths from the other side of said potential supply source to the card punch machine through the plugboard for subsequent control operations of the card punch machine and control means operable from said accounting device controlling the energization of the keyboard magnet of the card punch machine to prevent operation of the latter machine from the keyboard thereof.

17. The combination in accordance with claim 16, above, wherein said programming plugboard includes at least one set of single entry, dual exit buffer terminals thereon for connecting any one of the plugboard input terminals to two other terminals of the plugboard, and an isolation diode between each exit terminal and the entry terminal of each set of plugboard buffer terminals.

18. The combination in accordance with claim 16, above, wherein said control means includes at least one plugboard selector relay having a set of relay contacts and said programming plugboard has a set of selector terminals connected to said relay contacts and program wired to an input terminal and another terminal of the plugboard, and wherein said accounting machine includes additional switching means operable in predetermined carriage stop positions thereof and selectively operable control means jointly controlling the energization of said selector relay to alter the function or operation provided from the said input terminal of the plugboard when the selector relay is energized.

19. The combination with a card punch machine including a plurality of selectively energizable punch operating elements for columnar punching of a detail card, a plurality of selectively energizable functional control means controlling functional operations of the card punch machine, a keyboard having a plurality of depressible keys controlling energization of said punch operating elements and said functional control means, and a keyboard magnet controlling the operation of said keys, and a cyclically operable accounting machine having a carriage movable to different stop positions, a plurality of differentially positionable data racks and a keyboard for entering data therein and for initiating cyclical operations thereof; of a potential supply source connected to one side of each of said punch operating elements and said functional control means; a plurality of electrical read-out devices cooperating with said data racks for sensing data entered in the accounting machine in one of the carriage stop positions thereof, each of said devices having an input terminal and a plurality of data output terminals connected to the other side of different ones of said punch operating elements; and control means connected between said machines including programming means providing a plurality of selectively operable control circuit paths each having one side connected to the other side of said potential supply source, said programming means including a programming plugboard having a plurality of input terminals thereon connected to the other side of different ones of said control circuit paths, a plurality of data rack terminals connected to the input terminals of different ones of said read-out devices, a plurality of card entry terminals also connected to the other side of different ones of said punch operating elements, and a plurality of functional control terminals connected to the other side of different ones of said functional control means of the card punch machine, various ones of said plugboard input terminals being program wired to different ones of the data rack terminals and others to different ones of the card entry terminals and to the functional control terminals thereon, switching means operated from the accounting machine upon initiation of a cycle of operation thereof to activate a first one of said control circuit paths extending from a point connected to the other side of said potential supply source to one of the input terminals of the plugboard and from that terminal to one of the data rack, card entry or functional control terminals thereon depending on the programming thereof to initiate a corresponding operation of the card punch machine, additional switching means operated thereafter from the card punch machine to activate subsequent control circuit paths from the other side of said potential supply source to the card punch machine through the plugboard for subsequent control operations of the card punch machine and control means operable from said accounting device controlling the energization of the keyboard magnet of the card punch machine to prevent operation of the latter machine from the keyboard thereof.

20. The combination with a card punch machine including a plurality of selectively energizable punch operating elements for columnar punching of a detail card, a plurality of selectively energizable functional control means controlling functional operations of the card punch machine, a keyboard having a plurality of depressible keys controlling energization of said punch operating elements and said functional control means, a keyboard magnet controlling the operation of said keys, a program card having control indicia distributed in columnar fields thereof controlling the initiation and duration of automatic functional operations of the card punch machine, means for sensing said control indicia in the columns of the program card, alternate program control means for changing the automatic functional controls of the card punch machine from the program card, means for advancing the detail card and the program card column by column past the punching elements and said sensing means, respectively, upon energization of any of said punch operating elements or said functional control means and a cyclically operable accounting machine having a movable carriage, a plurality of differentially positionable data racks, and a keyboard for entering data therein and for initiating cyclical operations at different carriage stop positions thereof; of a potential supply source connected to one side of each of said punch operating elements and said functional control means, a plurality of electrical read-out devices cooperating with said data racks for sensing data entered in the accounting machine in a carriage stop position thereof, each of said devices having an input terminal and a plurality of data output terminals connected to the other side of different ones of said selectively energizable punch operating elements, and control means interconnecting said machines and including programming means providing a plurality of selectively operable control circuit paths each having one side connected to the other side of said potential supply source, said programming means including a programming plugboard having a plurality of input terminals thereon connected to the other side of different ones of said control circuit paths, a plurality of data rack terminals connected to the input terminals of different ones of the electrical read-out devices, and a plurality of functional control terminals connected to the other side of different ones of the functional control means of the card punch machine, various ones of the input terminals of the plugboard being program wired to the data rack terminals and other input terminals to the function control terminals thereof, switching means operated from the accounting machine upon initiation of a cycle of operation thereof to complete a first one of said control circuit paths extending from a point connected to the other side of said potential supply source to one of the input terminals of the plugboard and from that terminal to one of the data rack or functional control terminals thereon depending on the programming thereof to initiate a corresponding operation of the card punch machine and advancement of the detail card and program card to the next columnar position thereof, switching means operated thereafter from the card punch machine to complete subsequent control circuit paths from the other side of said potential supply source to the card punch machine through the plugboard, manually operable control means for activating said alternate program control means of the card punch machine from the accounting machine and control means operable from said accounting device controlling the energization of the keyboard magnet of the card punch machine to prevent operation of the latter machine from the keyboard thereof.

21. The combination with a recording device having a plurality of selectively energizable recording elements and a device having a movable carriage and a plurality of differentially positionable data racks, of an electrical power supply having one side connected to one side of each of said recording elements, means for sensing the differential positions of each of said data racks, and control means connected between said devices including a plurality of selectively operable control circuit paths extending from the other side of said power supply through different ones of said sensing means to the other side of each of said recording elements, step by step switching means actuable from both said devices to complete said selectively operable control circuit paths in succession for energization of said recording elements through different ones of said sensing means in accordance with the differential positions of the data racks to be read in a carriage position of said movable carriage device, and means operable through said data rack sensing means preventing actuation of said switching means when all of said data racks are in their zero setting positions.

22. In apparatus including a recording device having a plurality of selectively energizable recording elements and a device operable through repeated cycles of operation having a movable carriage, a plurality of differentially positionable data racks, and means for moving said carriage to different carriage positions and said data racks to different data representing positions at each of said carriage positions, the combination of an electrical power supply having one side connected to one side of each of said recording elements, means for sensing the differential positions of each of said data racks, and control means connected between said devices including switching means having a plurality of multiple-contact switching levels providing several different groups of control circuit paths from the other side of said power supply through various ones of said sensing means to the other side of each of said recording elements, switching level selecting means operated from said movable carriage device affording a selection of any one of said switching levels at selected carriage positions thereof, means operated from both said devices to advance said switching means including a selected one of said switching levels to successive contact positions connected to individual ones of said control circuits containing the sensing means for the data racks to be read at a selected carriage position of the movable carriage device, locking means actuated from said movable carriage device upon initiation of a cycle of operation thereof to prevent initiation of a subsequent cycle of operation during operation of said switching means, and unlocking means actuated from an intermediate contact of an auxiliary switching level of said switching means to unlock said movable carriage device in preparation for a subsequent cycle of operation thereof after the said auxiliary switching level has been advanced to its said intermediate contact position.

23. The combination with an auxiliary recording device having a plurality of selectively energizable, electrically operated recording elements for recording a quantity on a recording medium and an accounting device of the type having a movable carriage, at least one accumulator section for accumulating positive and negative quantities, means for entering quantities into said accumulator section including a plurality of different orders of amount keys, a data rack for each order of amount keys differentially positionable in accordance with a quantitiy entered into the accounting device, and recording means controlled by said data racks for recording quantities entered into said accounting device on another recording medium; of an electrical power supply having one side connected to one side of each of said electrically operated recording elements of said auxiliary recording device, means for sensing the differential positions of each of said data racks, and control means connected between said devices providing a plurality of selectively operable control circuit paths from the other side of said power supply through different ones of said sensing means to the other side of each of said auxiliary recording elements, circuit selector means actuable from both said devices to complete said selectively operable control circuit paths in succession for energization of said auxiliary recording elements through different ones of said sensing means in accordance with the differential positions of the data racks to be read in a carriage position of said movable carriage device, switching means operable from said accounting device for sensing the algebraic sign of a quantity entered into said accumulator section, and additional switching means operated at a selected carriage position of said accounting device affording a selection with said first mentioned switching means of altering the recording from said auxiliary recording device of certain algebraic quantities entered in said accounting device at slected carriage positions thereof.

24. The combination with an auxiliary recording device having a plurality of selectively energizable, electrically operated recording elements for recording a quantity on a recording medium and an accounting device of the type having a movable carriage, at least one accumulator section for accumulating positive and negative quantities, means for entering quantities into said accumulator section including a plurality of different orders of amount keys, a data rack for each order of amount keys differentially positionable in accordance with a quantity entered into the accounting device, and recording means controlled by said data racks for recording quantities entered into said accounting device on another recording medium; of an electrical power supply having one side connected to one side of each of said electrically operated recording elements of said auxiliary recording device, means for sensing the differential positions of each of said data racks, and control means connected between said devices providing a plurality of selectively operable control circuit paths from the other side of said power supply through different ones of said sensing means to the other side of each of said auxiliary recording elements, circuit selector means actuable from both said devices to complete said selectively operable control circuit paths in succession for energization of said auxiliary recording elements through different ones of said sensing means in accordance with the differential positions of the data racks to be read in a carriage position of said movable carriage device, switching means operable from said accounting device for sensing the algebraic sign of the quantities entered into said accumulator section, and additional switching means operated at a selected carriage position of said accounting device affording a selection with said first mentioned switching means of altering the recording from said auxiliary recording device of certain algebraic quantities entered in said accounting device at selected carriage positions thereof and of disabling the recording of such algebraic quantities entered in said accounting device at other carriage positions thereof.

25. The combination with a cyclically operable recording device having a plurality of selectively energizable recording elements and a cyclically operable data entry device having a movable carriage, a plurality of differentially positionable data racks and means for initiating a cycle of operation thereof, of an electrical power supply having one side connected to one side of each of said recording elements, read-out means for sensing the differential positions of each of said data racks, and control means connected between said devices including first switching means operated at different carriage stop positions and prior to initiation of a cycle of operation of said data entry device affording a selection of any one of several different groups of selectively operable control circuit paths extending from the other side of said power supply through different ones of said sensing means to the other side of each of said recording elements, and second switching means operable from both said devices to complete in succession the individual circuit paths of a selected group of control circuits and to energize said recording elements through different ones of said sensing means in accordance with the differential positions of the data racks to be read in a selected carriage position of the data entry device.

26. The combination with a cyclically operable recording device having a plurality of selectively energizable recording elements and a cyclically operable data entry device having a movable carriage, a plurality of differentially positionable data racks and means for initiating a cycle of operation thereof, of an electrical power supply having one side connected to one side of each of said recording elements, read-out means for sensing the differential positions of each of said data racks, and control means connected between said devices and including first switching means operated at different carriage stop positions and prior to initiation of a cycle of operation of said data entry device affording a selection of any one of several different groups of selectively operable control circuit paths extending from the other side of said power supply through different ones of said sensing means to the other side of each of said recording elements, second switching means providing a plurality of successively operable switching circuits through which the said other side of the power supply may be connected in succession to the individual control circuits of a selected group of control circuits, means actuated from one of said devices to complete a first one of the switching circuits provided by said second switching means, and means operated from said recording device upon operation of said recording elements thereof to complete a following switching circuit provided by said second switching means.

27. The combination with a cyclically operable recording device having a plurality of selectively energizable recording elements and a cyclically operable data entry device having a movable carriage, a plurality of differentially positionable data racks, and means for intiating a cycle of operation thereof, of an electrical power supply having one side connected to one side of each of said recording elements, read-out means for sensing the differential positions of each of said data racks, and control means connected between said devices and including switching means having a plurality of multiple-contact switching levels providing several different groups of control circuit paths from the other side of said power supply through various ones of said sensing means to the other side of each of said recording elements, switching level selecting means operated at different carriage stop positions and prior to initiation of a cycle of operation of said data entry device affording a selection at selected carriage positions thereof of any one of said switching levels, means operated from said data entry device to advance a selected switching level to a contact position connected to an individual control circuit path containing the sensing means for the first data rack to be read in a selected carriage position of the data entry device, and means operated from said recording device upon operation of one of said recording elements thereof to advance said selected switching level to its subsequent contact positions in succession and to complete successive circuit paths containing the sensing means for subsequent data racks to be read at said selected carriage position.

28. The combination with a cyclically operable recording device having a plurality of selectively energizable recording elements and a data entry device having a movable carriage, a plurality of differentially positionable data racks, and means for initiating a cycle of operation thereof, of an electrical power supply having one side connected to one side of each of said recording elements, read-out means for sensing the differential positions of each of said racks, and control means connected between said devices including switching means having a plurality of multiple-contact switching levels providing several different groups of control circuit paths from the other side of said power supply through various ones of said sensing means to the other side of each of said recording elements, switching level selecting means operated at different carriage stop positions and prior to initiation of a cycle of operation of said data entry device affording a selection of any one of said switching levels, means operated from said data entry device to advance a selected switching level to a contact position connected to an individual control circuit containing the sensing means for the first data rack to be read in a selected carriage position of the data entry device, means operated from said recording device upon operation of said recording elements thereof to advance said switching level to its subsequent contact positions in succession to complete successive circuit paths containing the sensing means for the subsequent data racks to be read at the selected carriage position of the data entry device, and means for resetting said switching levels of said switching means after the selected switching level has been advanced to a contact position connected to the last one of the control circuits of the group of control circuits provided therefrom in preparation for a subsequent cycle of operation at a different carriage stop position of said data entry device.

29. In apparatus including a cyclically operable recording device having a plurality of selectively energizable recording elements and a cyclically operable data entry device having a movable carriage, a plurality of differentially positionable data racks, and means for initiating a cycle of operation thereof, the combination of an electrical power supply having one side connected to one side of each of said recording elements, read-out means for sensing the differential positions of each of said data racks, and control means connected between said devices including switching levels providing several different groups of control circuit paths from the other side of said power supply through various ones of said sensing means to the other side of each of said recording elements, switching level selecting means operated at different carriage stop positions and prior to the initiation of a cycle of operation of said data entry device affording a selection of any one of said switching levels, means operated from both said devices to advance said switching means including a selected one of said switching levels to successive contact positions connected to different ones of said control circuits containing the sensing means for the data racks to be read at a selected carriage stop position of the data entry device, and locking means actuated from said data entry device upon initiation of a cycle of operation thereof and held actuated thereafter through the completion of a cycle of operation of the data entry device and until said selected switching level has been advanced past a contact position thereof connected to the last one of the control circuit paths of the group of control circuit paths provided therefrom.

30. The combination with a cyclically operable recording device having a plurality of selectively energizable recording elements and a cyclically operable data entry device having a movable carriage, a plurality of differentially positionable data racks, and means for initiating a cycle of operation thereof, of an electrical power supply having one side connected to one side of each of said recording elements, read-out means for sensing the differential positions of each of said racks, and control means connected between said devices including program selector means operated at different carriage stop positions and prior to initiation of a cycle of operation of said data entry device affording a selection at selected carriage positions thereof of any one of several different groups of selectively operable control circuit paths extending from the other side of said power supply through different ones of said sensing means to the other side of each of said recording elements, step-by-step circuit selector means advanceable through a plurality of successive circuit completing positions to complete individual ones of said circuits of a selected group of control circuit paths in succession, first switching means operated from said data entry device to advance said step-by-step circuit selector means to a first circuit completing position and to energize said recording elements through the sensing means for the first data rack to be read in a selected carriage position of the data entry device, auxiliary switching means operated from said recording device upon operation of said recording elements thereof to advance said step-by-step circuit selector means to its successive circuit completing positions and to energize said recording elements in accordance with the differential positions of successive ones of said data racks to be read in the selected carriage position, and means disabling operation of said recording device when all of the data racks of said data entry device are in their normal or zero setting position.

31. The combination with a card punch device including a punching station having a plurality of selectively operable punch operating elements, a reading station, a program unit including a program drum having a prepunched program card thereon and means for sensing of punchings therein, means for feeding record cards to the punching station and from the punching station to the reading station including means for advancing the cards at the punching station and the reading station and said program card past said program card sensing means, respectively, duplication means controlling the duplication of punchings in a card at the punching station from a card at the reading station, and skipping means controlling the skipping of said cards column-by-column at said punching station and said reading station; a cyclically operable accounting device including a movable carriage, a plurality of differentially positionable data racks, a keyboard having a plurality of data keys for entering data therein and means for initiating a cycle of operation thereof; of an electrical power supply having one side connected to one side of each of said punch operating elements and to said duplication control means and said skipping control means, electrical read-out means for sensing the differential positions of said data racks, and control means connected between said devices providing a plurality of selectively operable control circuit paths for controlling the operation of said card punch device from said accounting device, said control means including selector means operable at different carriage stop positions and prior to the initiation of a cycle of operation of said accounting device affording a selection of any one of several different groups of said control circuit paths at different carriage stop positions of the accounting device, and switching means operable from both said devices and providing a plurality of switching positions to complete successive individual circuit paths of a selected group of control circuit paths from the other side of said power supply through various ones of the read-out means sensing the data racks to be read in a carriage position of the accounting device and through said duplication control means and said skipping control means of said card punch device.

32. The combination with a cyclically operable card punch machine including a plurality of selectively energizable punching elements and means for advancing a detail card column by column past said punching elements, and a cyclically operable accounting machine having a movable carriage, a plurality of differentially positionable data racks, a keyboard for entering data therein and means for initiating cyclical operations thereof; of an electrical power supply having one side connected to one side of each of said selectively energizable punching elements, read-out means for sensing the differential positions of said data racks, and control means connected between said machines and providing a plurality of selectively operable control circuit paths from the other side of the power supply and extending through different ones of said sensing means to the other side of said selectively energizable punching elements, programming means providing a plurality of different punching sequences of said detail card from said accounting machine at different carriage positions thereof and controlling the sequential selection of individual ones of a group of said control circuit paths for effecting a pre-determined punching sequence of the detail card in accordance with the data entered into the accounting machine at a predetermined carriage stop position thereof, first switching means actuated in different carriage stop positions and prior to the initiation of an accounting machine cycle controlling the operation of the card punch machine from the accounting machine through said programming means at different carriage stop positions of the accounting machine, second switching means operated from the accounting machine upon initiation of a cycle of operation in one of the carriage stop positions thereof to complete a first one of the control circuit paths provided from said programming means in one of said carriage stop positions and initiate said punching sequence, and further switching means operated from said card punch machine to complete subsequent successive ones of said control circuit paths provided from said programming means during the remainder of said punching sequence provided therefrom for the aforesaid carriage stop position.

33. The combination with a cyclically operable card punch device including a punching station having a plurality of selectively energizable punch operating elements, a reading station, means for feeding record cards in succession to the punching station and from the punching station to the reading station including means for advancing the cards at the punching station and the reading station in column by column synchronization past said punching station and said reading station, and selectively energizable functional operation control means including duplication means controlling the duplication of punchings in a card at the punching station from a card at the reading station and skipping means controlling the columnar skipping of both of said cards at said stations; and a cyclically operable accounting device having a movable carriage, a plurality of differentially positionable data racks, a keyboard for entering data therein and means for initiating cyclical operations at different carriage stop positions thereof; of an electrical power supply having one side connected to one side of each of said punch operating elements and said functional control means, electrical read-out means for sensing the different positions of said data racks, and control means connected between said devices providing a plurality of selectively operable data and functional control circuit paths from the other side of said power supply to the other side of said punch operating elements through said sensing means and to the other side of said functional control means and controlling the sequential selection of individual ones of a group of said control circuit paths for effecting a predetermined punching sequence of the detail card in accordance with the data entered in the accounting device and functional operations programmed from said programming means for a predetermined carriage stop position of the accounting device, said control means including programming means providing a plurality of different punching sequences and functional operations of said card punch machine at different carriage positions of the accounting device, first switching means actuated by movement of the carriage of the accounting device to different ones of the carriage stop positions thereof and prior to the initiation of a cycle of operation thereof controlling the operation of the card punch device from the accounting device through said programming means at different carriage stop positions of the accounting device, and further switching means operated from both of said devices to complete successive individual circuit paths of a group of control circuit paths provided from said programming means and extending from the other side of said power supply to the other side of said punch operating elements through various ones of the sensing means for the data racks to be read in one of the carriage positions of said accounting device and to said functional operation control means of said card punch device.

34. The combination with a cyclically operable card punch machine including a plurality of selectively energizable punch operating elements for columnar punching of a detail card and a plurality of selectively energizable control means controlling automatic functional operations of the card punch machine, and a cyclically operable accounting machine having a movable carriage, a plurality of differentially positionable data racks, an accumulator cooperating with said data racks, and a keyboard for entering data therein and for initiating cyclical operations thereof; of a potential supply source connected to one side of each of said punch operating elements and said functional control means; a plurality of electrical read-out devices cooperating with said data racks for sensing data entered in the accounting machine, each having an input terminal and a plurality of data output terminals connected to other side of different ones of said punch operating elements; and control means connected between said machines including a plurality of selectively operable control circuit paths each having one side connected to the other side of said potential supply source; a programming plugboard having a plurality of input terminals thereon connected to the other side of different ones of said control circuit paths, a plurality of data rack terminals connected to the input terminals of different ones of said read-out devices, and a plurality of functional control terminals connected to the other side of different ones of said functional control means, various ones of said plugboard input terminals being program wired to different ones of the data rack terminals and to different ones of the functional control terminals thereon; first switching means operable from the accounting machine carriage and prior to the initiation of a cycle of operation thereof, controlling the operation of the card punch machine from the accounting machine at different carriage stop positions thereof, and further switching means operated from both of said machines after the initiation of an accounting machine cycle for completion of successive ones of said control circuit paths from the other side of the potential supply source to the other side of said punch operating elements and said functional control means through the plugboard and various ones of the read-out devices and functional control means as programmed on the plugboard.

References Cited in the file of this patent

UNITED STATES PATENTS

| | | |
|---|---|---|
| 1,834,561 | Watson | Dec. 1, 1931 |
| 2,165,556 | Lasker et al | July 11, 1939 |
| 2,240,549 | Carroll | May 6, 1941 |
| 2,332,755 | Robertson et al. | Oct. 26, 1943 |
| 2,403,005 | Lake | July 2, 1946 |
| 2,540,029 | Hamilton et al. | Jan. 30, 1951 |
| 2,637,399 | Doty | May 5, 1953 |
| 2,647,581 | Gardinor et al. | Aug. 4, 1953 |
| 2,717,733 | Luhn et al. | Sept. 13, 1955 |
| 2,756,823 | Laville et al. | July 31, 1956 |
| 2,775,403 | Hall et al. | Dec. 25, 1956 |
| 2,781,847 | Kilheffer et al. | Feb. 19, 1957 |
| 2,800,539 | Edminster et al. | July 23, 1957 |
| 2,861,739 | Chall et al. | Nov. 28, 1958 |
| 2,864,554 | Rolph et al. | Dec. 16, 1958 |
| 2,878,872 | Burns et al. | Mar. 24, 1959 |
| 2,905,244 | Sonnanstine | Sept. 22, 1959 |